(12) United States Patent
Misawa et al.

(10) Patent No.: US 10,520,794 B2
(45) Date of Patent: Dec. 31, 2019

(54) CAMERA, SETTING METHOD OF CAMERA, AND SETTING PROGRAM OF CAMERA

(71) Applicant: FUJIFILM Corporation, Tokyo (JP)

(72) Inventors: Atsushi Misawa, Saitama (JP); Kentaro Tokiwa, Saitama (JP); Hirofumi Horii, Saitama (JP); Yuichi Fujimura, Saitama (JP); Takeshi Misawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/243,323

(22) Filed: Jan. 9, 2019

(65) Prior Publication Data
US 2019/0146310 A1 May 16, 2019

Related U.S. Application Data

(63) Continuation of application No. PCT/JP2017/018638, filed on May 18, 2017.

(30) Foreign Application Priority Data

Jul. 29, 2016 (JP) ................. 2016-149790

(51) Int. Cl.
*G03B 17/20* (2006.01)
*G03B 17/18* (2006.01)
*G05G 1/08* (2006.01)

(52) U.S. Cl.
CPC ............ *G03B 17/20* (2013.01); *G03B 17/18* (2013.01); *G05G 1/08* (2013.01)

(58) Field of Classification Search
None
See application file for complete search history.

(56) References Cited

U.S. PATENT DOCUMENTS

| 2017/0250037 A1 | 8/2017 | Tanaka et al. |
| 2019/0094659 A1* | 3/2019 | Misawa ............... H01H 19/001 |

(Continued)

FOREIGN PATENT DOCUMENTS

| JP | 7-134320 A | 5/1995 |
| JP | 7-41542 U | 7/1995 |

(Continued)

OTHER PUBLICATIONS

International Preliminary Report on Patentability and English translation of the Written Opinion of the International Searching Authority dated Feb. 7, 2019, for International Application No. PCT/JP2017/018638.

*Primary Examiner* — William B Perkey
(74) *Attorney, Agent, or Firm* — Birch, Stewart, Kolasch & Birch, LLP

(57) ABSTRACT

Provided are a camera capable of preventing an erroneous operation with a compact configuration and has high operability, a setting method of the camera, and a setting program of the camera. A top surface of an operation dial is divided into a plurality of regions. An item to be changed in the setting by the operation dial is set in each divided region. Contact with each divided region is detected, and the setting change of the item set in a region where the contact is detected is validated. In a case where the operation dial is rotationally operated, a setting of the item whose setting change is validated is changed in response to an operation.

20 Claims, 53 Drawing Sheets

(56) References Cited

U.S. PATENT DOCUMENTS

| | | | | |
|---|---|---|---|---|
| 2019/0146310 A1* | 5/2019 | Misawa | ................ | G03B 17/02 |
| 2019/0155129 A1* | 5/2019 | Misawa | ................ | G03B 17/20 |
| 2019/0253628 A1* | 8/2019 | Misawa | ................ | G03B 17/02 |

FOREIGN PATENT DOCUMENTS

| | | |
|---|---|---|
| JP | 2001-143576 A | 5/2001 |
| JP | 2002-277919 A | 9/2002 |
| JP | 2008-165118 A | 7/2008 |
| JP | 2014-202837 A | 10/2014 |
| JP | 2015-125307 A | 7/2015 |
| JP | 2015-146228 A | 8/2015 |
| WO | WO 2016/079930 A1 | 5/2016 |

* cited by examiner

FIG. 20
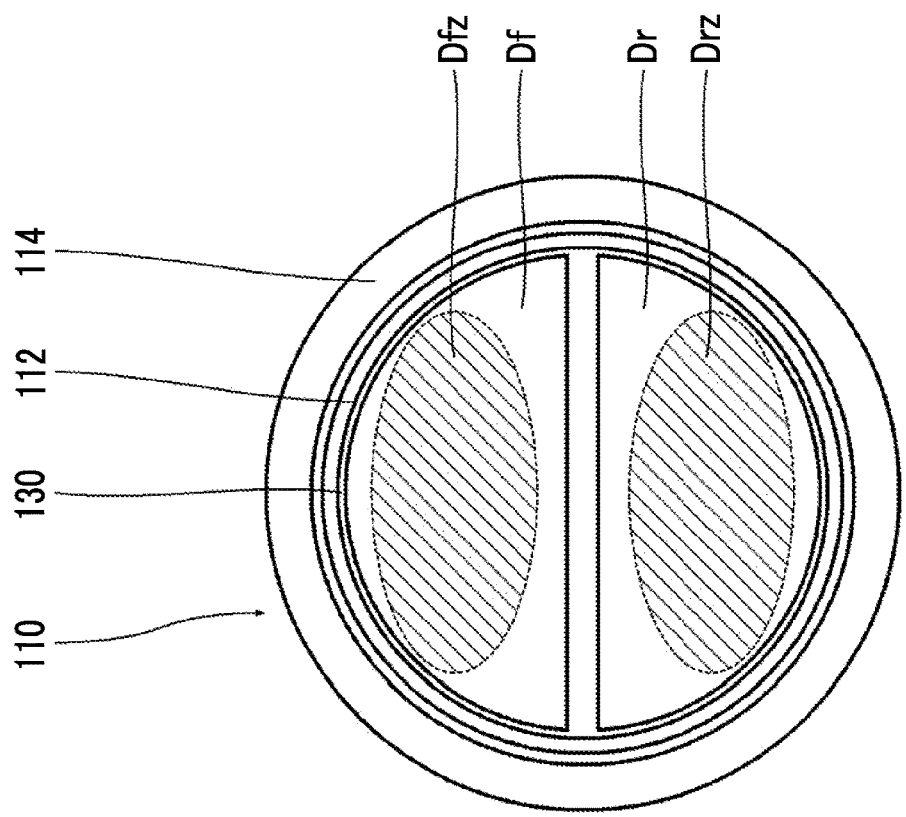
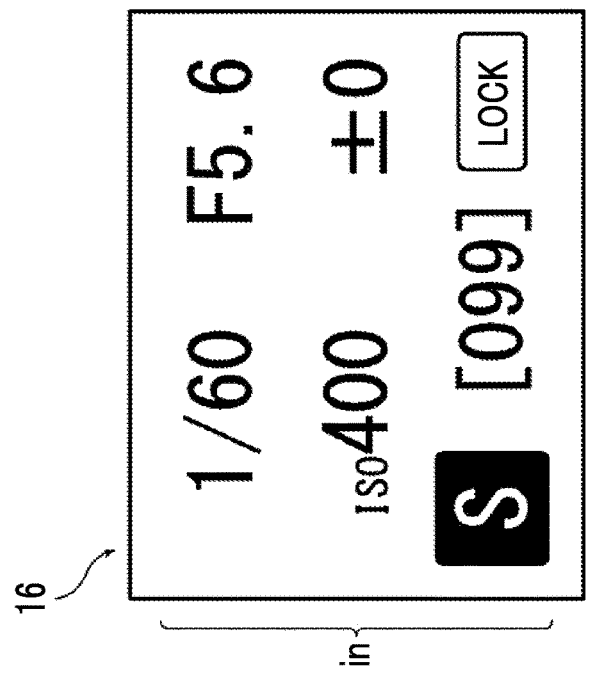

FIG. 40

| IMAGING MODE | ITEM TO BE CHANGED IN SETTING IN CASE WHERE ROTATION OPERATION IS PERFORMED WHILE FRONT REGION IS TOUCHED 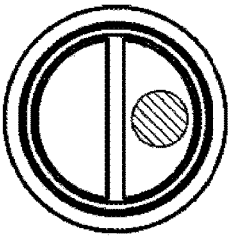 | ITEM TO BE CHANGED IN SETTING IN CASE WHERE ROTATION OPERATION IS PERFORMED WHILE REAR REGION IS TOUCHED 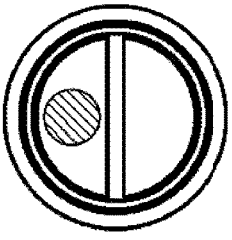 |
|---|---|---|
| AUTO | – | – |
| PROGRAM | PROGRAM SHIFT | PROGRAM SHIFT |
| SHUTTER SPEED PRIORITY | SHUTTER SPEED | EXPOSURE CORRECTION |
| APERTURE STOP PRIORITY | F-NUMBER | EXPOSURE CORRECTION |
| MANUAL | SHUTTER SPEED | F-NUMBER |

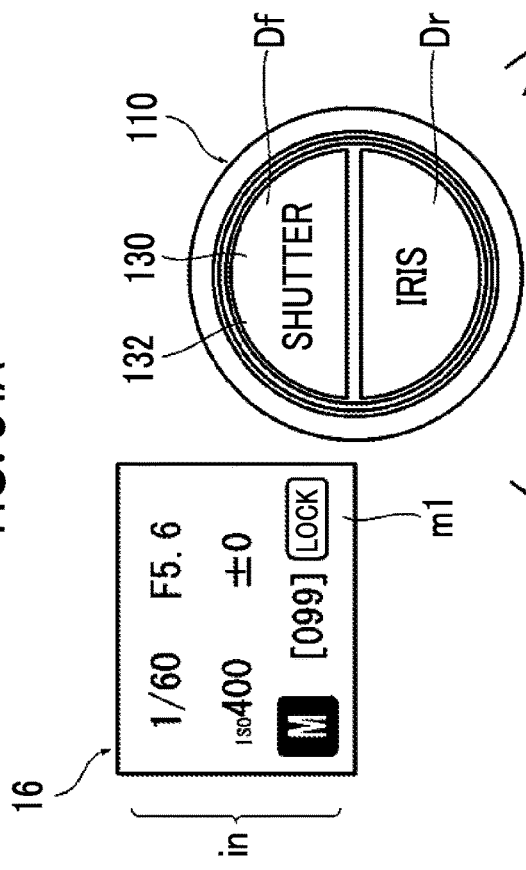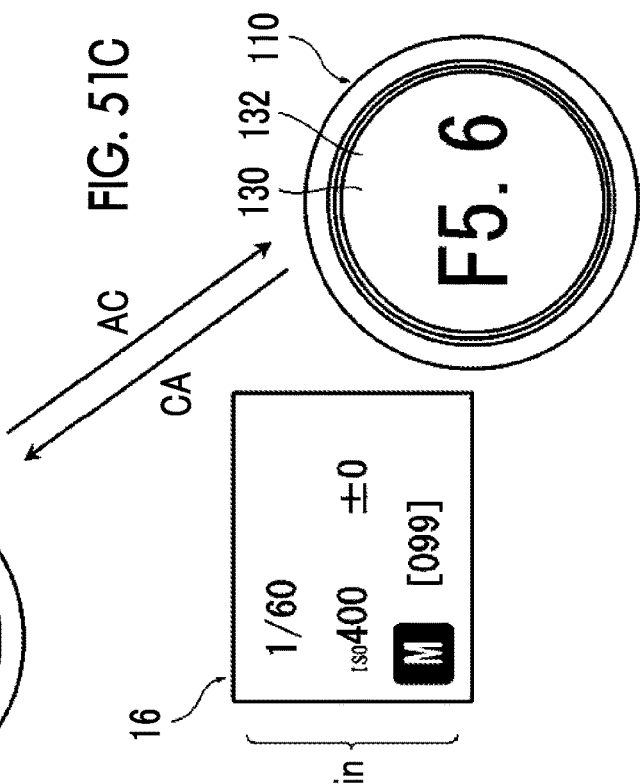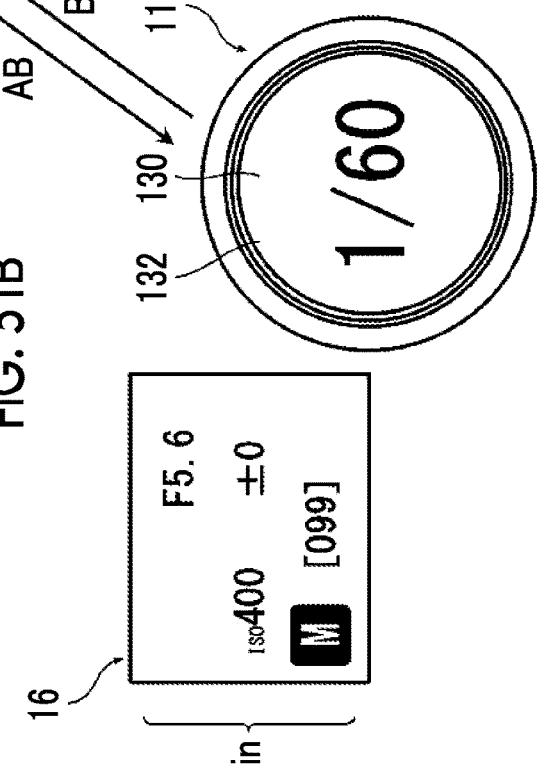

CAMERA, SETTING METHOD OF CAMERA, AND SETTING PROGRAM OF CAMERA

CROSS-REFERENCE TO RELATED APPLICATIONS

This application is a Continuation of PCT International Application No. PCT/JP2017/018638 filed on May 18, 2017, which claims priority under 35 U.S.C. § 119(a) to Japanese Patent Application No. 2016-149790 filed on Jul. 29, 2016. Each of the above application(s) is hereby expressly incorporated by reference, in its entirety, into the present application.

BACKGROUND OF THE INVENTION

1. Field of the Invention

The present invention relates to a camera performing various settings by using a rotary operation dial, a setting method of the camera, and a setting program of the camera.

2. Description of the Related Art

A camera that sets various conditions such as shutter speed, sensitivity, exposure correction value, and mode by using a rotary operation dial is known.

JP2008-165118A discloses an operation dial comprising a display section on a top surface as the rotary operation dial provided in a camera. In this operation dial, a display on the display section can be switched in response to an operation. Further, JP2014-202837A discloses an operation dial comprising a display section and a touch panel on the top surface of the operation dial. In the operation dial, the display on the display section can be switched by a touch operation on the touch panel.

However, there may be a case where the rotary operation dial is rotated unintentionally and thus a setting is changed while a user does not notice.

In order to solve such problems, an operation dial comprising a lock mechanism is proposed. For example, JP1995-134320A (JP-H07-134320A) and JP2015-125307A propose operation dials comprising mechanisms that mechanically lock rotations of shafts.

Further, JP2002-277919A discloses a camera comprising means for prohibiting a change in a setting such that the setting is not changed even in a case where an operation dial is rotationally operated.

SUMMARY OF THE INVENTION

However, in the case where the mechanisms that mechanically lock the rotation of the shafts are provided as disclosed in JP1995-134320A (JP-H07-134320A) and JP2015-125307A, there are disadvantages that structures of the operation dials become complicated. Since an object of the operation dial comprising the display section on the top surface particularly is to simplify the mechanism by digitization so as not to be broken or to lower the cost, there is a disadvantage that the effect of digitization deteriorates in the case where the mechanism that mechanically locks the rotation of the shaft is added.

As disclosed in JP2002-277919A, in the case where the means for prohibiting the change in the setting is provided separately from the operation dial and the change in the setting by the operation dial is prohibited, there is a disadvantage that operability is reduced.

The invention has been made in consideration of the above-mentioned circumstances, and an object of the invention is to provide a camera capable of preventing an erroneous operation with a compact configuration and has high operability, a setting method of the camera, and a setting program of the camera.

Means for achieving the above-mentioned object are as follows.

(1) A camera comprising:
a rotary operation dial;
a plurality of contact detection units that are provided on a top surface of the operation dial, and an item to be set by the operation dial is set for each contact detection unit;
a switching unit that switches between validity and invalidity of a setting change of the item set for each contact detection unit according to a detection result of the contact detection unit; and
a setting change unit that changes a setting of an item whose setting change is valid in response to an operation of the operation dial.

According to the embodiment, the plurality of contact detection units are provided on the top surface of the operation dial. The item to be set by the operation dial is set in each contact detection unit. The setting change of the item set in each contact detection unit can be switched between validity and invalidity according to the detection result of the contact detection unit. In the case where the operation dial is operated, the setting of the item whose setting change is valid is changed. Since the setting change can be switched between validity and invalidity by the contact, it is possible to simplify the configuration of the operation dial. It is possible to set a plurality of items with one operation dial by comprising the plurality of contact detection units.

(2) The camera according to (1), further comprising:
an item setting unit that sets the item to be set by the operation dial for each contact detection unit.

(3) The camera according to (1) or (2),
wherein the switching unit validates the setting change of the item set in the contact detection unit detecting contact while the contact detection unit detects the contact.

(4) The camera according to (3),
wherein an item to be set by the operation dial is set for a specific combination of the contact detection units, and
wherein the switching unit validates the setting change of the item set for the specific combination of the contact detection units in a case where the contact detection units in the specific combination detect the contact.

(5) The camera according to any one of (1) to (4), further comprising:
a display section provided near the operation dial; and
a display control unit that displays the setting value of the item to be set by the operation dial on the display section.

(6) The camera according to (5),
wherein the display control unit displays setting values of all items capable of being set by the operation dial on the display section, and displays a setting value of the item whose setting change is valid and a setting value of an item whose setting change is invalid in a different form.

(7) The camera according to any one of (1) to (6), further comprising:
a dial display section provided on the top surface of the operation dial; and
a dial display control unit that displays information on the item set in the contact detection unit on the dial display section in association with a disposition of the contact detection unit.

(8) The camera according to (7),
wherein the dial display control unit displays information on the item whose setting change is valid and information on the item whose setting change is invalid in a different form.

(9) The camera according to (1) or (2),
wherein the switching unit switches the item whose setting change is validated to the item set in the contact detection unit that has detected the contact every time the contact detection unit detects the contact.

(10) The camera according to (9),
wherein in a case where the same contact detection unit continuously detects the contact, the switching unit switches alternately between invalidity and validity of the setting change every time the contact is detected.

(11) The camera according to (9) or (10),
wherein an item to be set by the operation dial is set for a specific combination of the contact detection units, and
wherein the switching unit validates the setting change of the item set for the specific combination of the contact detection units in a case where the contact detection units in the specific combination detect the contact.

(12) The camera according to any one of (9) to (11), further comprising:
a display section provided near the operation dial; and
a display control unit that displays the setting value of the item to be set by the operation dial on the display section.

(13) The camera according to (12),
wherein the display control unit displays setting values of all items capable of being set by the operation dial on the display section, and displays a setting value of the item whose setting change is valid and a setting value of an item whose setting change is invalid in a different form.

(14) The camera according to any one of (9) to (13), further comprising:
a dial display section provided on the top surface of the operation dial; and
a dial display control unit that displays information on the item set in the contact detection unit on the dial display section in association with a disposition of the contact detection unit.

(15) The camera according to (14),
wherein the dial display control unit displays information on the item whose setting change is valid and information on the item whose setting change is invalid in a different form.

(16) The camera according to (5) or (12),
wherein the operation dial and the display section are disposed on a top surface of a camera body.

(17) The camera according to (16),
wherein the operation dial is disposed at an end portion on the grip portion side of the camera body.

(18) A setting method of a camera comprising:
setting an item to be set by the operation dial for each of a plurality of contact detection units provided on a top surface of a rotary operation dial;
validating a setting change of the item set in the contact detection unit detecting contact while the contact detection unit detects the contact; and
changing a setting of an item whose setting change is valid in response to an operation of the operation dial.

According to the embodiment, the plurality of contact detection units are provided on the top surface of the operation dial, and the operation by the operation dial is validated only while the contact detection unit detects the contact. Accordingly, it is possible to easily lock and unlock the operation dial. Further, the item capable of being set by the operation dial is set in each contact detection unit, and the setting change of the item set in the contact detection unit that detects the contact is validated. Accordingly, it is possible to set the plurality of items with one operation dial.

(19) A setting method of a camera comprising:
setting an item to be set by the operation dial for each of a plurality of contact detection units provided on a top surface of a rotary operation dial;
switching an item whose setting change is validated to an item set in the contact detection unit that has detected contact every time the contact detection unit detects the contact; and
changing a setting of the item whose setting change is valid in response to an operation of the operation dial.

According to the embodiment, the plurality of contact detection units are provided on the top surface of the operation dial, and the item capable of being changed in the setting by the operation dial can be switched every time the contact detection unit detects the contact. Accordingly, it is possible to set the plurality of items with one operation dial.

(20) A setting program of a camera causing a computer to realize:
a function of setting an item to be set by the operation dial for each of a plurality of contact detection units provided on a top surface of a rotary operation dial;
a function of determining presence or absence of contact for each contact detection unit based on an output from the contact detection unit;
a function of validating a setting change of the item set in the contact detection unit detecting contact while the contact detection unit detects the contact; and
a function of changing a setting of an item whose setting change is valid in response to an operation of the operation dial.

According to the embodiment, the plurality of contact detection units are provided on the top surface of the operation dial, and the operation by the operation dial is validated only while the contact detection unit detects the contact. Accordingly, it is possible to easily lock and unlock the operation dial. Further, the item capable of being set by the operation dial is set in each contact detection unit, and the setting change of the item set in the contact detection unit that detects the contact is validated. Accordingly, it is possible to set the plurality of items with one operation dial.

(21) A setting program of a camera causing a computer to realize:
a function of setting an item to be set by the operation dial for each of a plurality of contact detection units provided on a top surface of a rotary operation dial;
a function of determining presence or absence of contact for each contact detection unit based on an output from the contact detection unit;
a function of switching an item whose setting change is validated to an item set in the contact detection unit that has detected contact every time the contact detection unit detects the contact; and
a function of changing a setting of the item whose setting change is valid in response to an operation of the operation dial.

According to the embodiment, the plurality of contact detection units are provided on the top surface of the operation dial, and the item capable of being changed in the setting by the operation dial can be switched every time the contact detection unit detects the contact. Accordingly, it is possible to set the plurality of items with one operation dial.

According to the invention, it is possible to provide the camera that is capable of preventing the erroneous operation with the compact configuration and has high operability.

BRIEF DESCRIPTION OF THE DRAWINGS

FIG. 20 is an enlarged diagram of main parts of a digital camera of a second embodiment.
FIG. 40 is a table representing a relationship between the imaging mode and an item to be changed in the setting by the operation dial.
FIG. 51A, FIG. 51B, and FIG. 51C are diagrams showing modification examples of the display in the case where the setting value of the item whose setting change is validated is displayed on the dial-display.

DESCRIPTION OF THE PREFERRED EMBODIMENTS

A preferred embodiment of the invention will be described in detail below with reference to accompanying drawings.

First Embodiment

[Appearance]

Figure 1:
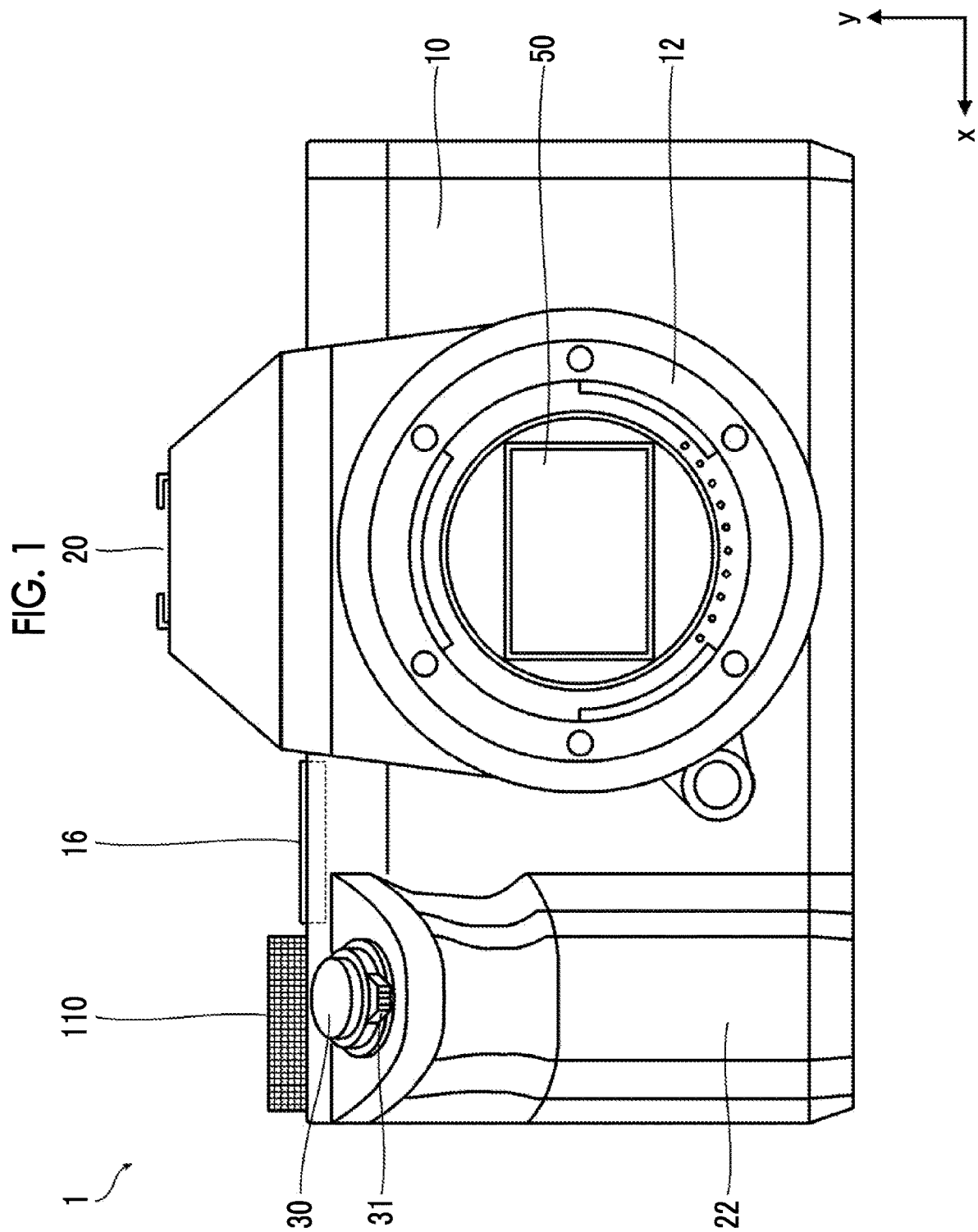
FIG. 1 is a front view of a digital camera.
Figure 2:
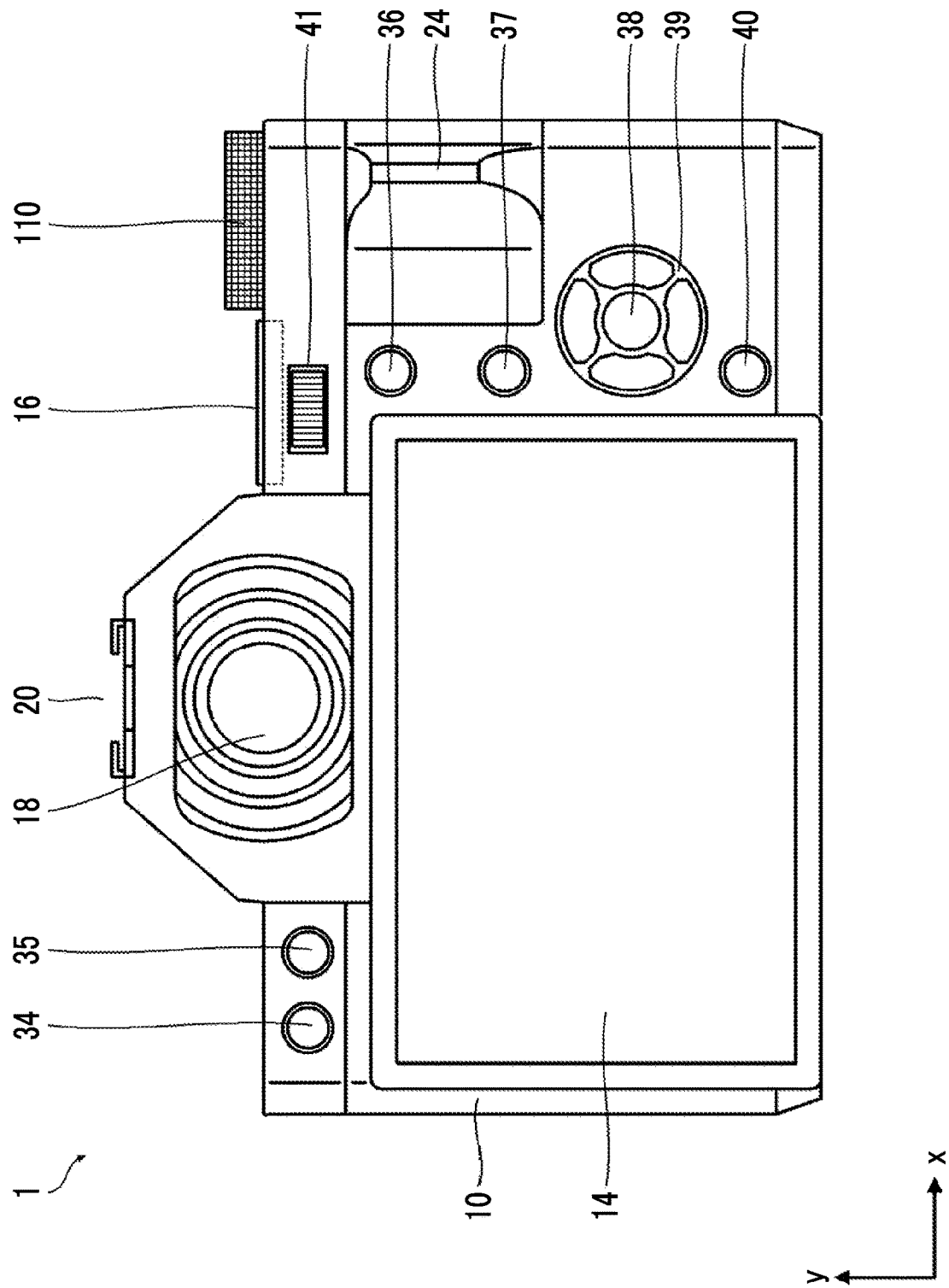
FIG. 2 is a back view of the digital camera.
Figure 3:
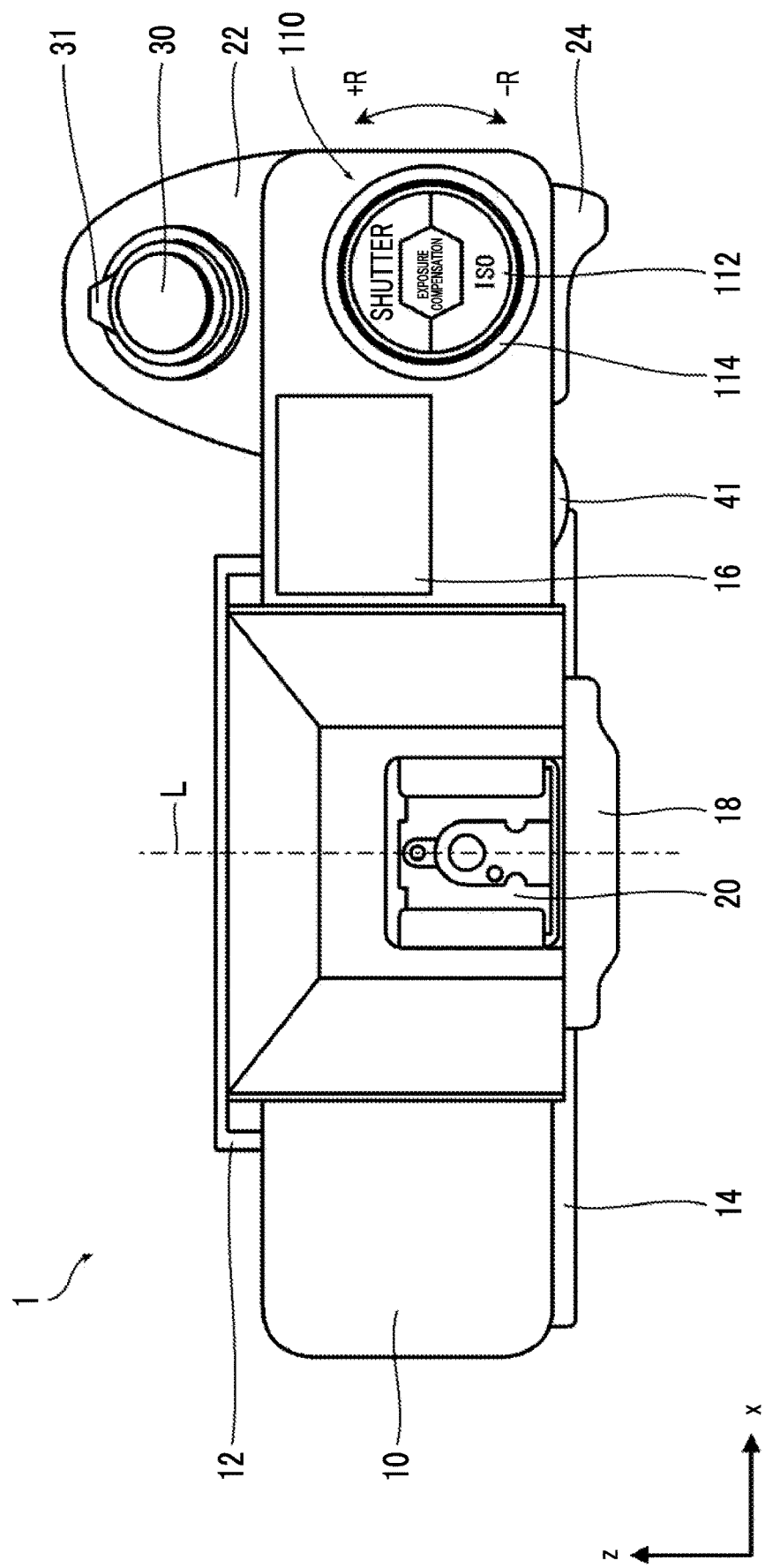
FIG. 3 is a plan view of the digital camera.

FIGS. 1, 2, and 3 are a front view, a back view, and a plan view, respectively, showing an example of a digital camera to which the invention is applied.

In this specification, a direction along an optical axis L (a z direction in FIG. 3) is referred to as a front-rear direction and a subject side is referred to as a front direction. Further, on a plane orthogonal to the optical axis L, a direction along a long side of an image sensor 50 (an x direction in FIG. 1) is referred to as a lateral direction or a left-right direction and a direction along a short side of the image sensor 50 (a y direction in FIG. 1) is referred to as a vertical direction or an up-down direction.

A digital camera 1 of this embodiment is a lens-interchangeable digital camera, and is a non-reflex digital camera. The lens-interchangeable digital camera is a digital camera of which a lens can be interchanged. The non-reflex digital camera is a digital camera not including a reflex mirror for guiding incident light from a lens to an optical viewfinder, and is also referred to as a mirrorless digital camera.

Figure 4:
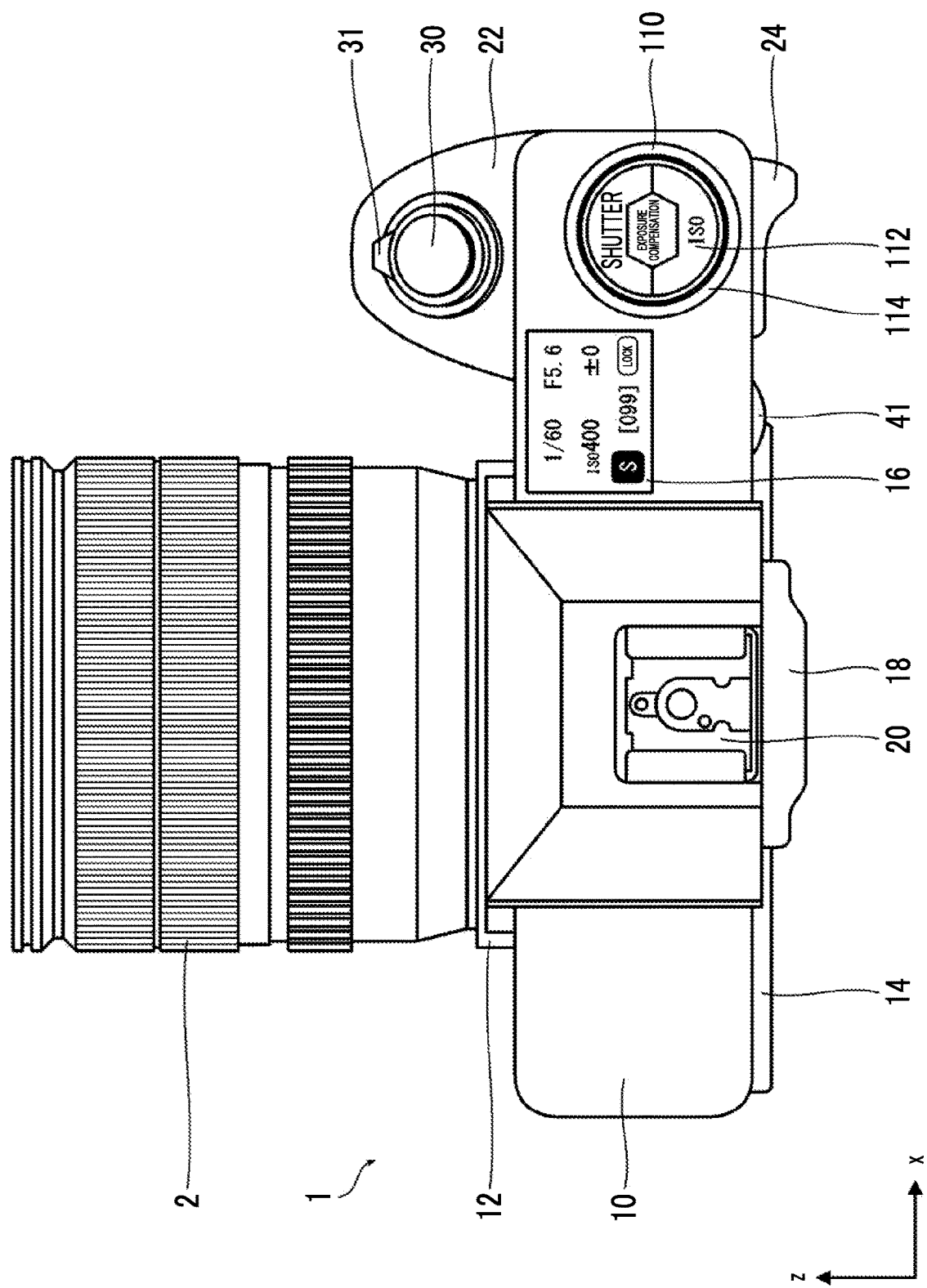
FIG. 4 is a plan view of the digital camera on which a lens is mounted.

FIG. 4 is a plan view of the digital camera on which a lens is mounted. As shown in FIG. 4, the digital camera 1 of this embodiment is used in a state in which a lens 2 is mounted on a camera body 10.

As shown in FIGS. 1 to 4, the camera body 10 is provided with a lens mount 12, a main-display 14, a sub-display 16, an electronic view finder 18, a hot shoe 20, and the like. Further, a shutter button 30, a power supply lever 31, a playback button 34, a delete button 35, an AF lock button 36, an AE lock button 37, a menu button 38, selector buttons 39, a BACK button 40, a rear command dial 41, an operation dial 110, and the like are provided as operation members.

«Camera Body»

The camera body 10 has the shape of a rectangular box that is thin in the front-rear direction. One (left side in FIG. 1) end portion of the camera body 10 is formed as a grip portion. A user grips the grip portion to perform a release operation. The grip portion is provided with a grip 22 on the front surface side and a thumb rest 24 on the back surface side.

«Lens Mount»

The lens mount 12 is a mounting portion for the lens 2. As shown in FIG. 1, the lens mount 12 is provided on the front surface of the camera body 10. The lens 2 is mounted on the lens mount 12 attachably and detachably. The lens mount 12 is formed of a bayonet type.

«Main-Display»

The main-display 14 is a display mainly used for the display of an image. As shown in FIG. 2, the main-display 14 is provided on the back surface of the camera body 10. The main-display 14 is formed of, for example, a color liquid crystal display (LCD).

As described above, the main-display 14 is mainly used for the display of the image. The image to be displayed includes a live view image in addition to an imaged image. The live view is a function of displaying an image captured by an image sensor in real time. It is possible to confirm the angle of view, a focus state, and the like on the main-display by performing the live view.

Further, the main-display 14 is also used as a graphical user interface (GUI). That is, in a case where various settings are performed, a setting screen is displayed on the main-display 14 and the various settings are performed on the setting screen.

«Sub-Display»

The sub-display 16 is an example of a display section. The sub-display 16 is formed of a display device having a small screen as compared with the main-display 14. As shown in FIG. 3, the sub-display 16 is provided on a top surface of the camera body 10. The sub-display 16 is formed of, for example, a reflective LCD comprising illumination. The sub-display 16 has a rectangular display surface, and the short side thereof is disposed in parallel to the optical axis L. More specifically, the short side thereof is disposed along the front-rear direction (z direction), and the long side thereof is disposed along the lateral direction (x direction).

The sub-display 16 displays mainly setting contents of the digital camera 1. Information displayed on the sub-display 16 includes at least information on a setting value of an item to be set by the operation dial 110. This point will be described below in detail.

«Electronic View Finder»

The electronic view finder (EVF) 18 is an electronic finder in which the LCD is built. As shown in FIG. 2, the electronic view finder 18 is provided on the upper part of the camera body 10 (so-called warship part), and an eyepiece part is provided on the back surface.

«Hot Shoe»

The hot shoe 20 is a mounting portion of an external flash. As shown in FIG. 3, the hot shoe 20 is provided on the top surface of the camera body 10.

«Operation Member»

The camera body 10 is provided with the shutter button 30, the power supply lever 31, the playback button 34, the delete button 35, the AF lock button 36, the AE lock button 37, the menu button 38, the selector buttons 39, the BACK button 40, the rear command dial 41, the operation dial 110, and the like as the operation members.

<Shutter Button>

The shutter button 30 is provided on the top surface (upper surface) of the camera body 10 and disposed on a grip portion side. The shutter button 30 is formed of a so-called two-stage switch that has a half-pressed stage and a fully-pressed stage. In a case where the shutter button 30 is half pressed, imaging preparations, that is, AE and AF are executed. In a case where the shutter button 30 is fully pressed, main imaging, that is, imaging for recording is implemented. The AE is an abbreviation of automatic exposure and refers to a function that the camera automatically measures the brightness of a subject and decides proper exposure. Further, the AF is an abbreviation of automatic focus and refers to a function that the camera automatically measures a distance to the subject and focuses on the subject.

<Power Supply Lever>

The power supply lever 31 is disposed coaxially with the shutter button 30. The power supply lever 31 is formed of a rotary lever. In a case where the power supply lever 31 is rotated to an ON position, a power supply of the digital camera 1 is turned on. In a case where the power supply lever 31 is rotated to an OFF position, the power supply of the digital camera 1 is turned off.

<Playback Button>

The playback button 34 is a button that switches a mode of the digital camera 1 to a playback mode. The playback button 34 is provided on the back surface of the camera body 10 and disposed above the main-display 14. In a case where the playback button 34 is pressed in a state where the mode of the digital camera 1 is set to the imaging mode, the mode of the digital camera 1 is switched to the playback mode. In the case where the playback mode is set, the last captured image is displayed on the main-display 14.

A function of switching from the playback mode to the imaging mode is assigned to the shutter button 30. In a case where the shutter button 30 is pressed in a state where the playback mode is set, the mode of the digital camera 1 is switched to the imaging mode.

<Delete Button>

The delete button 35 is a button that performs an instruction to delete the imaged image displayed on the main-display 14. The delete button 35 is provided on the back surface of the camera body 10 and disposed above the main-display 14. In a case where the delete button 35 is pressed in a state where the imaged image is displayed on the main-display 14, a screen that confirms the deletion is displayed on the main-display 14. In a case where the execution of the deletion is instructed according to the display on the main-display 14, the imaged image during playback is deleted from a memory card.

<AF Lock Button>

The AF lock button 36 is a button that performs an instruction to lock the focus. As shown in FIG. 2, the AF lock button 36 is provided on the back surface of the camera body 10 and disposed near a thumb rest 24. In a case where the AF lock button 36 is pressed, the focus is locked.

<AE Lock Button>

The AE lock button 37 is a button that performs an instruction to lock the exposure. As shown in FIG. 2, the AE lock button 37 is provided on the back surface of the camera body 10 and disposed near the thumb rest 24. In a case where the AE lock button 37 is pressed, the exposure is locked.

<Menu Button>

The menu button 38 is a button that calls a menu screen on the main-display 14. The menu button 38 is provided on the back surface of the camera body 10. In a case where the menu button 38 is pressed in a state where the imaging mode or the playback mode is set, the menu screen is displayed on the main-display 14.

The menu button 38 functions also as an OK button and is used in a case of instructing OK for a selection item, a confirmation item, or the like.

<Selector Button>

The selector button 39 is formed of four buttons of up, down, left, and right disposed on the same circle with the menu button 38 as the center. A function according to a setting situation of the digital camera 1 is assigned to each button. For example, in the case where the digital camera 1 is set to the playback mode, in FIG. 2, a function of one-frame advance is assigned to the button in the right direction, and a function of one-frame return is assigned to the button in the left direction. A function of zoom-in is assigned to the button in the upper direction, and a function of zoom-out is assigned to the button in the lower direction. In the case where the digital camera 1 is set to the imaging mode, in FIG. 2, a function of calling the setting screen of white balance is assigned to the button in the right direction, and a function of calling the setting screen of the self-timer is assigned to the button in the left direction. A function of calling the setting screen of an AF mode is assigned to the button in the upper direction, and a function of calling the setting screen of a consecutive imaging mode is assigned to the button in the lower direction. Furthermore, in a case where the various setting screens are called on the main-display 14, the four buttons function as buttons that move a cursor in each direction on the screens.

<BACK Button>

The BACK button 40 is a button that performs an instruction to return the display on the main-display 14 to one previous state. The BACK button 40 is provided on the back surface of the camera body 10. In a case where the BACK button 40 is pressed in a state where various setting screens are displayed on the main-display 14, the display on the main-display 14 is returned to one previous state. Accordingly, it is possible to cancel the selection item, the confirmation item, or the like.

Further, the BACK button 40 functions as a button that performs an instruction to switch the display form of the main-display 14. In the state where the playback mode or the imaging mode is set, the BACK button 40 is pressed, the display form of the main-display 14 is switched. For example, in a case where the BACK button 40 is pressed in the state where the playback mode is set, an imaging condition, histogram, and the like of an image displayed on the main-display 14 are displayed on the image in an overlapped manner. For example, in a case where the BACK button 40 is pressed in the state where the imaging mode is set, various pieces of information such as the imaging condition or the histogram are displayed on the live view image in an overlapped manner.

<Rear Command Dial>

The rear command dial 41 is rotatably supported in the camera body, and a part of the outer periphery thereof is provided so as to be exposed on the back surface of the camera body 10. In particular, in the digital camera 1 of the embodiment, the rear command dial 41 is disposed at a position operable with the thumb of a hand gripping the camera body 10. Various functions are assigned to the rear command dial 41 according to a setting state of the digital camera 1.

<Operation Dial>

The operation dial 110 is an example of a rotary operation dial and is used for the setting of the digital camera 1. In particular, in the digital camera 1 of the embodiment, the operation dial 110 is used for the settings of the shutter speed, the exposure correction value, and international organization for standardization sensitivity (ISO).

The operation dial 110 is provided on the top surface of the camera body 10. In particular, in the digital camera 1 of the embodiment, the operation dial 110 is provided at an end portion on the grip portion side. Accordingly, it is possible to operate the operation dial 110 with a finger of the hand gripping the camera body 10.

The operation dial 110 has a disc shape as a whole. The operation dial 110 is mainly formed of an inner peripheral part 112 and an outer peripheral part 114. The inner peripheral part 112 has the disc shape and is fixedly provided. The outer peripheral part 114 has a ring shape and is provided rotatably around the outer periphery of the inner peripheral part 112. In the case of operating the operation dial 110, the operation dial 110 is operated by rotating the outer peripheral part 114.

The operation by the operation dial 110 becomes valid only in a case where the outer peripheral part 114 is rotationally operated while an upper-end surface (top surface) of the inner peripheral part 112 is touched. That is, the setting change becomes possible only in the case where the outer peripheral part 114 is rotationally operated while the upper-end surface of the inner peripheral part 112 is touched.

Further, the item to be set by operation dial 110 is set by a position touched by the finger. That is, the item that can be set differs depending on the position touched by the finger. In the digital camera 1 of the embodiment, the item that can be set differs depending on a case where the finger touches the front side of the top surface, a case where the finger touches the center thereof, and a case where the finger touches the rear side thereof. Specifically, in the case where the front side portion of the top surface is touched, the setting change of the shutter speed is possible. Further, in the case where the center portion thereof is touched, the setting change of the exposure correction value is possible. Further, in the case where the rear side thereof is touched, the setting change of the ISO sensitivity is possible. This point will be described below in detail.

Figure 5:
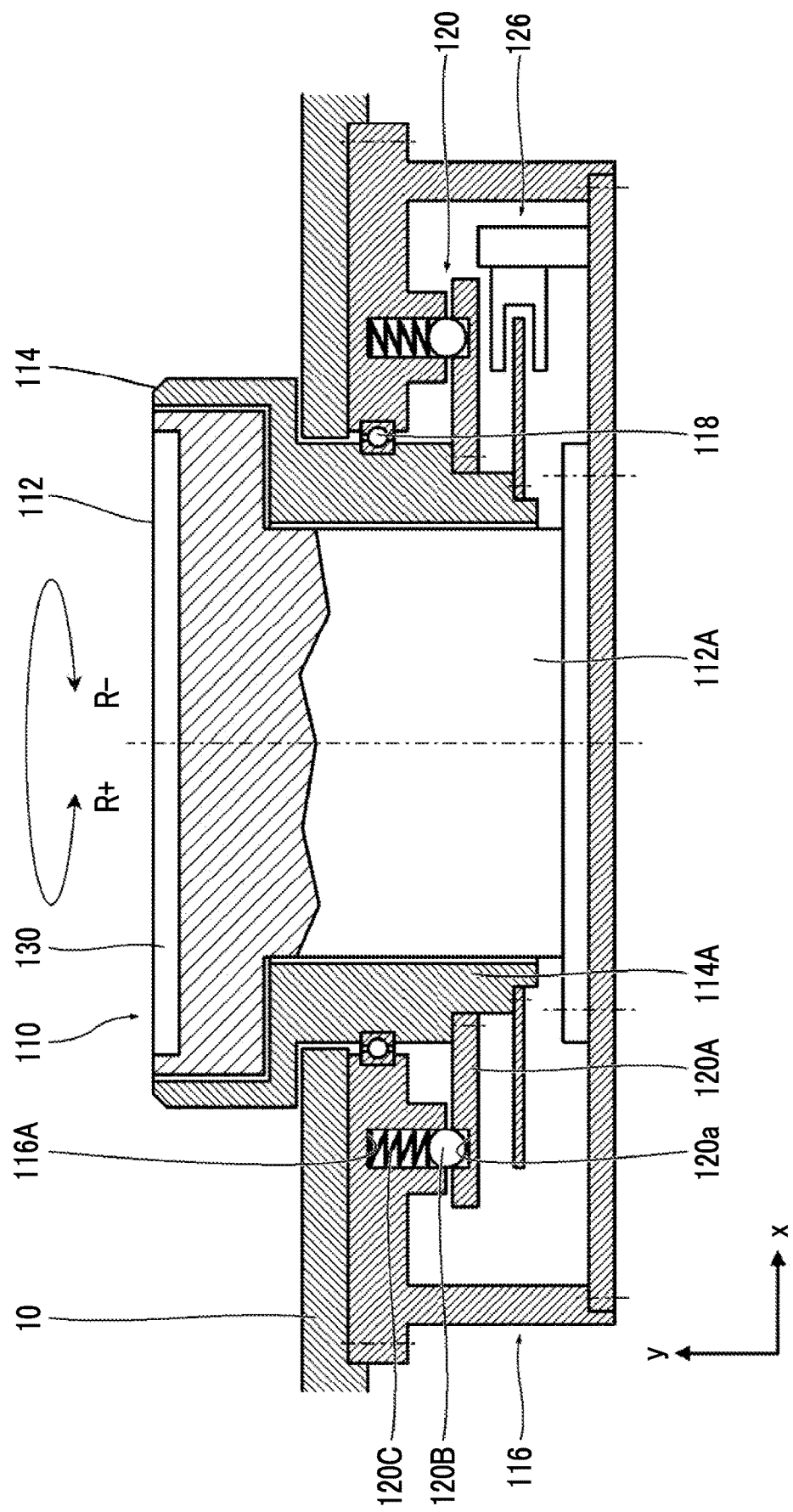
FIG. 5 is a longitudinal cross section view showing the schematic configuration of an operation dial.
Figure 6:
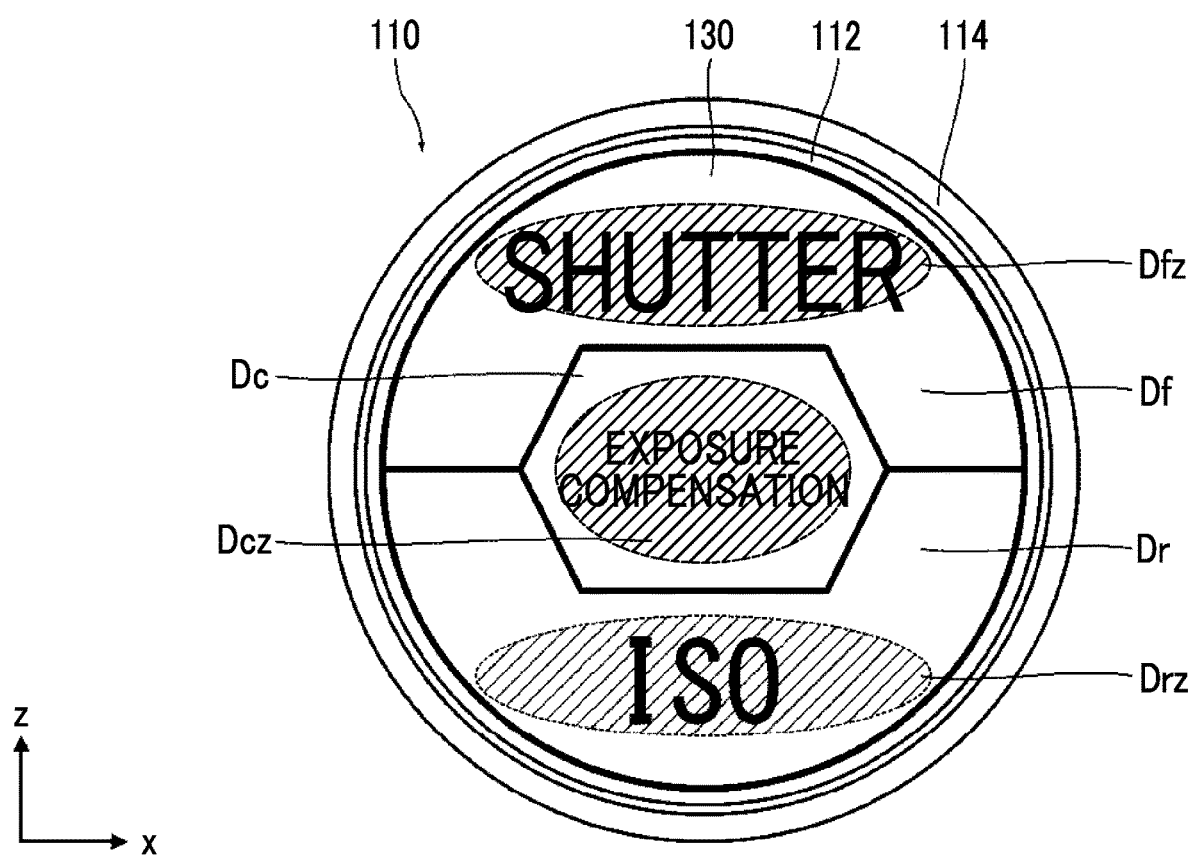
FIG. 6 is a plan view showing the schematic configuration of the operation dial.

FIG. 5 is a longitudinal cross section view showing the schematic configuration of the operation dial 110. FIG. 6 is a plan view showing the schematic configuration of the operation dial 110.

As shown in FIG. 5, the operation dial 110 is assembled to the camera body 10 through an operation dial support frame 116.

The inner peripheral part 112 has a columnar support part 112A on the coaxially lower portion, and the support part 112A is fixed to the operation dial support frame 116. The upper-end surface of the inner peripheral part 112 forms the top surface of the operation dial 110.

A touch sensor 130 is provided on the upper-end surface (top surface) of the inner peripheral part 112. The touch sensor 130 detects contact of the finger with the top surface of the operation dial 110.

Here, the top surface of the operation dial 110 is divided into three regions of a front region Df, a center region Dc, and a rear region Dr as shown in FIG. 6.

The center region Dc is a region that is set at the center of the top surface of the operation dial 110. The center region Dc is set at the center of the top surface of the operation dial 110 as a hexagonal region.

The front region Df is set as a region on the front side (subject side) in a case where the top surface of the operation dial 110 except for the center region Dc is divided into two in the front-rear direction.

The rear region Dr is set as a region on the rear side (image plane side) in the case where the top surface of the operation dial 110 except for the center region Dc is divided into two in the front-rear direction.

A contact detection region is set in each of the front region Df, the center region Dc, and the rear region Dr. The contact detection region is a region that detects the contact of the finger in each region of the front region Df, the center region Dc, and the rear region Dr. In FIG. 6, a hatched region is the contact detection region that is set in each region of the front region Df, the center region Dc, and the rear region Dr.

The contact detection region of each region is set within each region as an elliptical region. A contact detection region Dcz of the center region Dc is set at the center portion of the center region Dc. A contact detection region Dfz of the front region Df and the contact detection region Drz of the rear region Dr are symmetrically set in the front-rear direction with the center region Dc as the center. A certain gap is set between the contact detection region Dfz set in the front region Df and the contact detection region Dcz set in the center region Dc in order to prevent an erroneous detection. Similarly, a certain gap is set between the contact detection region Drz set in the rear region Dr and the contact detection region Dcz set in the center region Dc in order to prevent the erroneous detection.

The touch sensor 130 detects the contact with the contact detection regions Dfz, Dcz, and Drz set in each region of the front region Df, the center region Dc, and the rear region Dr. Therefore, in the digital camera 1 of the embodiment, the touch sensor 130 functions as a plurality of contact detection units.

As described above, in the digital camera 1 of the embodiment, in the case where the front side portion of the top surface is touched, the setting change of the shutter speed becomes possible. Further, in the case where the center portion thereof is touched, the setting change of the exposure correction value becomes possible. Further, in the case where the rear side portion thereof is touched, the setting change of the ISO sensitivity becomes possible.

As shown in FIG. 6, in a case where the operation is performed while the front region Df is touched, a character of "SHUTTER" is printed in the front region Df for indicating that the setting change of the shutter speed is possible. Further, in the case where the operation is performed while the center region Dc is touched, a character of "EXPOSURE COMPENSATION" is printed in the center region Dc for indicating that the setting change of the exposure correction value is possible. Further, in the case where the operation is performed while the rear region Dr is touched, a character of "ISO" is printed in the rear region Dr for indicating that the setting change of the ISO sensitivity is possible.

The outer peripheral part 114 has a cylindrical shaft portion 114A on the coaxially lower portion, and the shaft portion 114A is rotatably supported by the operation dial support frame 116 through bearings 118.

The outer peripheral part 114 is supported so as to be rotatable in normal and reverse directions. In FIGS. 3 and 5, an arrow direction (counterclockwise rotation direction) indicated by a reference numeral R+ is referred to as a plus rotation direction, and an arrow direction (clockwise rotation direction) indicated by a reference numeral R− is referred to as a minus rotation direction.

A click mechanism 120 is provided in the operation dial support frame 116. The click mechanism 120 generates a click feeling in the rotation of the outer peripheral part 114 of the operation dial 110.

The click mechanism 120 comprises a click groove-metal plate 120A, click balls 120B, and click springs 120C.

The click groove-metal plate 120A has the disc shape that comprises a circular hole at the center thereof. The click groove-metal plate 120A is fixed to the shaft portion 114A of the outer peripheral part 114 by passing the shaft portion 114A of the outer peripheral part 114 through the center hole thereof. The click groove-metal plate 120A is disposed coaxially with the outer peripheral part 114 and rotates together with the outer peripheral part 114.

The click groove-metal plate 120A is provided with a plurality of click grooves 120*a* that are formed on the same circumference at regular intervals. The click grooves 120*a* are provided on the upper surface of the click groove-metal plate 120A as spherical depressions. The disposition interval of the click grooves 120*a* is an interval that generates the click feeling.

The click balls 120B are members that are fitted to the click grooves 120*a* and generate the click feelings. The click balls 120B are provided in the operation dial support frame 116. The operation dial support frame 116 comprises click ball-receiving holes 116A that receive the click balls 120B. The click ball-receiving holes 116A are provided parallel to the rotation axis of the outer peripheral part 114 as bottom holes. Further, the click ball-receiving holes 116A are provided at positions facing the click grooves 120a.

The click springs 120C are members that bias the click balls 120B to the click groove-metal plate 120A. The click springs 120C are received in the click ball-receiving holes 116A.

The action of the click mechanism 120 having the above-mentioned configuration is as follows.

In a case where the outer peripheral part 114 of the operation dial 110 is rotated, the click groove-metal plate 120A is rotated. In a case where the click groove-metal plate 120A is rotated, the click balls 120B are fitted to the click grooves 120a at regular angular intervals. Accordingly, the click feelings are generated at regular angular intervals.

Further, in a case where the rotation of the click groove-metal plate 120A is stopped at the time of generation of the click feeling, the click balls 120B are fitted to the click grooves 120a. Accordingly, the rotation of the click groove-metal plate 120A is stopped. That is, as long as the click groove-metal plate 120A is not rotated with a load equal to or larger than a certain level, a stop state of the click groove-metal plate 120A is maintained. The state where the click balls 120B are fitted to the click grooves 120a and the rotation of the click groove-metal plate 120A is stopped is referred to as click-stop.

In a case where a click-stop position is referred to as a click position, the number of click positions is the same as the number of click grooves 120a. The intervals of the click positions are also the same as the intervals of the click grooves 120a. For example, in a case where the number of click positions per rotation is 10, the disposition interval of the click grooves 120a becomes 36°. In this case, in a case where the outer peripheral part 114 is rotationally operated, the click feeling is generated at 36° interval. Further, it is possible to perform the click-stop at 36° interval.

The rotation of the outer peripheral part 114 of the operation dial 110 is detected by a rotation detection unit 126. The rotation detection unit 126 detects the rotation direction and a rotation amount of the outer peripheral part 114 of the operation dial 110. The rotation detection unit 126 is formed of a rotary encoder and detects the rotation of the outer peripheral part 114 of the operation dial 110 to detect the rotation direction and the rotation amount of the operation dial 110.

For example, in the case where the number of click positions per rotation is 10, it is possible to detect that the operation dial 110 is rotationally operated by one click in the plus direction R+ by detecting rotation by 36° in the plus direction R+.

As described above, the sub-display 16 displays the setting value of the item to be set by operating the operation dial 110. The sub-display 16 is provided near the operation dial 110 on the top surface of the camera body 10. In particular, in the digital camera 1 of the embodiment, the sub-display 16 is disposed at a position on the left oblique front side of the operation dial 110 in plan view as shown in FIG. 3. Accordingly, it is possible to prevent the display on the sub-display 16 from being hidden by the finger of the hand that operates the operation dial 110.

[Control System]

Figure 7:
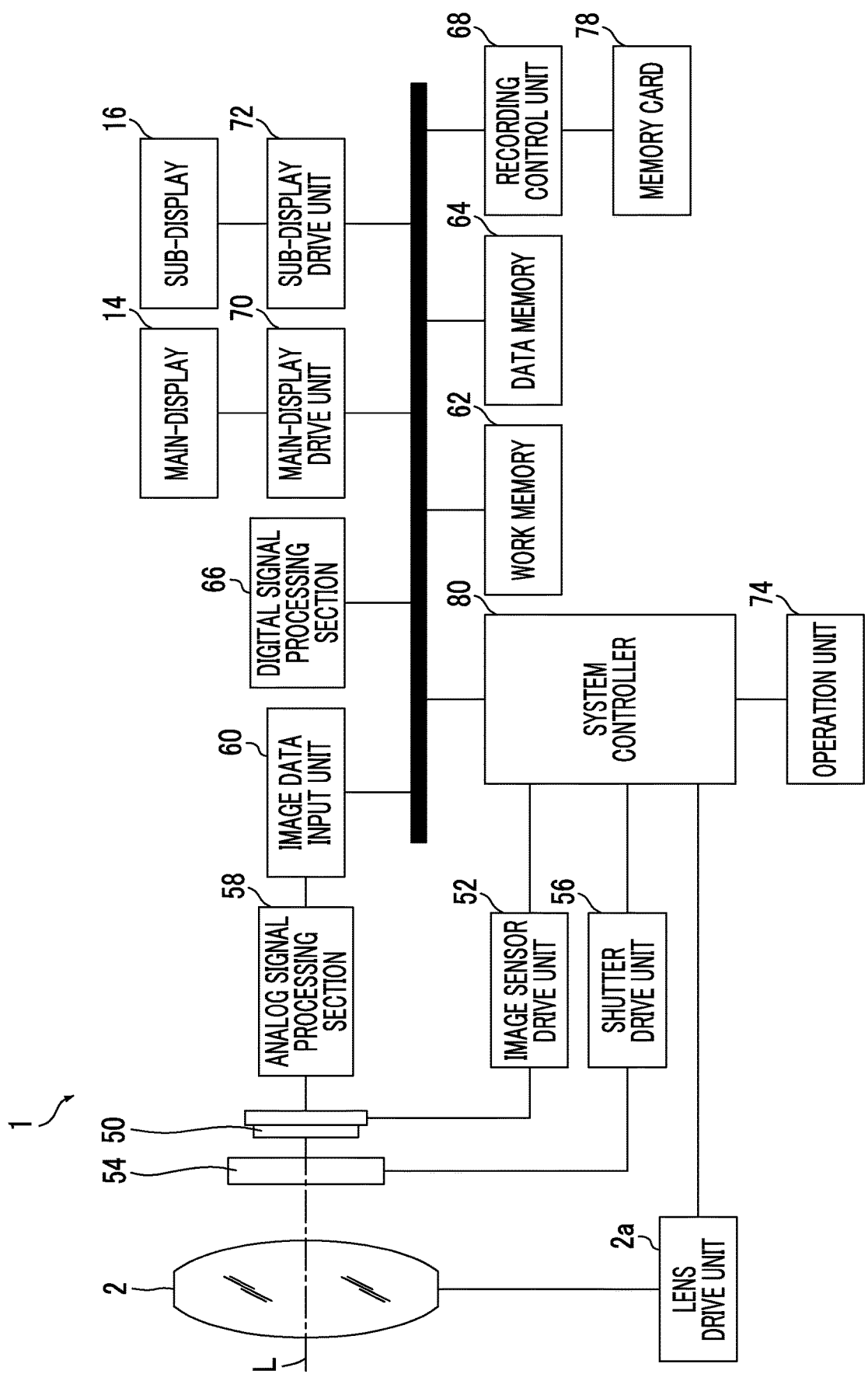
FIG. 7 is a block diagram showing the schematic configuration of a control system of the digital camera.

FIG. 7 is a block diagram showing the schematic configuration of a control system of the digital camera.

The digital camera 1 includes an image sensor 50, an image sensor drive unit 52, a shutter 54, a shutter drive unit 56, an analog signal processing section 58, an image data input unit 60, a work memory 62, a data memory 64, a digital signal processing section 66, a recording control unit 68, a main-display drive unit 70, a sub-display drive unit 72, an operation unit 74, a system controller 80, and the like.

The image sensor 50 converts an optical image of a subject, which is formed through the lens 2, into electrical signals and outputs the electrical signals. A publicly known image sensor, such as a charged coupled device (CCD) image sensor or a complementary metal oxide semiconductor (CMOS) image sensor, is used as the image sensor 50.

The image sensor drive unit 52 drives the image sensor 50 according to a command output from the system controller 80.

The shutter 54 is formed of a square type focal-plane shutter and is disposed directly in front of the image sensor 50. FIG. 1 shows a state where the shutter is fully opened.

The shutter drive unit 56 drives the shutter 54 according to a command output from the system controller 80.

The analog signal processing section 58 receives the signals output from the image sensor 50 and performs required signal processing, such as correlative double sampling processing and amplification processing. Further, the analog signal processing section 58 converts analog image signals subjected to the required signal processing into digital image signals and outputs the digital image signals.

The image data input unit 60 receives the digital image signals to be output from the analog signal processing section 58, according to a command output from the system controller 80. Received image data corresponding to one sheet is stored in the work memory 62.

The work memory 62 is used as a memory for work. The data memory 64 is formed of a non-volatile memory, such as electrically erasable programmable read only memory (EEPROM), and data required for control and the like are stored in the data memory 64.

The digital signal processing section 66 performs required signal processing, such as demosaicing processing, white balance correction, gamma correction, and outline correction, on the image data received in the work memory 62, and generates predetermined image data formed of brightness data (Y data) and color difference data (Cr and Cb data).

The recording control unit 68 accesses a memory card 78, and reads and writes data according to a command output from the system controller 80. Image data obtained by imaging is recorded in the memory card 78.

The main-display drive unit 70 drives the main-display 14 according to a command output from the system controller 80.

The sub-display drive unit 72 drives the sub-display 16 according to a command from the system controller 80.

The operation unit 74 includes the shutter button 30, the power supply lever 31, the playback button 34, the delete button 35, the AF lock button 36, the AE lock button 37, the menu button 38, the selector buttons 39, the BACK button 40, the rear command dial 41, the operation dial 110, and the like, and outputs a signal in response to the operation of each operation member to the system controller 80.

The system controller 80 is a control unit that controls the operation of each unit of the digital camera 1. The system controller 80 is formed of a microcomputer. That is, the microcomputer functions as the system controller 80 by executing a predetermined control program and functions as a control unit that controls the operation of each unit of the digital camera 1.

The system controller 80 also functions as a control unit for the lens 2. The system controller 80 controls the operation of the lens 2 through a lens drive unit 2a provided in the lens 2. The lens 2 comprises a stop, a focus lens, and the like. The lens drive unit 2a comprises a stop drive unit that drives the stop, a focus lens drive unit that drives the focus lens, and the like.

[Setting System by Using Operation Dial]

As described above, the operation dial 110 is validated only in the case where the operation is performed while the top surface is touched. The item to be set in the case where the operation dial 110 is operated is decided by a position where the finger is touched during the operation. In the digital camera 1 of the embodiment, in the case where the operation is performed while the front region Df is touched, the setting change of the shutter speed becomes possible. Further, in the case where the operation is performed while the center region Dc is touched, the setting change of the exposure correction value becomes possible. Further, in the case where the operation is performed while the rear region Dr is touched, the setting change of the ISO sensitivity becomes possible.

«Configuration»

Figure 8:
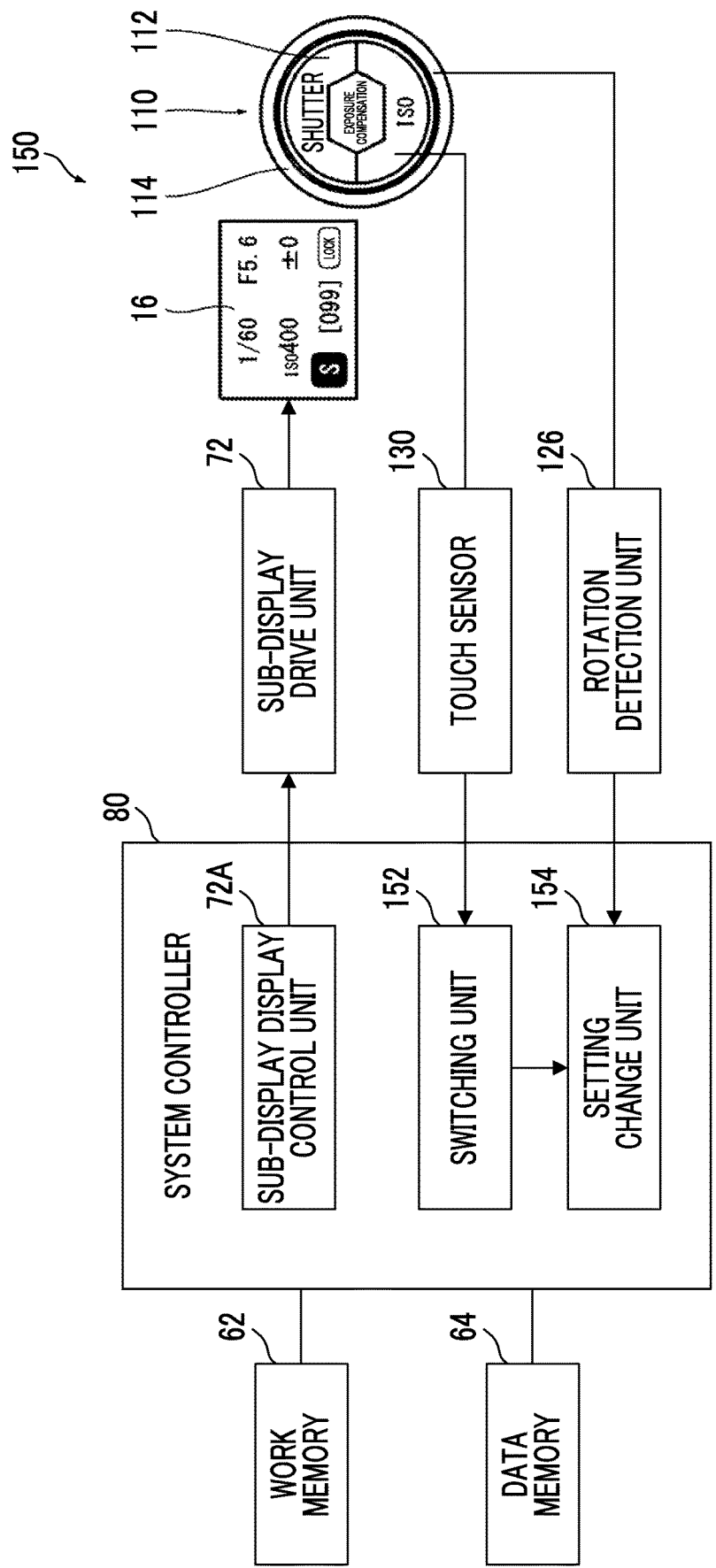
FIG. 8 is a block diagram showing the schematic configuration of a setting system by using the operation dial.

FIG. 8 is a block diagram showing the schematic configuration of a setting system by using the operation dial 110.

As shown in FIG. 8, a setting system 150 using the operation dial 110 comprises a switching unit 152 that switches between validity and invalidity of the setting change of the item set in each region on the top surface based on a detection result of the touch sensor 130 and a setting change unit 154 that changes the setting of the item whose setting change is valid in response to the rotation operation of the operation dial 110.

The switching unit 152 switches between validity and invalidity of the setting change of the item set in each divided region on the top surface of the operation dial 110 based on an output from the touch sensor 130. For example, in a case where the contact with the front region Df is detected, the setting change of the shutter speed is validated. Further in a case where the contact with the center region Dc is detected, the setting change of the exposure correction value is validated. Further, in a case where the contact with the rear region Dr is detected, the setting change of the ISO sensitivity is validated.

Here, the touch sensor 130 detects the contact with the contact detection region Dfz set in the front region Df to detect the contact with the front region Df. In this case, the touch sensor 130 functions as the contact detection unit that detects the contact with the front region Df.

Further, the touch sensor 130 detects the contact with the contact detection region Dcz set in the center region Dc to detect the contact with the center region Dc. In this case, the touch sensor 130 functions as the contact detection unit that detects the contact with the center region Dc.

Further, the touch sensor 130 detects the contact with the contact detection region Drz set in the rear region Dr to detect the contact with the rear region Dr. In this case, the touch sensor 130 functions as the contact detection unit that detects the contact with the rear region Dr.

The item whose setting change is validated is one item. In a case where the contact is detected in a plurality of contact detection regions, the switching unit 152 validates the contact of a region having the largest contact detection area.

The setting change unit 154 changes the setting of the item whose setting change is validated by the switching unit 152 in response to the rotation operation of the operation dial 110. At this time, the setting change unit 154 changes the setting value of the item whose setting change is valid according to a detection result of the rotation detection unit 126. That is, the setting value of the item whose setting change is valid is changed according to the rotation amount and the rotation direction of the operation dial 110.

For example, in the case where the setting change of the shutter speed is valid, the setting change unit 154 changes the shutter speed in a predetermined order in response to the operation of the operation dial 110. That is, in a case where the operation dial 110 is rotationally operated in the plus direction, the shutter speed is advanced for each one click. In a case where the operation dial 110 is rotationally operated in the minus direction, the shutter speed is lowered for each one click.

Further, in the case where the setting change of the exposure correction value is valid, the setting change unit 154 sets the exposure correction value in a predetermined step width in response to the operation of the operation dial 110. That is, in the case where the operation dial 110 is rotationally operated in the plus direction, the exposure correction value is set in the plus direction in the predetermined step width for each one click. In the case where the operation dial 110 is rotationally operated in the minus direction, the exposure correction value is set in the minus direction in the predetermined step width for each one click. For example, in a case where the step width is set to ⅓ stage, in the case where the operation dial 110 is rotationally operated in the plus direction, the exposure correction value is set in the plus direction by ⅓ stage for each one click. Further, in the case where the operation dial 110 is rotationally operated in the minus direction, the exposure correction value is set in the minus direction by ⅓ stage for each one click.

Further, in a case where the setting change of the ISO sensitivity is valid, the setting change unit 154 changes the ISO sensitivity in a predetermined order in response to the operation of the operation dial 110. That is, in a case where the operation dial 110 is rotationally operated in the plus direction, the ISO sensitivity is advanced for each one click. In a case where the operation dial 110 is rotationally operated in the minus direction, the ISO sensitivity is lowered for each one click.

In a case where the setting changes of all items are invalid, the setting change unit 154 does not perform the setting change even in the case where the operation dial 110 is rotationally operated. The case where the setting changes of all items are invalid refers to a case where the operation dial 110 is rotationally operated while any region on the top surface is not touched.

The functions of the switching unit 152 and the setting change unit 154 are provided as one function of the system controller 80. That is, the microcomputer configuring the system controller 80 executes a predetermined control program (setting program of camera) to provide the functions of the switching unit 152 and the setting change unit 154 by the system controller 80.

[Display on Sub-Display]

All setting values of the items whose setting changes are possible by the operation dial 110 are displayed on the sub-display 16. As described above, in the digital camera 1 of the embodiment, since the setting changes of the shutter speed, the exposure correction, and the ISO sensitivity are possible by the operation dial 110, information on current setting values of the shutter speed, the exposure correction value, and the ISO sensitivity is displayed on the sub-display 16. In addition, in the digital camera 1 of the embodiment, information on currently set F-number, imaging mode, and the number of capturable images is displayed on the sub-display 16.

The display on the sub-display 16 is controlled by the sub-display display control unit 72A. The sub-display display control unit 72A is an example of the display control unit. The sub-display display control unit 72A acquires information necessary for the display on the sub-display 16 and controls the drive of the sub-display drive unit 72 to control the display on the sub-display 16.

The function of the sub-display display control unit 72A is provided as one function of the system controller 80. That is, the microcomputer configuring the system controller 80 executes a predetermined control program to provide the function of the sub-display display control unit 72A by the system controller 80.

Figure 9:
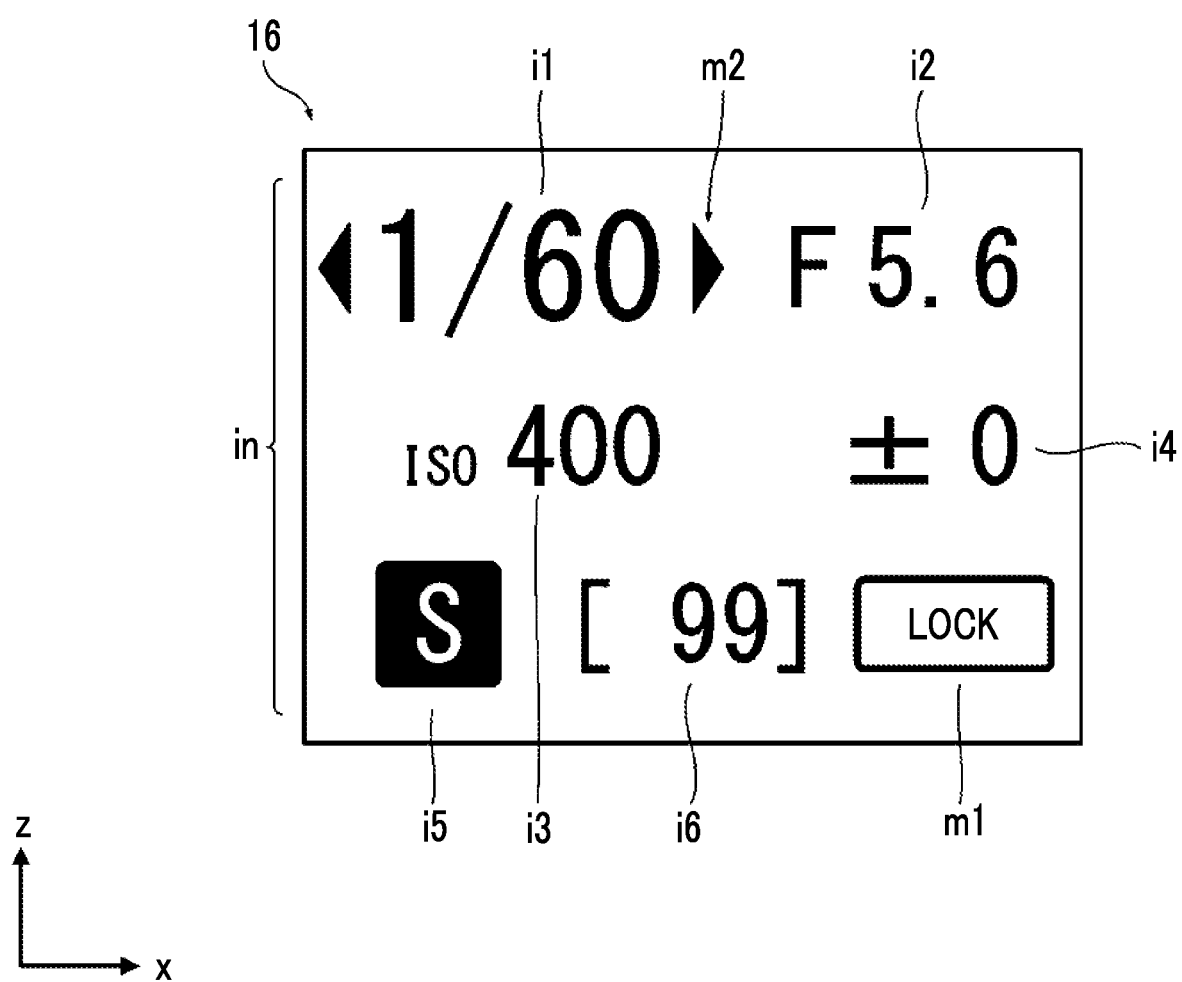
FIG. 9 is a plan view showing an example of a display on a sub-display.

FIG. 9 is a plan view showing an example of the display on the sub-display.

As shown in FIG. 9, the sub-display 16 displays the shutter speed information i1, the F-number information i2, the ISO sensitivity information i3, the exposure correction value information i4, the imaging mode information i5, the number of capturable images information i6 as the setting contents of the digital camera 1.

Further, the sub-display 16 displays a lock mark m1 which is a mark indicating that the operation dial 110 is locked, that is, the setting change by the operation dial 110 is invalid. The lock mark m1 is formed of, for example, an image in which a character of "LOCK" is displayed in a rectangular frame. The lock mark m1 is displayed in a case where the operation dial 110 is locked. Therefore, in a case where the lock of the operation dial 110 is released, that is, the setting change of any item is possible, the lock mark m1 is not displayed on the sub-display 16.

Furthermore, the sub-display 16 displays a setting change valid mark m2 indicating an item to be changed in the setting by the operation dial 110. The setting change valid mark m2 is displayed at a position of the item to be changed in the setting in the case where the operation dial 110 is operated, that is, the item whose setting change is valid. FIG. 9 shows an example in a case where the setting of the shutter speed is changed in the case where the operation dial 110 is operated. In this case, the setting change valid mark m2 is displayed at a position where the shutter speed is displayed.

The setting change valid mark m2 is formed of a pair of triangular figures and is displayed on both sides of the item to be changed in the setting in the case where the operation dial 110 is operated. However, in a case where a setting value at the present time is a lower limit value of settable numerical values in the item, only the figure on the right side is displayed. Further, in a case where a setting value at the present time is an upper limit value of the settable numerical values in the item, only the figure on the left side is displayed. Accordingly, it is possible to easily grasp whether the current setting value is the upper limit value or the lower limit value of the settable numerical values in the item.

The setting value of the item to be changed in the setting in the case where the operation dial 110 is operated, that is, the item whose setting change is valid is displayed in a form different from setting values of other items, that is, items whose setting changes are invalid. In the example shown in FIG. 9, the display of the item to be changed in the setting in the case where the operation dial 110 is operated is displayed in a large size the display of other items. Accordingly, it is possible to easily grasp the item to be changed in the setting in the case where the operation dial 110 is operated.

«Action»

Hereinafter, a method (setting method) of performing various settings of the digital camera 1 by using the operation dial 110 will be described.

First, a method of switching between validity and invalidity of the setting change of an item capable of being set by the operation dial 110.

Figure 10:
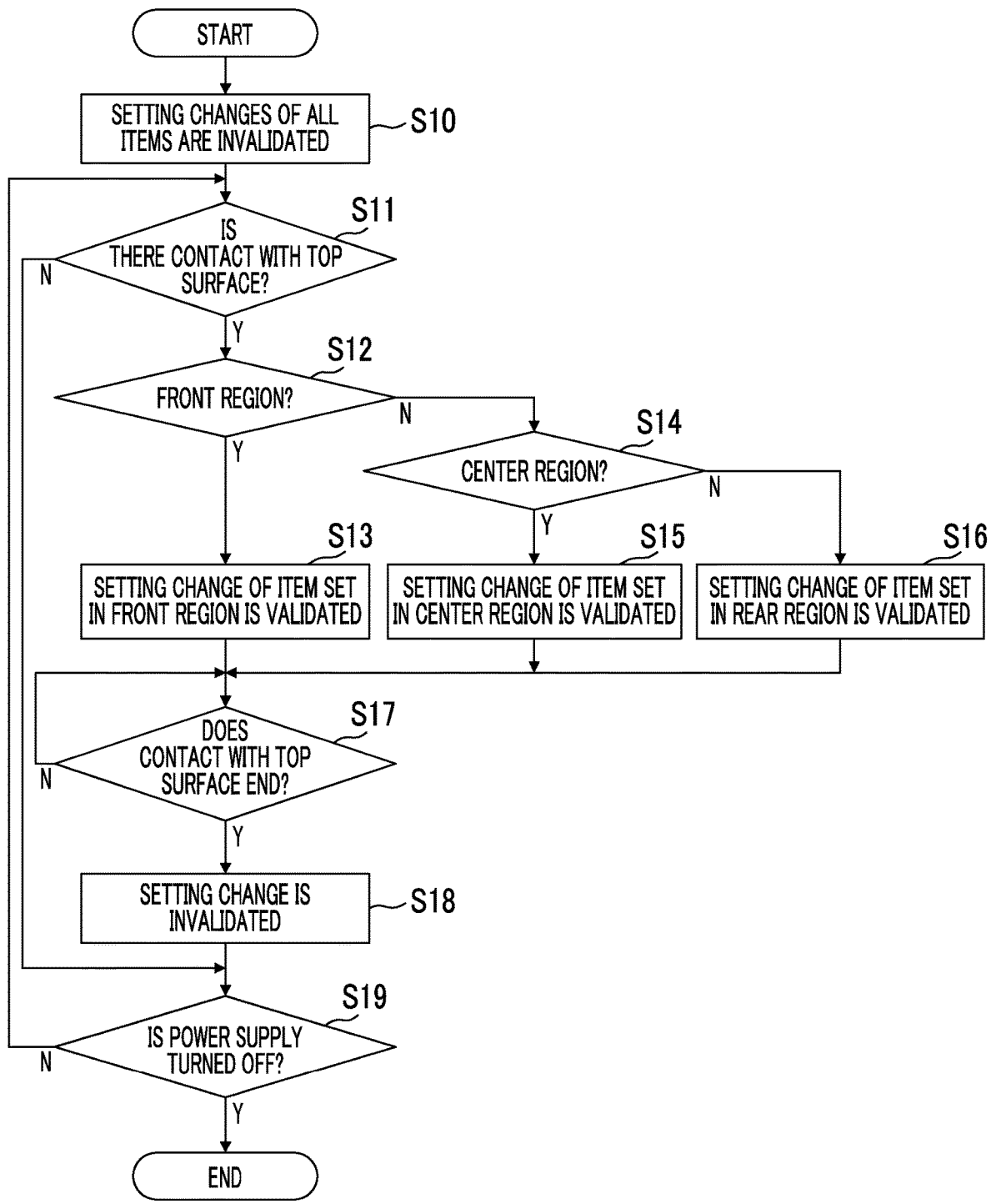
FIG. 10 is a flowchart showing a procedure of processing of switching between validity and invalidity of a setting change of an item capable of being set by the operation dial.

FIG. 10 is a flowchart showing a procedure of processing of switching between validity and invalidity of the setting change of the item capable of being set by the operation dial.

In a case where the power supply of the digital camera 1 is turned on, the switching unit 152 invalidates the setting changes by the operation dial 110 of all items capable of being set by the operation dial 110 (step S10). In the digital camera 1 of the embodiment, since the setting changes of the shutter speed, the exposure correction value, and the ISO sensitivity are possible by the operation dial 110, the switching unit 152 invalidates the setting changes of the shutter speed, the exposure correction value, and the ISO sensitivity by the operation dial 110.

Thereafter, the switching unit 152 determines the presence or absence of the contact with the top surface of the operation dial 110 (step S11). The presence or absence of the contact with the top surface of the operation dial 110 is determined based on the detection result of the touch sensor 130.

In a case where it is determined that there is contact with the top surface, the switching unit 152 determines whether a region where the contact is detected is the front region Df (step S12). Whether the region where the contact is detected is the front region Df is determined based on the detection result of the touch sensor 130. That is, it is determined whether the detection of the contact is based on the contact detection region Dfz set in the front region Df to determine whether the region where the contact is detected is the front region Df In a case where it is determined that the region where the contact is detected is the front region Df, the switching unit 152 validates the setting change of an item set in the front region Df (step S13). In the digital camera 1 of the embodiment, the setting change of the shutter speed is assigned to the front region Df Therefore, in this case, the switching unit 152 validates the setting change of the shutter speed.

In a case where it is determined that the region where the contact is detected is not the front region Df, the switching unit 152 determines whether the region where the contact is detected is the center region Dc (step S14). Whether the region where the contact is detected is the center region Dc is determined based on the detection result of the touch sensor 130. That is, it is determined whether the detection of the contact is based on the contact detection region Dcz set in the center region Dc to determine whether the region where the contact is detected is the center region Dc.

In a case where it is determined that the region where the contact is detected is the center region Dc, the switching unit 152 validates the setting change of an item set in the center region Dc (step S15). In the digital camera 1 of the embodiment, the setting change of the exposure correction value is assigned to the center region Dc. Therefore, in this case, the switching unit 152 validates the setting change of the exposure correction value.

In a case where it is determined that the region where the contact is detected is not the center region Dc, the switching unit 152 recognizes that the region where the contact is detected is the rear region Dr. In the case where it is recognized that the region where the contact is detected is the rear region Dr, the switching unit 152 validates the setting change of an item set in the rear region Dr (step S16).

In the digital camera 1 of the embodiment, the setting change of the ISO sensitivity is assigned to the rear region Dr. Therefore, in this case, the switching unit 152 validates the setting change of the ISO sensitivity.

Thereafter, the switching unit 152 determines whether the contact with the top surface of the operation dial 110 ends based on the output from the touch sensor 130 (step S17).

In a case where it is determined that the contact with the top surface of the operation dial 110 ends, the switching unit 152 switches the setting change of an item whose setting change is valid to invalid (step S18). For example, in a case where the contact with the front region Df is detected and the setting change of the shutter speed is validated, the setting change of the shutter speed is switched to invalid in the case where the detection of the contact ends.

Thereafter, the switching unit 152 determines whether the power supply is turned off (step S19). In a case where it is determined that the power supply is turned off, the processing ends. On the other hand, in a case where it is determined that the power supply is not turned off, the processing returns to step S11 to execute the above processing again.

In this manner, in the case where the top surface of the operation dial 110 is touched, the setting change of an item set in the touched region is validated. In a case where the finger does not touch the top surface of the operation dial 110, any setting change is invalidated. In this case, no setting is changed even in the case where the operation dial 110 is rotationally operated. That is, an idle rotation is performed.

Next, processing in a case where the setting change is performed by rotationally operating the operation dial 110 will be described.

Figure 11:
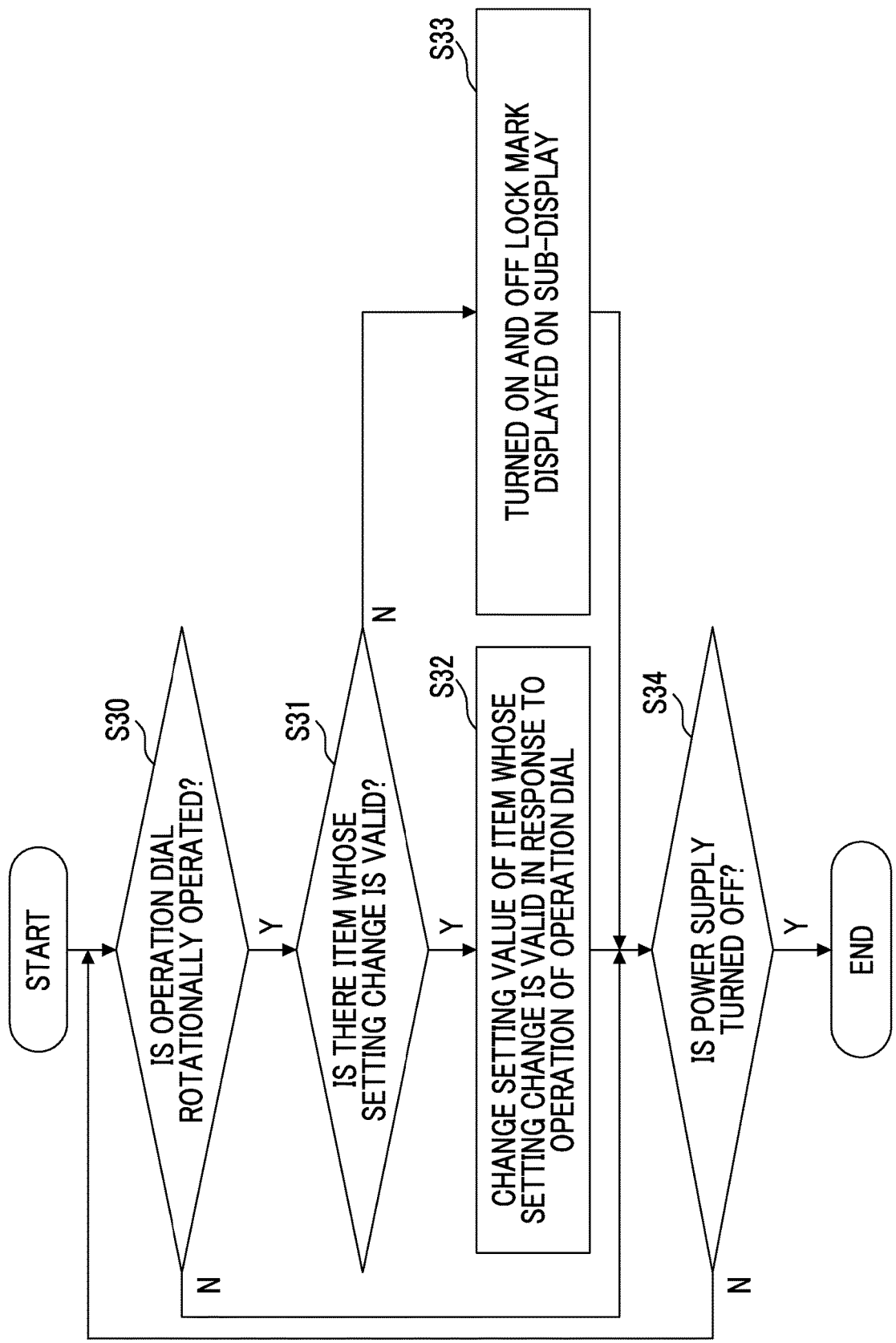
FIG. 11 is a flowchart showing a procedure of processing of the setting change based on an operation of the operation dial.

FIG. 11 is a flowchart showing a procedure of the processing of the setting change based on the operation of the operation dial 110.

In the case where the power supply of the digital camera 1 is turned on, the setting change unit 154 determines whether the operation dial 110 is rotationally operated (step S30). Whether the operation dial 110 is rotationally operated is determined based on an output from the rotation detection unit 126.

In a case where it is determined that the operation dial 110 is rotationally operated, the setting change unit 154 determines whether there is an item whose setting change is valid based on the setting of the switching unit 152 (step S31).

In a case where it is determined that there is the item whose setting change is valid, the setting change unit 154 changes the setting value of the item whose setting change is valid based on the operation of the operation dial 110 (step S32). More specifically, the setting value of the item whose setting change is valid is changed based on an operation direction and an operation amount of the operation dial 110. For example, in the case where the setting change of the shutter speed is valid, the shutter speed is changed in response to the operation of the operation dial 110.

On the other hand, in a case where it is determined that there is no item whose setting change is valid, the setting change unit 154 does not perform the processing of the setting change and invalidates the operation by the operation dial 110. In this case, the operation dial 110 performs the idle rotation.

In a case where there is no item whose setting change is valid, the sub-display display control unit 72A turns on and off the display of the lock mark m1 on the sub-display 16 (step S33). Accordingly, it can be recognized that the operation dial 110 is locked and the operation is invalid.

Thereafter, the setting change unit 154 determines whether the power supply is turned off (step S34). In a case where it is determined that the power supply is turned off, the processing ends. On the other hand, in the case where it is determined that the power supply is not turned off, the processing returns to step S30 to execute the above processing again.

In this manner, in the digital camera 1 of the embodiment, the operation by the operation dial 110 is validated only in the case where there is the item whose setting change is validated. In a case where there is no item whose setting change is validated, the operation of the operation dial 110 is invalidated. In this case, the operation dial 110 is electronically locked.

Figure 12:
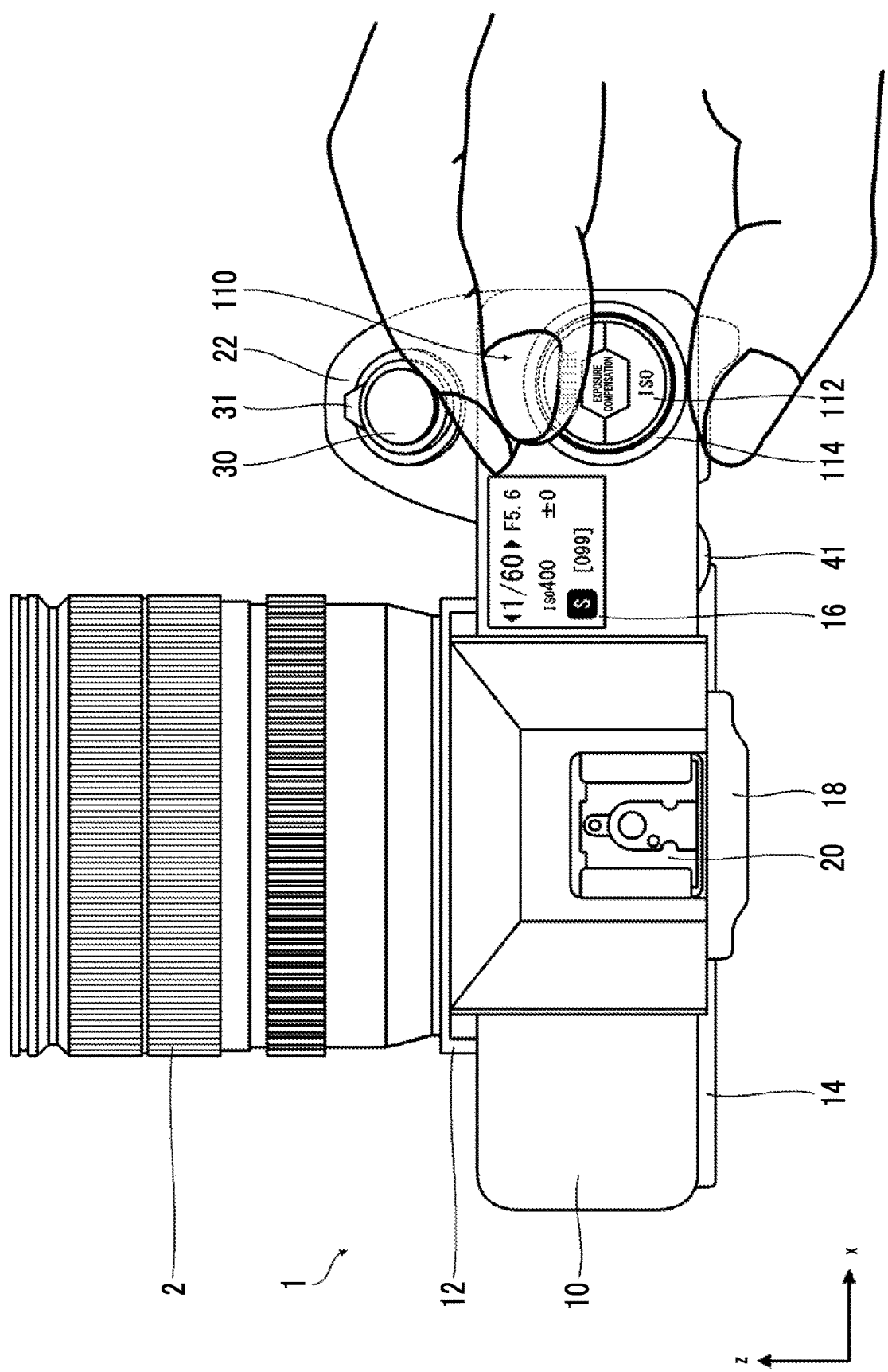
FIG. 12 is a diagram showing an example of a valid operation form for the operation dial.

FIG. 12 is a diagram showing an example of a valid operation form for the operation dial.

As shown in FIG. 12, the setting change by the operation dial 110 becomes possible by rotationally operating the operation dial 110 while the top surface of the operation dial 110 is touched. At this time, the operation dial 110 is rotationally operated while the finger touches a region where an item to be changed in the setting is assigned.

FIG. 12 shows an operation form in a case where the shutter speed is changed. In this case, the operation dial 110 is rotationally operated while the front region Df on the top surface of the operation dial 110 is touched as shown in FIG. 12. Accordingly, the shutter speed is changed in response to the operation of the operation dial 110.

In a case where the exposure correction value is changed, the operation dial 110 is rotationally operated while the center region Dc on the top surface thereof is touched. Accordingly, the exposure correction value is changed in response to the operation of the operation dial 110.

Further, In a case where the ISO sensitivity is changed, the operation dial 110 is rotationally operated while the rear region Dr on the top surface thereof is touched. Accordingly, the ISO sensitivity is changed in response to the operation of the operation dial 110.

Figure 13:
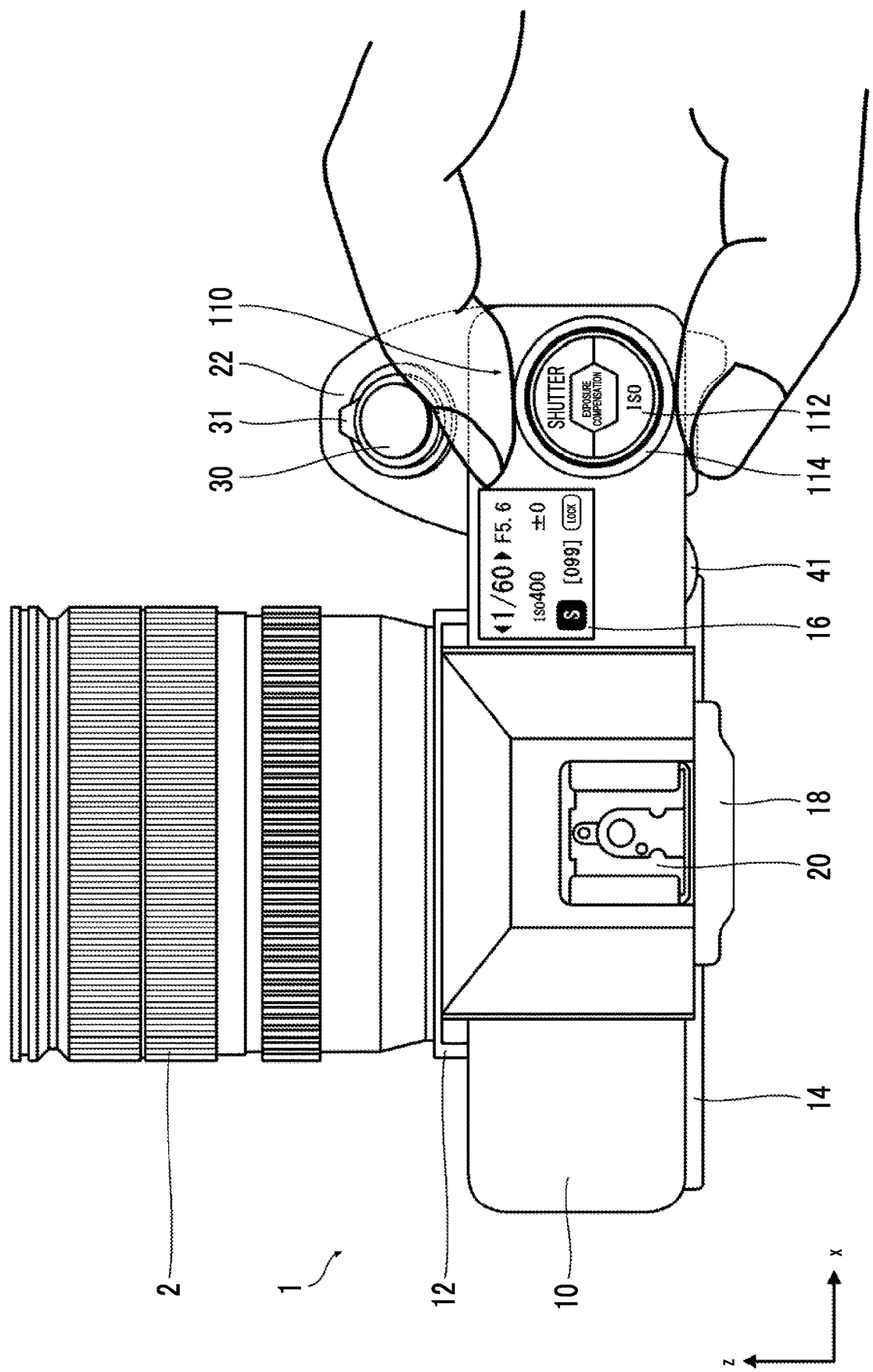
FIG. 13 is a diagram showing an example of an invalid operation form for the operation dial.

FIG. 13 is a diagram showing an example of an invalid operation form for the operation dial.

As shown in FIG. 13, in a case where the operation dial 110 is rotationally operated while the top surface is not touched, the operation is invalidated. In this case, no setting is changed and the operation dial 110 performs the idle rotation. That is, in the case where the top surface is not touched, the operation dial 110 is electronically locked.

In a case where the operation dial 110 is locked, the lock mark m1 is displayed on the sub-display 16. In a case where the operation dial 110 is rotationally operated in the locked state, the lock mark m1 is turned on and off. Accordingly, it is possible for the user to recognize that the operation dial 110 is locked.

On the other hand, in the case where the operation is valid, the setting change valid mark m2 is displayed at the position of the item to be changed in the setting as shown in FIG. 12. In the example shown in FIG. 12, since the setting change of the shutter speed is valid, the setting change valid mark m2 is displayed at a position where the shutter speed information i1 is displayed.

As described above, according to the digital camera 1 of the embodiment, the setting change is valid only in the case where the operation dial 110 is operated while the top surface is touched. Accordingly, it is possible to prevent the setting from being changed unintentionally. Further, since the setting change is validated by simply touching the top surface of the operation dial 110, it is possible to provide good operability. Furthermore, since the operation dial 110 is locked electronically instead of with a mechanical mechanism, it is possible to simplify the configuration of the operation dial 110.

Further, according to the digital camera 1 of the embodiment, it is possible to switch the item to be changed in the setting by changing a position of touching the top surface of the operation dial 110. Accordingly, it is possible to perform a plurality of settings with one operation dial 110. Further, it is possible to easily switch the item to be changed in the setting by simply changing the touching position.

Furthermore, according to the digital camera 1 of the embodiment, the information on the setting value of the item to be changed in the setting by the operation dial 110 is displayed on the sub-display 16 provided near the operation dial 110. Accordingly, it is possible to easily confirm the setting situation.

Modification Example

«Item to be Changed in Setting by Operation Dial»

The item whose setting change is validated in the case where each region is touched can be set as appropriate depending on the function or the like provided in the camera. In the embodiment, the case where the setting changes of the shutter speed, the exposure correction value, and the ISO sensitivity are validated is described. However, in addition, the setting changes of the F-number, the imaging mode, a flash mode, an auto focus mode, a photometry mode, and the like may be validated.

Further, it is also possible to randomly set the position (region) to which each item is assigned. For example, in the digital camera of the above embodiment, the ISO sensitivity may be assigned to the front region Df, the shutter speed may be assigned to the center region Dc, and the exposure correction value may be assigned to the rear region Dr.

Further, for example, the setting change of the shutter speed may be assigned to the front region Df, the setting change of the F-number may be assigned to the rear region D, and a shift function may be assigned to the center region Dc. In this case, in the case where the operation dial 110 is rotationally operated while the front region Df is touched, the shutter speed is changed. In the case where the operation dial 110 is rotationally operated while the rear region Dr is touched, the F-number is changed. In the case where the operation dial 110 is rotationally operated while the center region Dc is touched, a combination of the shutter speed and the F-number is shifted based on the shutter speed and the F-number set at that time.

«Layout of Contact Detection Unit to be Set on Top Surface of Operation Dial»

In the embodiment, the top surface of the operation dial 110 is divided into three regions as the contact detection unit and the contact with each region is detected. However, a layout of the contact detection unit to be set on the top surface of the operation dial 110 can be set as appropriate depending on the number of items to be set by the operation dial, a size of the operation dial 110, or the like.

<Two Divisions>

Figure 14:
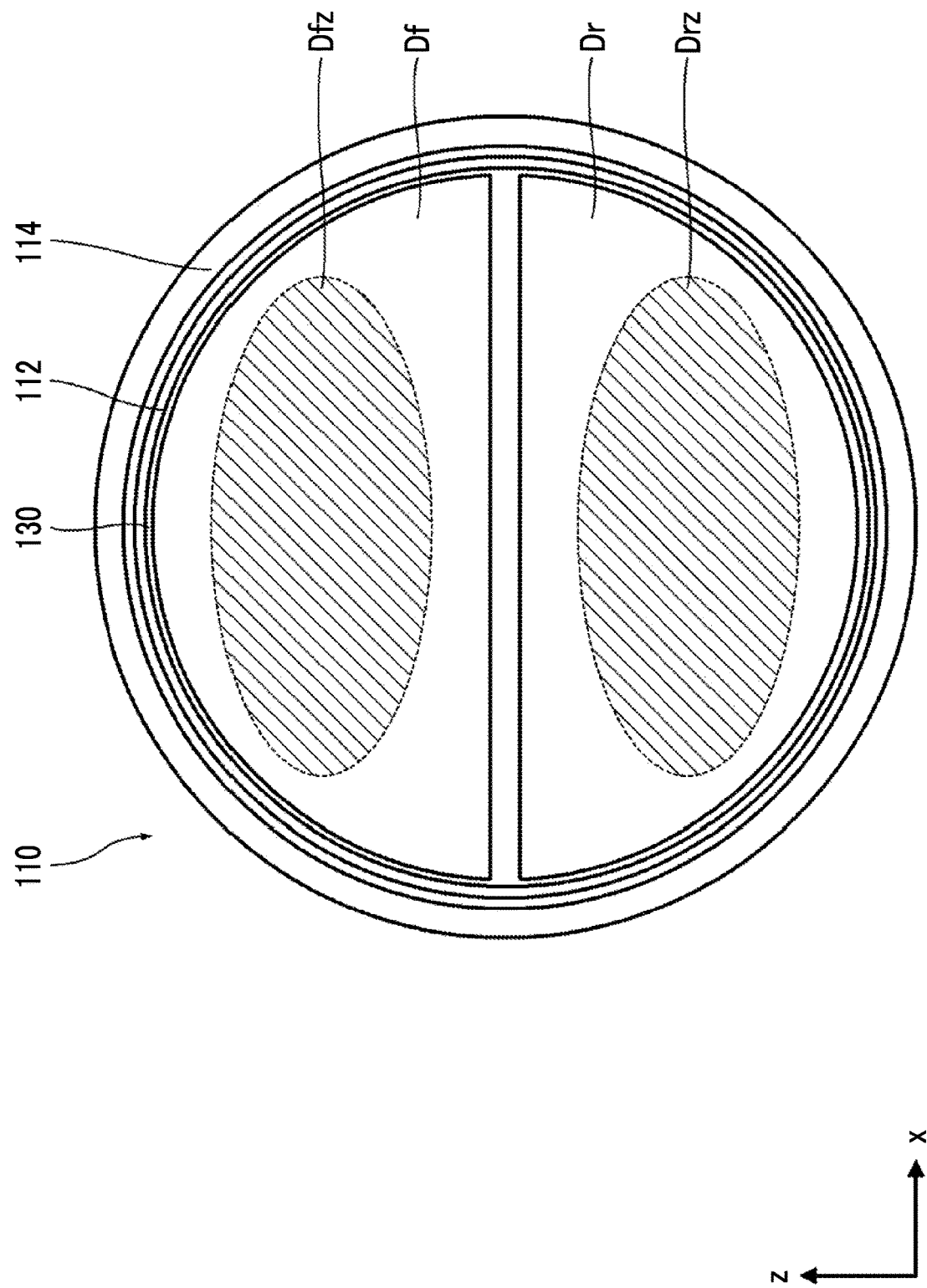
FIG. 14 is a plan view showing another example of a layout of a contact detection unit to be set on a top surface of the operation dial.

FIG. 14 is a plan view showing another example of the layout of the contact detection unit to be set on the top surface of the operation dial 110. FIG. 14 shows an example in a case where two contact detection units are provided on the top surface of the operation dial 110.

In the example, the top surface of the operation dial 110 is divided into two in the front-rear direction (z direction), and the contact is individually detected in each region. A hatched region in FIG. 14 is a region where the contact is detected in each region. This region configures the contact detection unit.

The touch sensor 130 detects the contact with the contact detection region Dfz set in the front side region (front region) Df to detect the contact with the front region Df. Further, the touch sensor 130 detects the contact with the contact detection region Drz set in the rear side region (rear region) Dr to detect the contact with the rear region Dr.

In the case of the example, it is possible to perform the setting changes of two items with one operation dial. As an example, the setting change of the shutter speed may be assigned to the front region Df, and the setting change of the exposure correction value may be assigned to the rear region Dr. In this case, in the case where the operation dial 110 is rotationally operated while the front region Df on the top surface is touched, the setting of the shutter speed is changed in response to the operation thereof. Further, in the case where the operation dial 110 is rotationally operated while the rear region Dr on the top surface is touched, the setting of the exposure correction value is changed in response to the operation thereof.

In the example, the top surface of the operation dial 110 is divided into two in the front-rear direction, but may be divided into two in a left-right direction. In this case, the top surface thereof is divided into two of a right region and a left region. Further, the top surface thereof may be divided into two in an oblique direction. In this case, the top surface thereof is divided into a left front region and a right rear region. Alternatively, the top surface thereof is divided into a right front region and a left rear region.

<Four Divisions>

Figure 15:
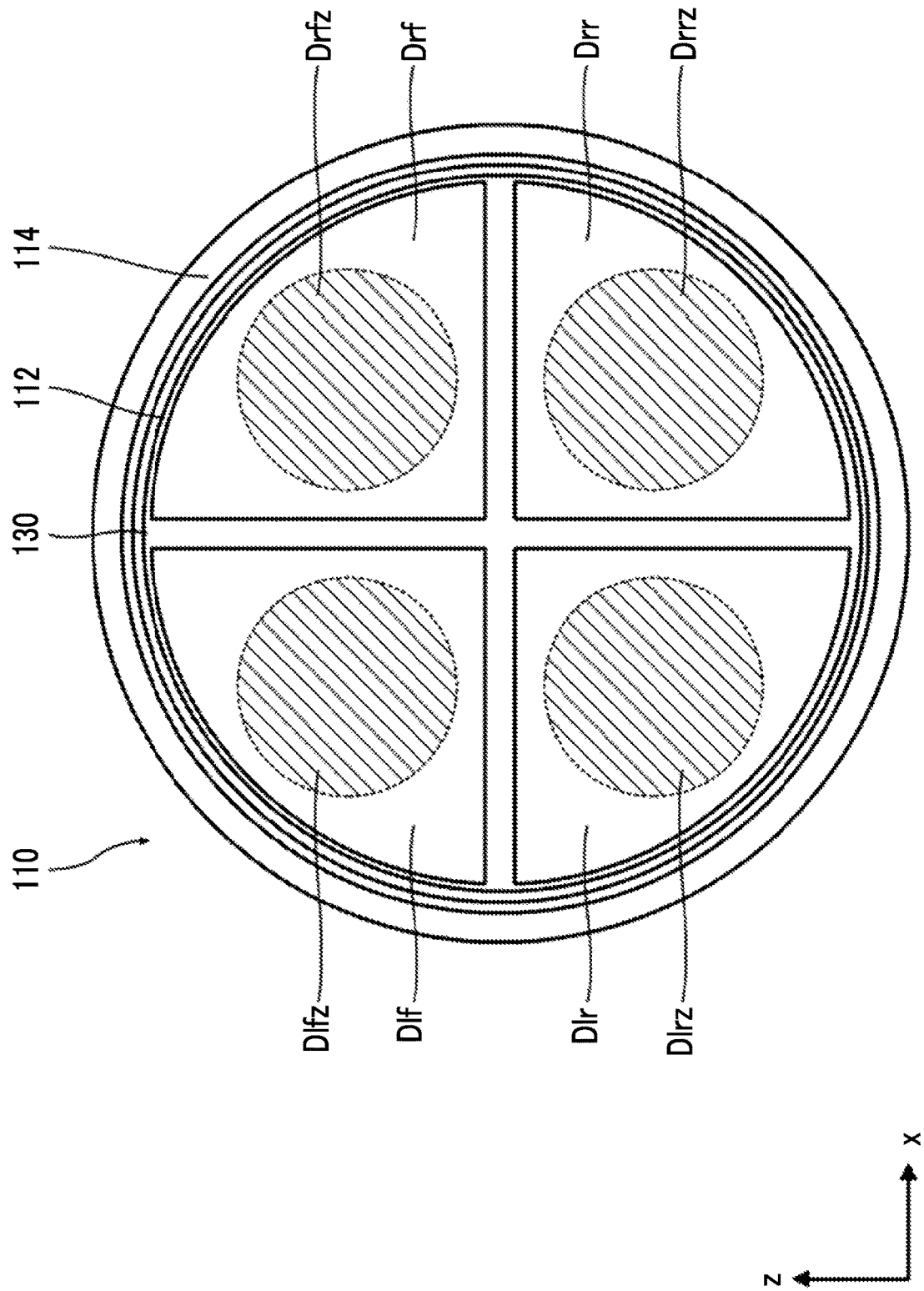
FIG. 15 is a plan view showing still another example of the layout of the contact detection unit to be set on the top surface of the operation dial.

FIG. 15 is a plan view showing still another example of the layout of the contact detection unit to be set on the top surface of the operation dial 110. FIG. 15 show an example in a case where four contact detection units are provided on the top surface of the operation dial 110.

In the example, the top surface of the operation dial 110 is divided into four in the circumference direction, and the contact is individually detected in each region. A hatched region in FIG. 15 is a region where the contact is detected in each region. This region configures the contact detection unit.

The touch sensor 130 detects the contact with a contact detection region Dlfz set in a left front side region (left front region) Dlf to detect the contact with the left front region Dlf. The touch sensor 130 detects the contact with a contact detection region Drfz set in a right front side region (right front region) Drf to detect the contact with the right front region Drf. Further, the touch sensor 130 detects the contact with a contact detection region Dlrz set in a left rear side region (left rear region) Dlr to detect the contact with the left rear region Dlr. The touch sensor 130 detects the contact with a contact detection region Drrz set in a right rear side region (right rear region) Drr to detect the contact with the right rear region Drr.

In the case of the example, it is possible to perform the setting changes of four items with one operation dial. As an example, the setting change of the shutter speed may be assigned to the left front region Dlf, the setting change of the F-number may be assigned to the right front region Drf, the setting change of the ISO sensitivity may be assigned to the left rear region Dlr, and the setting change of the exposure correction value may be assigned to the right rear region Drr. In this case, in a case where the operation dial 110 is rotationally operated while the left front region Dlf on the top surface is touched, the setting of the shutter speed is changed in response to the operation thereof. Further, in a case where the operation dial 110 is rotationally operated while the right front region Drf on the top surface is touched, the setting of the F-number is changed in response to the operation thereof. Furthermore, in a case where the operation dial 110 is rotationally operated while the left rear region Dlr on the top surface is touched, the setting of the ISO sensitivity is changed in response to the operation thereof. Further, in a case where the operation dial 110 is rotationally operated while the right rear region Drr on the top surface is touched, the setting of the exposure correction value is changed in response to the operation thereof.

The top surface of the operation dial 110 may be divided into four in the front, rear, left, and right as a form of four divisions. In this case, the top surface thereof is divided into a front region, a rear region, a right region, and a left region.

<Five Divisions>

Figure 16:
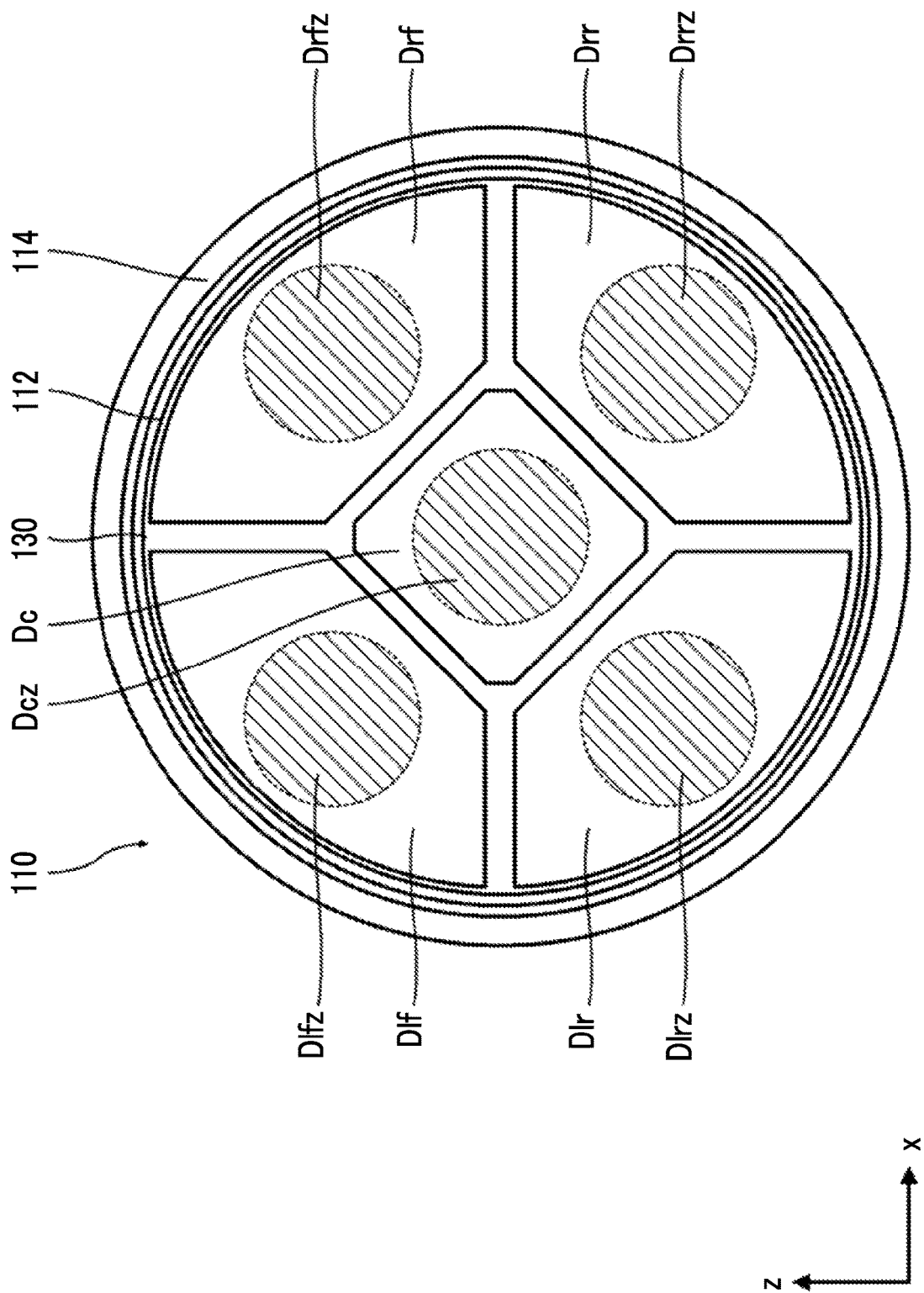
FIG. 16 is a plan view showing further still another example of the layout of the contact detection unit to be set on the top surface of the operation dial.

FIG. 16 is a plan view showing further still another example of the layout of the contact detection unit to be set on the top surface of the operation dial 110. FIG. 16 show an example in a case where five contact detection units are provided on the top surface of the operation dial 110.

In the example, the contact is detected in the center and four outer circumferential regions of the center. The four outer circumferential regions are divided into four equal parts in the circumference direction. A hatched region in FIG. 16 is a region where the contact is detected in each region. This region configures the contact detection unit.

The touch sensor 130 detects the contact with the contact detection region Dcz set in the center region Dc to detect the contact with the center region Dc. Further, the touch sensor 130 detects the contact with the contact detection region Dlfz set in the left front side region (left front region) Dlf to detect the contact with the left front region Dlf. The touch sensor 130 detects the contact with the contact detection region Drfz set in the right front side region (right front region) Drf to detect the contact with the right front region Drf. Furthermore, the touch sensor 130 detects the contact with the contact detection region Dlrz set in the left rear side region (left rear region) Dlr to detect the contact with the left rear region Dlr. The touch sensor 130 detects the contact with the contact detection region Drrz set in the right rear side region (right rear region) Drr to detect the contact with the right rear region Drr.

In the case of the example, it is possible to perform the setting changes of five items with one operation dial. As an example, the setting change of the exposure correction value may be assigned to the center region Dc, the setting change of the shutter speed may be assigned to the left front region Dlf, the setting change of the F-number may be assigned to the right front region Drf, the setting change of the ISO sensitivity may be assigned to the left rear region Dlr, and the setting change of the imaging mode may be assigned to the right rear region Drr. In this case, in a case where the operation dial 110 is rotationally operated while the center region Dc on the top surface is touched, the setting of the exposure correction value is changed in response to the operation thereof. Further, in a case where the operation dial 110 is rotationally operated while the left front region Dlf on the top surface is touched, the setting of the shutter speed is changed in response to the operation thereof. Further, in a case where the operation dial 110 is rotationally operated while the right front region Drf on the top surface is touched, the setting of the F-number is changed in response to the operation thereof. Furthermore, in a case where the operation dial 110 is rotationally operated while the left rear region Dlr on the top surface is touched, the setting of the ISO sensitivity is changed in response to the operation thereof. Further, in a case where the operation dial 110 is rotationally operated while the right rear region Drr on the top surface is touched, the setting of the imaging mode is changed in response to the operation thereof.

«Configuration of Contact Detection Unit»

In the embodiment, the contact with the contact detection region set in each region is detected by one touch sensor. However, the touch sensor may be disposed for each region to individually detect the contact.

«Display on Sub-Display»

In the embodiment, in a case where the setting change of a specific item is validated, a setting value of the item is displayed in a large size on the sub-display. However, a display form on the sub-display in the case where the setting change is validated is not limited thereto.

Figure 17:
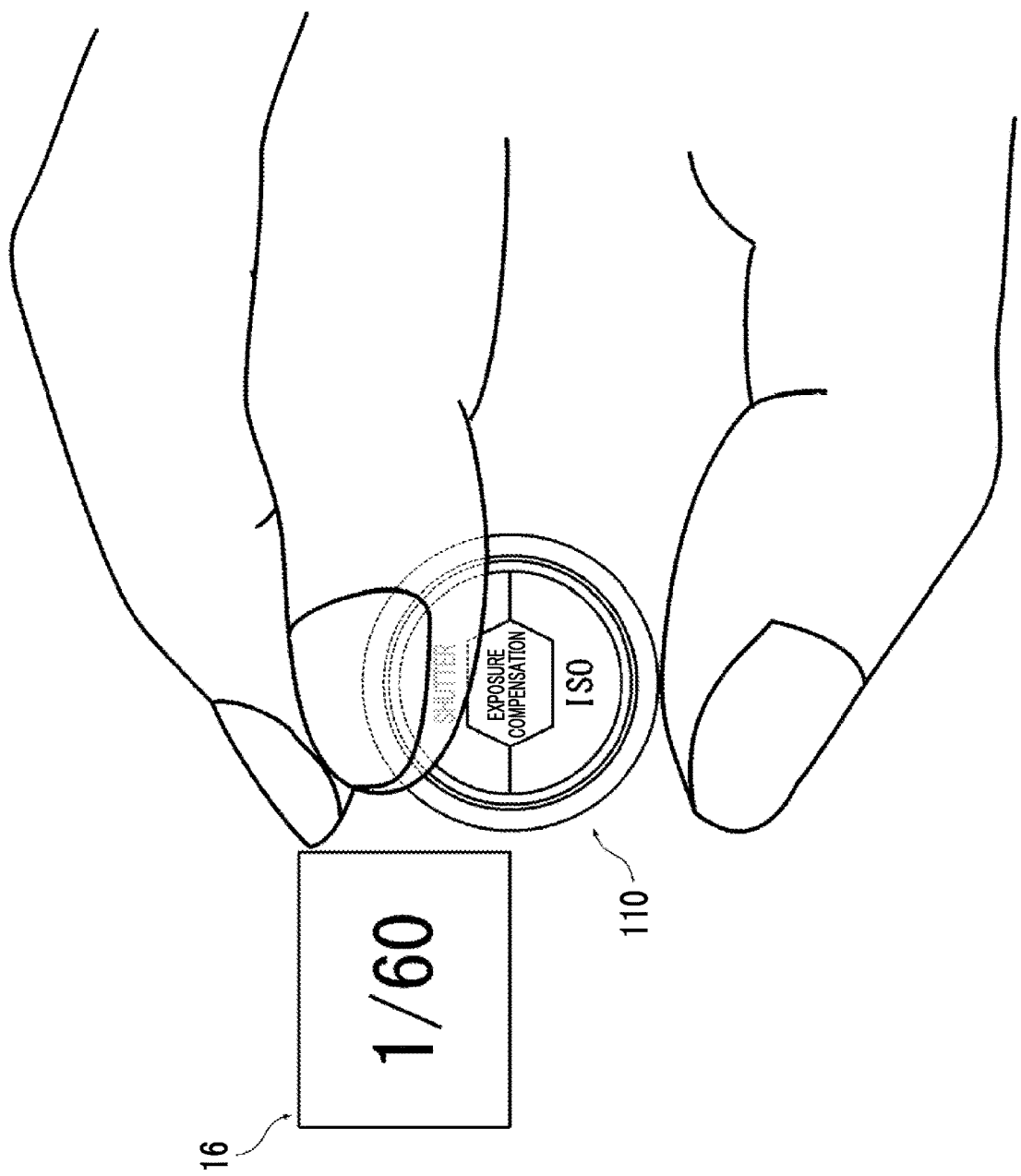
FIG. 17 is a plan view showing another example of a display on the sub-display in a case where the setting change is validated.

FIG. 17 is a plan view showing another example of the display on the sub-display in the case where the setting change is validated. FIG. 17 shows an example of the display on the sub-display 16 in a case where the setting change of the shutter speed is validated.

As shown in FIG. 17, in the case where the setting change is validated, only information on the item whose setting change is validated may be displayed on the sub-display 16. In this case, it is preferable to display the information in an enlarged manner as shown in FIG. 17. Accordingly, it is possible to easily change the setting of a desired item while the sub-display 16 is viewed.

Figure 18:
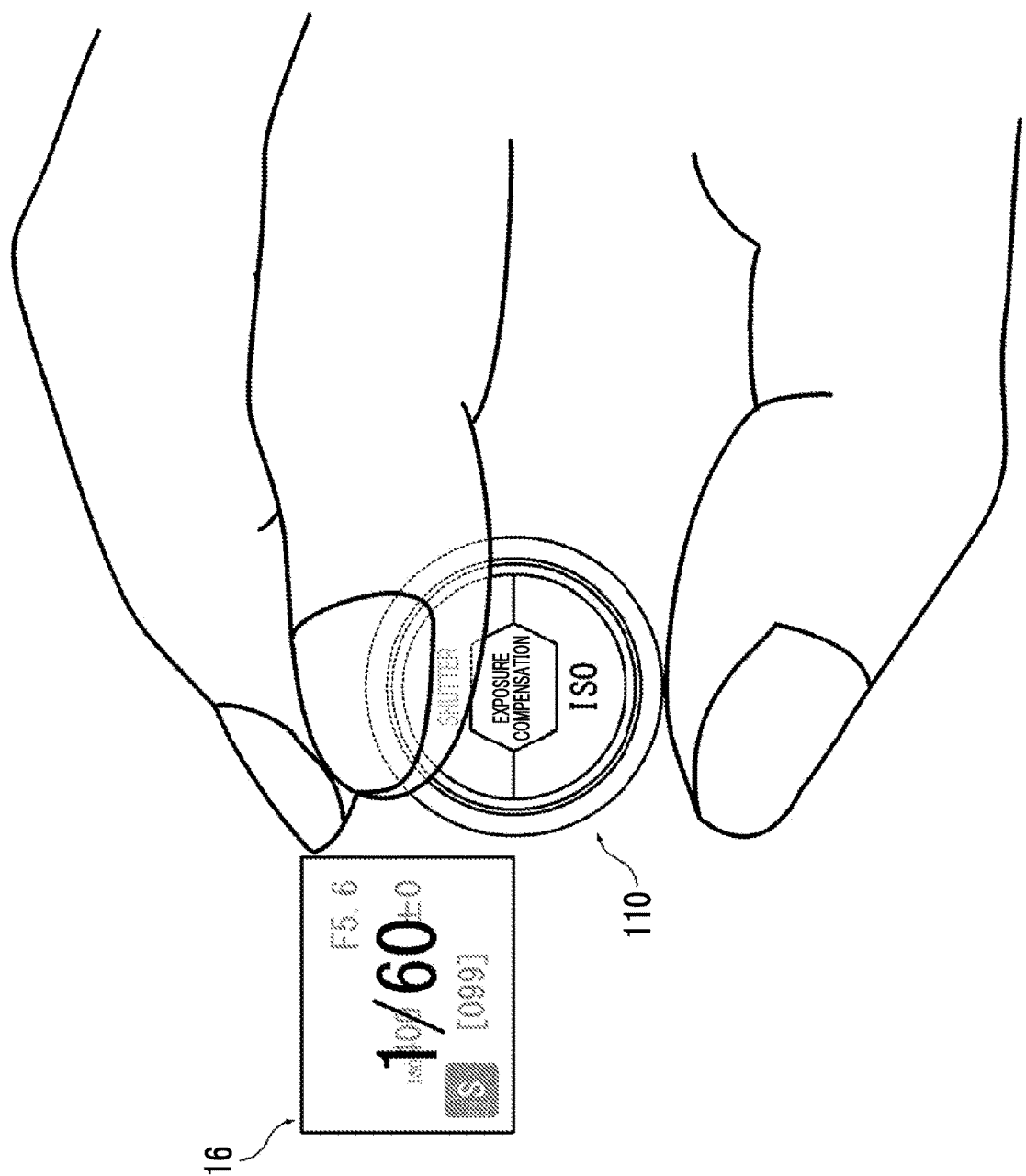
FIG. 18 is a plan view showing still another example of the display on the sub-display in the case where the setting change is validated.

FIG. 18 is a plan view showing still another example of the display on the sub-display in the case where the setting change is validated. FIG. 18 shows an example of the display on the sub-display 16 in the case where the setting change of the shutter speed is validated.

As shown in FIG. 18, in the case where the setting change is validated, the information on the item whose setting change is validated may be displayed in an enlarged manner, and other items may be displayed in a semi-transparent manner. Accordingly, it is possible to easily view the information on the item to be set by operation dial 110 and to confirm the setting values of other items.

Figure 19:
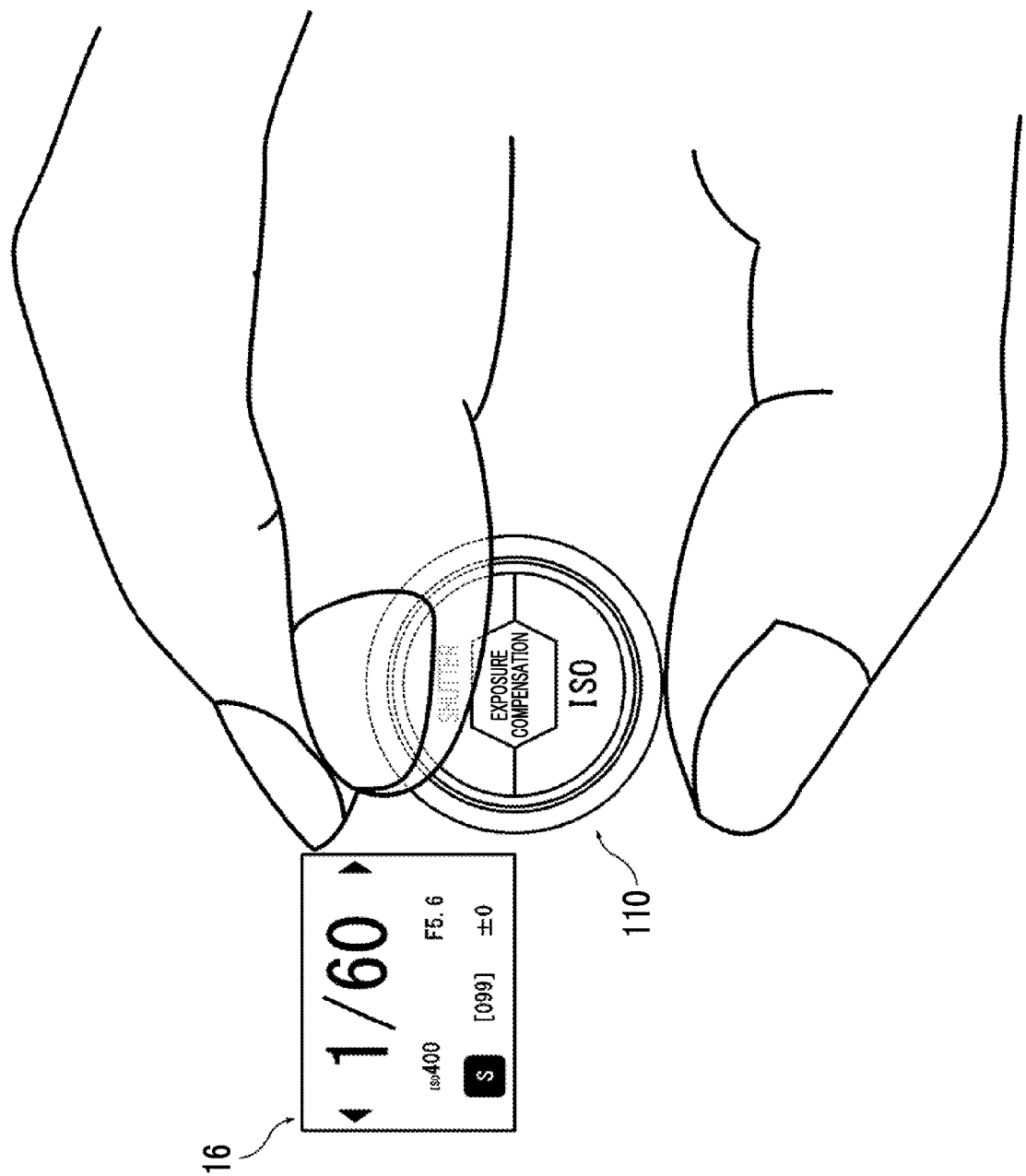
FIG. 19 is a plan view showing further still another example of the display on the sub-display in the case where the setting change is validated.

FIG. 19 is a plan view showing further still another example of the display on the sub-display in the case where the setting change is validated. FIG. 19 shows an example of the display on the sub-display 16 in the case where the setting change of the shutter speed is validated.

As shown in FIG. 19, in the case where the setting change is validated, a display layout may be changed such that the information on the item whose setting change is validated is displayed in a large size. Accordingly, it is possible to easily view the information on the item to be set by operation dial 110 and to confirm the setting values of other items.

Second Embodiment

FIG. 20 is an enlarged diagram of main parts of a digital camera of a second embodiment. Specifically, FIG. 20 is an enlarged plan view of installation portions of the operation dial 110 and the sub-display 16.

As shown in FIG. 20, in the digital camera 1 of the embodiment, a division form of the top surface of the operation dial 110 is different from the digital camera 1 of the first embodiment.

Other configurations are the same as the digital camera 1 of the first embodiment described above. Therefore, only the configuration and action related to a difference will be described herein.

[Configuration]

As shown in FIG. 20, in the digital camera 1 of the embodiment, the top surface of the operation dial 110 is divided into two in the front-rear direction (z direction). Hereinafter, the front side region is referred to as the front region Df, and the rear side region is referred to as the rear region Dr.

The contact detection region is set in each region of the front region Df and the rear region Dr. The contact detection region is a region where the contact of the finger is detected in each region of the front region Df and the rear region Dr. In FIG. 20, a hatched region is the contact detection region set in each region of the front region Df and the rear region Dr. The contact detection region of each region is set within each region as an elliptical region and is symmetrically set in the front-rear direction with the axis of the operation dial 110 as the center.

The touch sensor 130 detects the contact with the contact detection regions Dfz and Drz set in each region of the front region Df and the rear region Dr. In the example, the contact detection regions Dfz and Drz configure the contact detection unit.

[Action]

In the digital camera 1 of the embodiment, in the case where the front region Df on the top surface of the operation dial 110 is touched, the setting change of the shutter speed becomes possible. Further, in the case where the rear region Dr of the top surface thereof is touched, the setting change of the exposure correction value becomes possible. Furthermore, in a case where the front region Df and the rear region Dr are touched at the same time, the setting change of the ISO sensitivity becomes possible. In this manner, in the digital camera 1 of the embodiment, the setting change of the specific item becomes also possible in the case where the front region Df and the rear region Dr are touched in combination.

Figure 21:
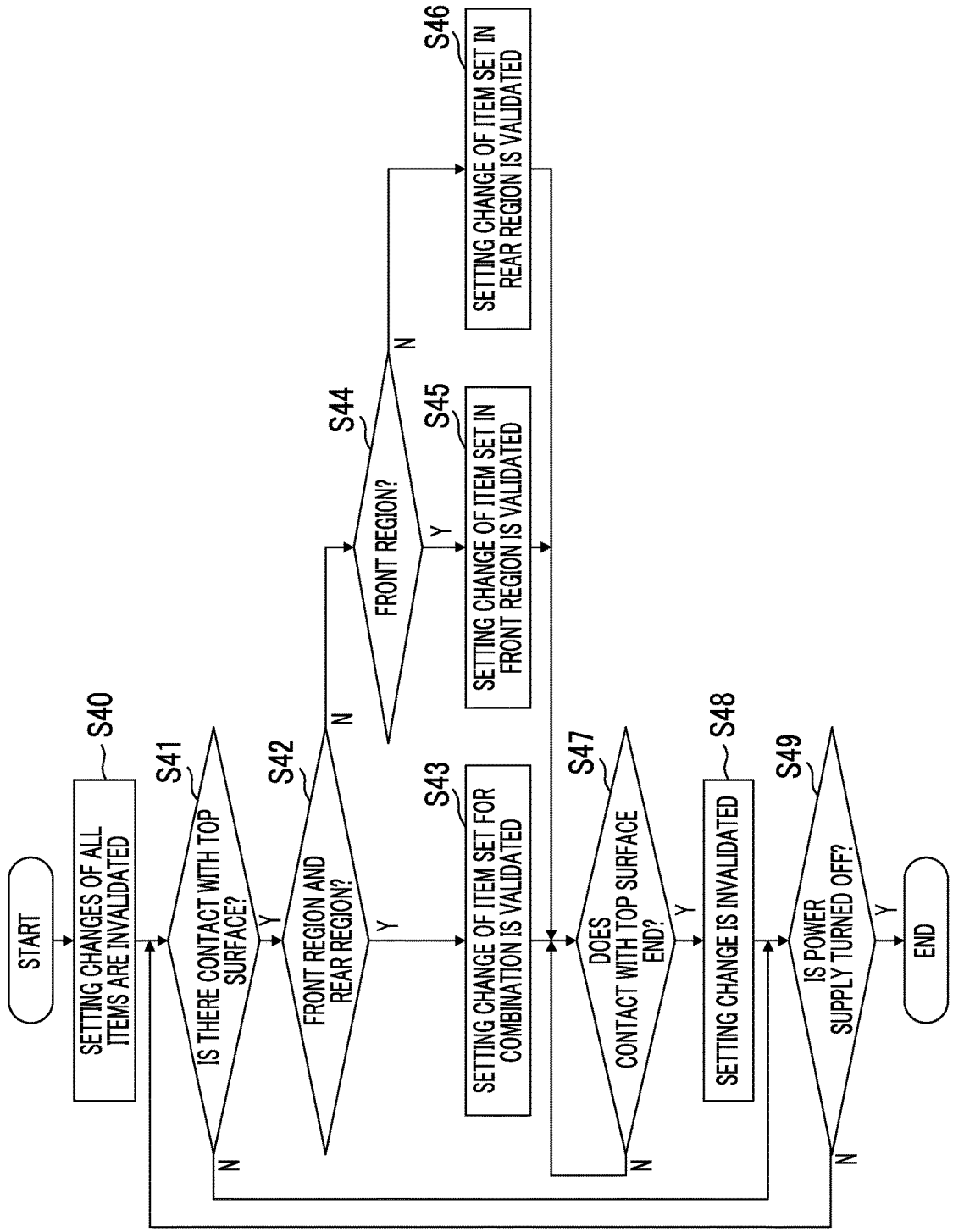
FIG. 21 is a flowchart showing a procedure of the processing of switching between validity and invalidity of the setting change of the item capable of being set by the operation dial.

FIG. 21 is a flowchart showing a procedure of the processing of switching between validity and invalidity of the setting change of the item capable of being set by the operation dial.

In the case where the power supply of the digital camera 1 is turned on, the switching unit 152 invalidates the setting changes by the operation dial 110 of all items capable of being set by the operation dial 110 (step S40). In the digital camera 1 of the embodiment, since the setting changes of the shutter speed, the exposure correction value, and the ISO sensitivity are possible by the operation dial 110, the switching unit 152 invalidates the setting changes of the shutter speed, the exposure correction value, and the ISO sensitivity by the operation dial 110.

Thereafter, the switching unit 152 determines the presence or absence of the contact with the top surface of the operation dial 110 (step S41).

In a case where it is determined that there is contact with the top surface, the switching unit 152 determines whether the contact is made with both the front region Df and the rear region Dr (step S42). Whether the region where the contact is detected is both regions is determined based on the detection result of the touch sensor 130. That is, it is determined whether the contact is detected in both of the contact detection region Dfz set in the front region Df and the contact detection region Drz set in the rear region Dr to determine whether the contact is made with both regions.

In a case where it is determined that the contact is made with both the front region Df and the rear region Dr, the switching unit 152 validates the setting change of the item set for the combination (step S43). In the digital camera 1 of the embodiment, the ISO sensitivity is assigned as the item to be changed in the setting for the combination. Therefore, in this case, the switching unit 152 validates the setting change of the ISO sensitivity.

In the case where the setting change of the ISO sensitivity is validated, the ISO sensitivity information i3 is displayed in a large size on the sub-display 16. Further, the setting change valid mark m2 is displayed at a display position of the ISO sensitivity information i3. Accordingly, it can be recognized that the setting change of the ISO sensitivity is possible from the display on the sub-display 16.

In a case where it is determined that the contact is not the contact with both regions, the switching unit 152 determines whether the contact is made with the front region Df (step S44). In a case where it is determined that the contact is made with the front region Df, the switching unit 152 validates the setting change of an item set in the front region Df (step S45). In the digital camera 1 of the embodiment, the shutter speed is assigned as the item to be changed in the setting in a case where the front region Df is touched alone. Therefore, in this case, the switching unit 152 validates the setting change of the shutter speed.

In the case where the setting change of the shutter speed is validated, the shutter speed information i1 is displayed in a large size on the sub-display 16. Further, the setting change valid mark m2 is displayed at a display position of the shutter speed information i1. Accordingly, it can be recognized that the setting change of the shutter speed is possible from the display on the sub-display 16.

In a case where it is determined that the region where the contact is detected is not the front region Df, the switching unit 152 recognizes that the region where the contact is detected is the rear region Dr. In the case where it is recognized that the region where the contact is detected is the rear region Dr, the switching unit 152 validates the setting change of the item set in the rear region Dr (step S46). In the digital camera 1 of the embodiment, the exposure correction value is assigned as the item to be changed in the setting in a case where the rear region Dr is touched alone. Therefore, in this case, the switching unit 152 validates the setting change of the exposure correction value.

In the case where the setting change of the exposure correction value is validated, the exposure correction value information i4 is displayed in a large size on the sub-display 16. Further, the setting change valid mark m2 is displayed at a display position of the exposure correction value information i4. Accordingly, it can be recognized that the setting change of the exposure correction value is possible from the display on the sub-display 16.

Thereafter, the switching unit 152 determines whether the contact with the top surface of the operation dial 110 ends based on the output from the touch sensor 130 (step S47).

In the case where it is determined that the contact with the top surface of the operation dial 110 ends, the switching unit 152 switches the setting change of an item whose setting change is valid to invalid (step S48).

Thereafter, the switching unit 152 determines whether the power supply is turned off (step S49). In the case where it is determined that the power supply is turned off, the processing ends. On the other hand, in the case where it is determined that the power supply is not turned off, the processing returns to step S41 to execute the above processing again.

In this manner, in the digital camera 1 of the embodiment, the setting change of the specific item becomes also possible in the case where the front region Df and the rear region Dr are touched in combination. Accordingly, it is possible to reduce the number of settings of the contact detection unit.

Modification Example

«Item to be Changed in Setting by Operation Dial»

The item whose setting change is validated in the case where each region is touched can be set as appropriate depending on the function or the like provided in the camera as in the digital camera 1 of the first embodiment.

For example, in the configuration shown in FIG. 20, in a case where the front region Df on the top surface is touched, the setting change of the shutter speed is set so as to be validated, and in a case where the rear region Dr on the top surface is touched, the setting change of the F-number is set so as to be validated. In the case where the front region Df and the rear region Dr are touched at the same time, the imaging mode is set so as to be switched to the program mode, and a program shift is set so as to be possible by the operation dial. The program mode refers to a mode in which a combination of the F-number and the shutter speed can be changed while the exposure is constantly maintained. In this case, the combination of the F-number and the shutter speed is changed in response to the rotation operation of the operation dial 110. That is, the program shift is performed. For example, in the case where the operation dial 110 is rotated in the plus direction, the setting change is performed such that the shutter speed increases (F-number increases). In the case where the operation dial 110 is rotated in the minus direction, the setting change is performed such that the shutter speed decreases (F-number decreases).

Further, for example, in the configuration of dividing the top surface of the operation dial 110 into four as shown in FIG. 15, the setting change of the shutter speed is set so as to be validated in the case where the left front region Dlf is touched, the setting change of the F-number is set so as to be validated in the case where the right front region Drf is touched, the setting change of the ISO sensitivity is set so as to be validated in the case where the left rear region Dlr is touched, and the setting change of the imaging mode is set so as to be validated in the case where the right rear region Drr is touched. In a case where the left front region Dlf and the right front region Drf are touched at the same time, the imaging mode is set so as to be switched to the program mode, and a program shift is set so as to be possible by the operation dial.

In this manner, the item whose setting change is validated in the case where each region is touched can be set as appropriate.

Third Embodiment

Figure 22:
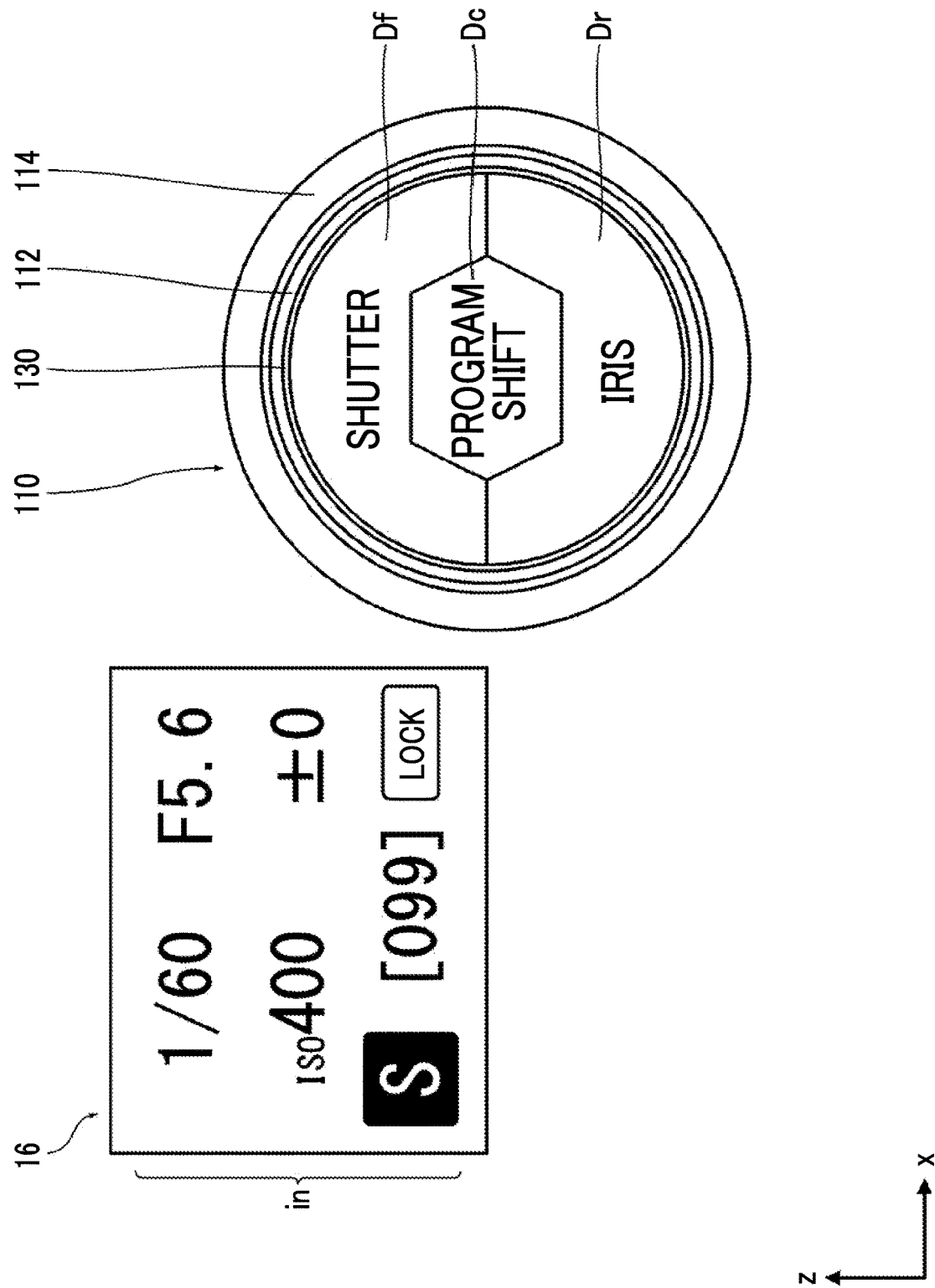
FIG. 22 is an enlarged diagram of the main parts of a digital camera of a third embodiment.

FIG. 22 is an enlarged diagram of the main parts of a digital camera of a third embodiment. Specifically, FIG. 20 is an enlarged plan view of the installation portions of the operation dial 110 and the sub-display 16.

In the digital camera 1 of the embodiment, a specific position on the top surface of the operation dial 110 is touched to switch the imaging mode. Further, the item capable of being set by the operation dial is switched depending on the switched imaging mode.

In the following description, only difference from the digital camera 1 of the first embodiment described above will be described.

The top surface of the operation dial 110 is divided into three regions. A division form is the same as that of the digital camera 1 of the first embodiment. That is, the top surface of the operation dial 110 is divided into three regions of the front region Df, the center region Dc, and the rear region Dr.

In the case where the front region Df is touched, the imaging mode is set to the shutter speed priority mode. In the case where the center region Dc is touched, the imaging mode is set to the program mode. In the case where the rear region Dr is touched, the imaging mode is set to the aperture stop priority mode. Further, in the case where the operation dial 110 is rotationally operated while the top surface is not touched, the imaging mode is set to the auto mode.

Here, the shutter speed priority mode refers to a mode in which the camera automatically decides the F-number such that the proper exposure is made with respect to the shutter speed selected by the user. In the case of the shutter speed priority mode, a function of setting the shutter speed is assigned to the operation dial 110.

The program mode refers to a mode in which the user can change the combination of the F-number and the shutter speed while the exposure is constantly maintained as described above. In the case of the program mode, a function of the program shift is assigned to the operation dial 110. That is, a function of changing a combination of the shutter speed and the F-number is assigned.

The aperture stop priority mode refers to a mode in which the camera automatically decides the shutter speed such that the proper exposure is made with respect to the F-number selected by the user. In the case of the aperture stop priority mode, a function of setting the F-number is assigned to the operation dial 110.

The auto mode refers to a mode in which the camera automatically decides the F-number and the shutter speed such that the proper exposure is made based on a photometry result. That is, the auto mode is a mode in which the camera automatically performs all settings. In the case of the auto mode, the operation of the operation dial 110 is invalidated. That is, no change is performed even in the case where the operation dial 110 is rotationally operated.

Figure 23:
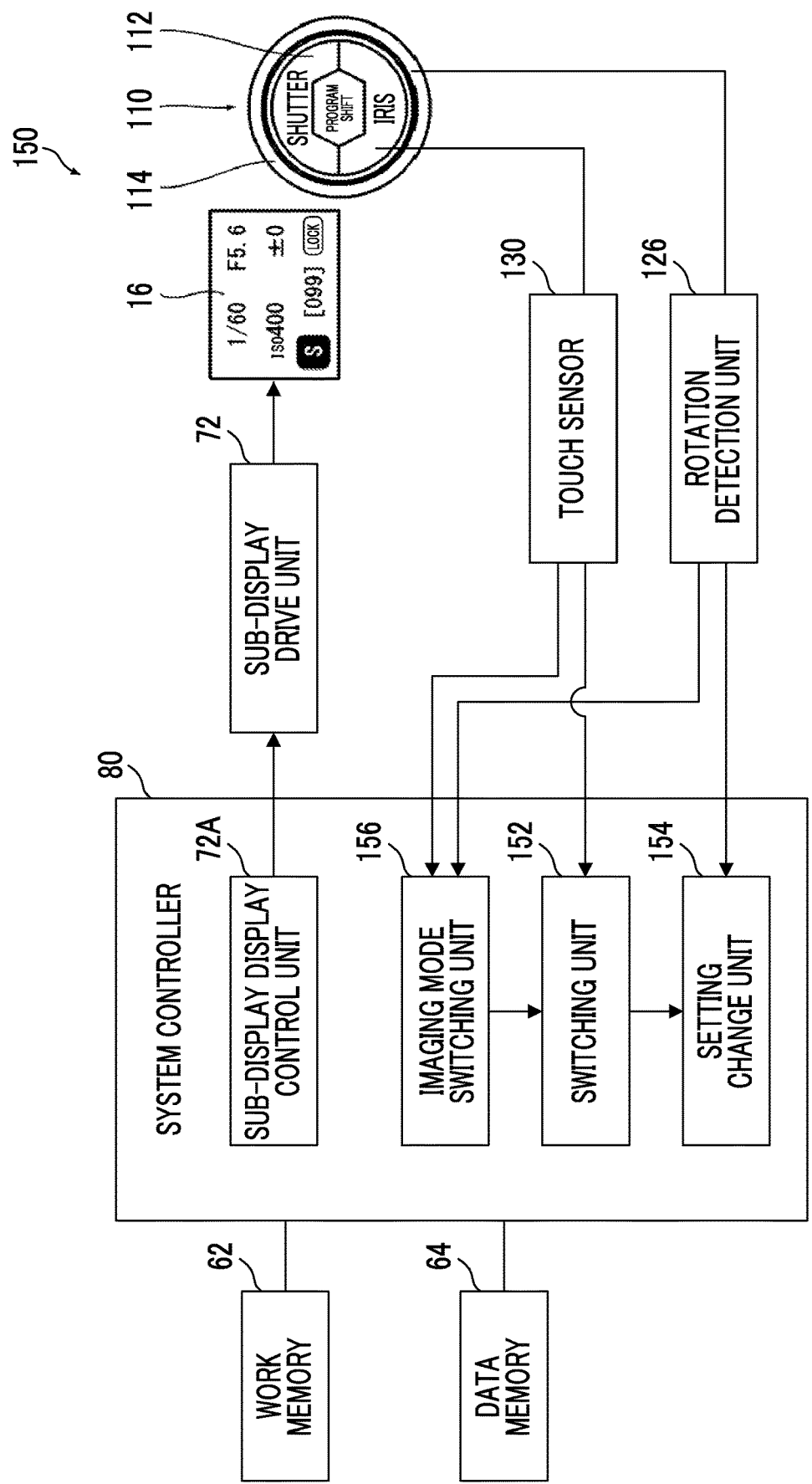
FIG. 23 is a block diagram showing the schematic configuration of a setting system by using the operation dial.

FIG. 23 is a block diagram showing the schematic configuration of a setting system by using the operation dial 110.

As shown in FIG. 23, an imaging mode switching unit 156 is provided in the setting system 150. The imaging mode switching unit 156 switches the imaging mode based on the detection results of the touch sensor 130 and the rotation detection unit 126.

In the case where the touch sensor 130 detects that the front region Df is touched, the imaging mode switching unit 156 sets the imaging mode to the shutter speed priority mode. The touch sensor 130 detects the contact with the contact detection region Dfz set in the front region Df to detect the contact with the front region Df (refer to FIG. 6).

Further, in the case where the touch sensor 130 detects that the center region Dc is touched, the imaging mode switching unit 156 sets the imaging mode to the program mode. The touch sensor 130 detects the contact with the contact detection region Dcz set in the center region Dc to detect the contact with the center region Dc (refer to FIG. 6).

Further, in the case where the touch sensor 130 detects that the rear region Dr is touched, the imaging mode switching unit 156 sets the imaging mode to the aperture stop priority mode. The touch sensor 130 detects the contact with the contact detection region Drz set in the rear region Dr to detect the contact with the rear region Dr (refer to FIG. 6).

Further, in a case where the rotation detection unit 126 detects the rotation of the operation dial 110 in a state where there is no output from the touch sensor 130, that is, in a state of non-contact, the imaging mode switching unit 156 sets the imaging mode to the auto mode.

The function of the imaging mode switching unit 156 is provided as one function of the system controller 80. That is, the microcomputer configuring the system controller 80 executes a predetermined control program to provide the function of the imaging mode switching unit 156 by the system controller 80.

The switching unit 152 switches between validity and invalidity of the setting change of the item set for each imaging mode based on the output from the touch sensor 130.

Here, the imaging mode is switched according to a region where the touch sensor 130 detects the contact as described above. Therefore, the item whose setting change is switched between valid and invalid is also switched according to the region where the touch sensor 130 detects the contact.

Specifically, in the case where the touch sensor 130 detects the contact with the front region Df, the switching unit 152 validates the setting change of the shutter speed while the contact is detected. In this case, the imaging mode is set to the shutter speed priority mode.

In the case where the touch sensor 130 detects the contact with the center region Dc, the switching unit 152 validates the program shift while the contact is detected. That is, the setting change of a combination of the shutter speed and the F-number is validated. In this case, the imaging mode is set to the program mode.

In the case where the touch sensor 130 detects the contact with the rear region Dr, the switching unit 152 validates the setting change of the F-number while the contact is detected. In this case, the imaging mode is set to the aperture stop priority mode.

[Operation of Digital Camera]

First, a method of switching between validity and invalidity of the setting change of the item capable of being set by the operation dial 110 will be described.

Figure 24:
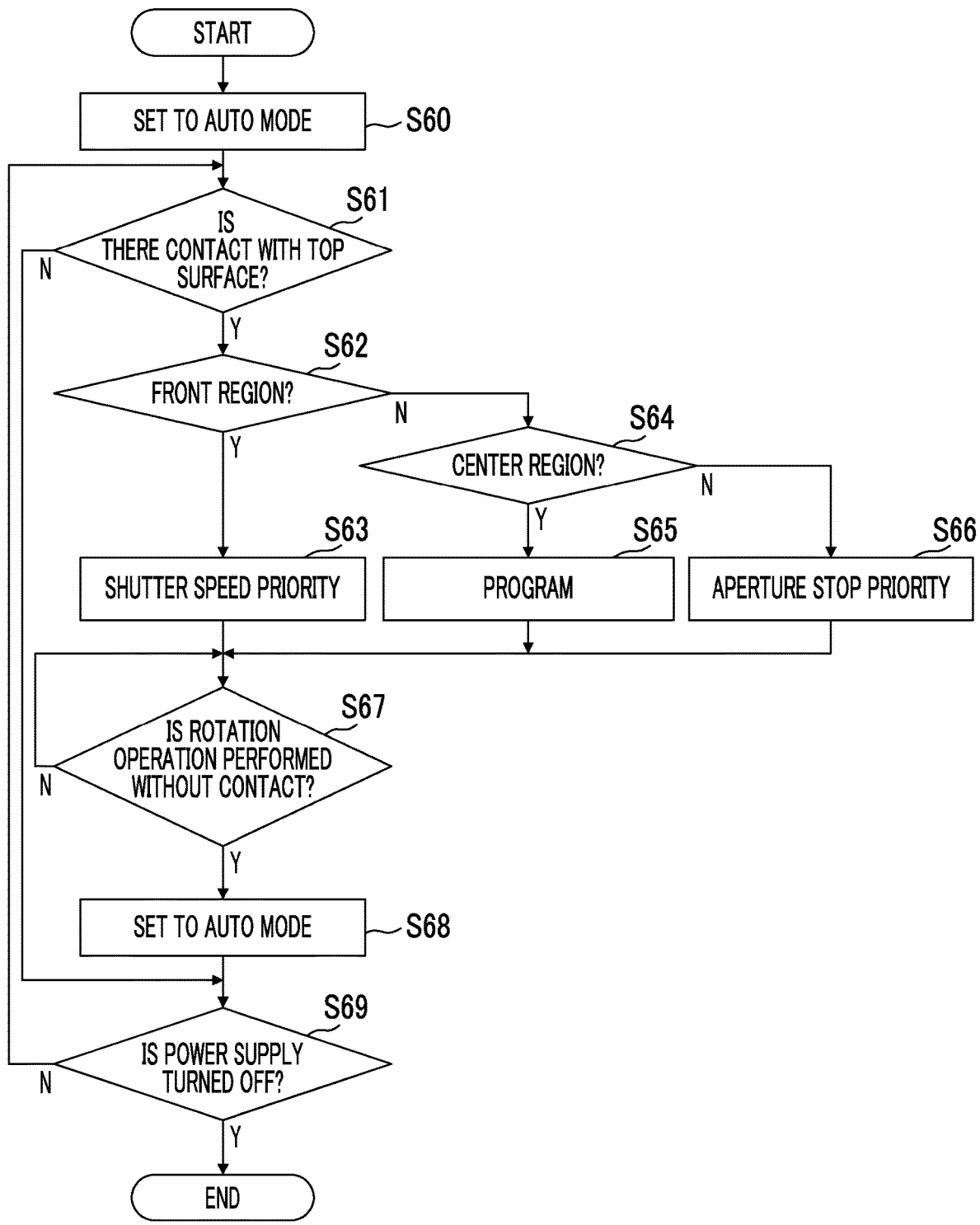
FIG. 24 is a flowchart showing a procedure of processing of switching an imaging mode.

FIG. 24 is a flowchart showing a procedure of processing of switching the imaging mode.

In the case where the power supply of the digital camera 1 is turned on, the imaging mode switching unit 156 sets the imaging mode to the auto mode (step S60).

Thereafter, the imaging mode switching unit 156 determines the presence or absence of the contact with the top surface of the operation dial 110 (step S61).

In the case where it is determined that there is contact with the top surface, the imaging mode switching unit 156 determines whether the region where the contact is detected is the front region Df (step S62).

In the case where the region where the contact is detected is the front region Df, the imaging mode switching unit 156 sets the imaging mode to the shutter speed priority mode (step S63). In this case, the setting change of the shutter speed is validated by the switching unit 152 while the contact is detected.

In a case where it is determined that the region where the contact is detected is not the front region Df, the imaging mode switching unit 156 determines whether the region where the contact is detected is the center region Dc (step S64).

In a case where it is determined that the region where the contact is detected is the center region Dc, the imaging mode switching unit 156 sets the imaging mode to the program mode (step S65). In this case, the program shift is validated by the switching unit 152 while the contact is detected.

In a case where it is determined that the region where the contact is detected is not the center region Dc, the imaging mode switching unit 156 recognizes that the region where the contact is detected is the rear region Dr. In this case, the imaging mode switching unit 156 sets the imaging mode to the aperture stop priority mode (step S66). In this case, the setting change of the F-number is validated by the switching unit 152 while the contact is detected.

Thereafter, the imaging mode switching unit 156 determines whether the operation dial 110 is rotationally operated while the top surface is not touched (step S67).

In a case where it is determined that the operation dial 110 is rotationally operated while the top surface is not touched, the imaging mode switching unit 156 sets the imaging mode to the auto mode (step S68).

Thereafter, the imaging mode switching unit 156 determines whether the power supply is turned off (step S69). In the case where it is determined that the power supply is turned off, the processing ends. On the other hand, in the case where it is determined that the power supply is not turned off, the processing returns to step S61 to execute the above processing again.

In this manner, in the case where the top surface of the operation dial 110 is touched, the imaging mode is switched according to the touched region. The imaging mode set once is maintained even in a case where the finger is released from the top surface. Further, in the case where the operation dial 110 is rotationally operated while the top surface is not touched, the imaging mode is switched to the auto mode.

Next, processing in the case where the setting change is performed by rotationally operating the operation dial 110 will be described.

Figure 25:
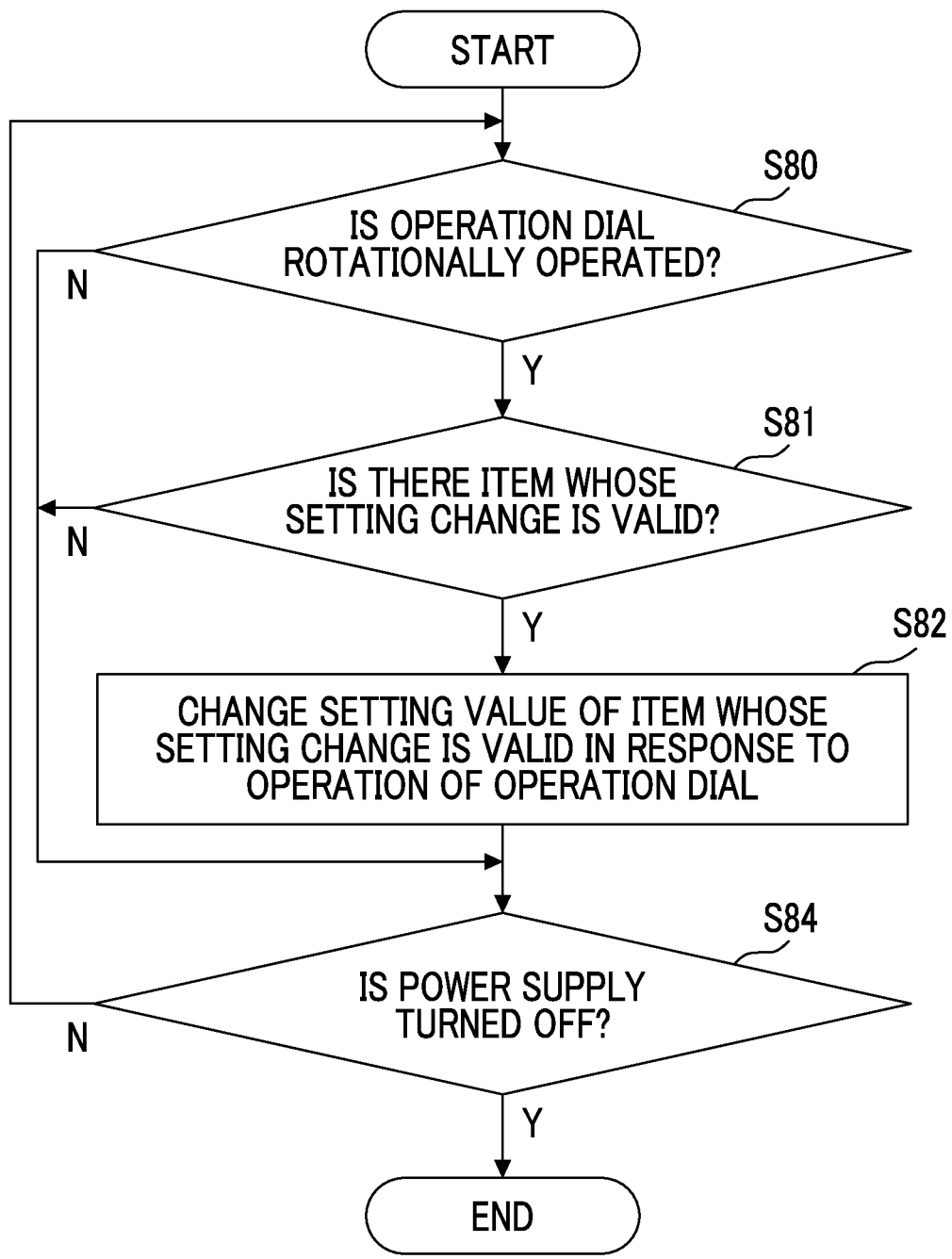
FIG. 25 is a flowchart showing a procedure of the processing of the setting change based on the operation of the operation dial.

FIG. 25 is a flowchart showing a procedure of the processing of the setting change based on the operation of the operation dial 110.

In the case where the power supply of the digital camera 1 is turned on, the setting change unit 154 determines whether the operation dial 110 is rotationally operated (step S80).

In the case where it is determined that the operation dial 110 is rotationally operated, the setting change unit 154 determines whether there is the item whose setting change is valid based on the setting of the switching unit 152 (step S81). The setting change is validated only in the case where the contact with the top surface of the operation dial 110 is detected.

In a case where it is determined that there is the item whose setting change is valid, the setting change unit 154 changes the setting value of the item whose setting change is valid based on the operation of the operation dial 110 (step S82).

As described above, the item whose setting change is valid is set by the imaging mode. In the case of the shutter speed priority mode, the setting change of the shutter speed is validated. Therefore, in this case, the shutter speed is changed in response to the operation of the operation dial 110. In the case of the program mode, the program shift is validated. Therefore, in this case, the program shift is performed in response to the operation of the operation dial 110. That is, the combination of the shutter speed and the F-number is changed. In the case of the aperture stop priority mode, the setting change of the F-number is validated. Therefore, in this case, the F-number is changed in response to the operation of the operation dial 110.

In the case where there is no item whose setting change is valid, that is, the operation dial 110 is rotationally operated while the top surface is not touched, the setting change is not performed.

Thereafter, the setting change unit 154 determines whether the power supply is turned off (step S84). In the case where it is determined that the power supply is turned off, the processing ends. On the other hand, in the case where it is determined that the power supply is not turned off, the processing returns to step S80 to execute the above processing again.

In this manner, the operation by the operation dial 110 is validated only in the case where there is the item whose setting change is validated. The item whose setting change is validated is switched according to the imaging mode. Accordingly, it is possible to assign an optimum function to the operation dial 110 depending on the situation and thus to provide good operability.

Further, in the case where there is no item whose setting change is validated, the operation of the operation dial 110 is invalidated. In this case, the operation dial 110 is electronically locked. Accordingly, it is possible to prevent the setting from being changed carelessly.

The display on the sub-display 16 is also switched according to the set imaging mode.

Figure 26:
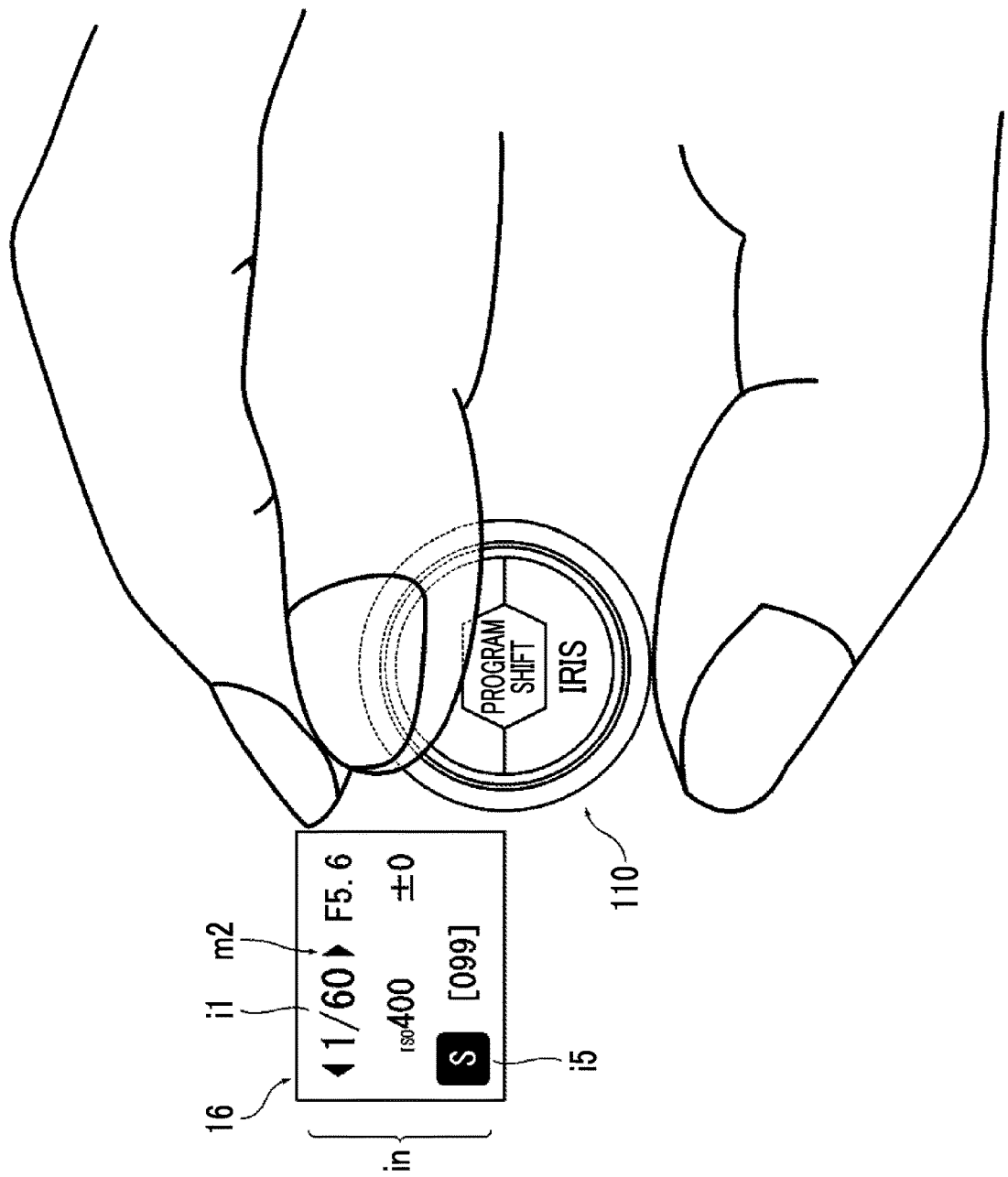
FIG. 26 is a diagram showing an example of the display on the sub-display in a case where a shutter speed priority mode is set.

FIG. 26 is a diagram showing an example of the display on the sub-display in the case where the shutter speed priority mode is set.

As shown in FIG. 26, in the case where the imaging mode is set to the shutter speed priority mode, an icon indicating that the imaging mode is set to the shutter speed priority mode is displayed on the sub-display 16 as the imaging mode information i5. This icon is formed of a figure in which a character of S is displayed in a black square.

Further, in the case where the imaging mode is set to the shutter speed priority mode, the shutter speed information i1 is displayed in a large size.

Furthermore, in the case where the setting change is valid, that is, the contact with the front region Df is detected, the setting change valid mark m2 is displayed at the display position of the shutter speed information i1.

Figure 29:
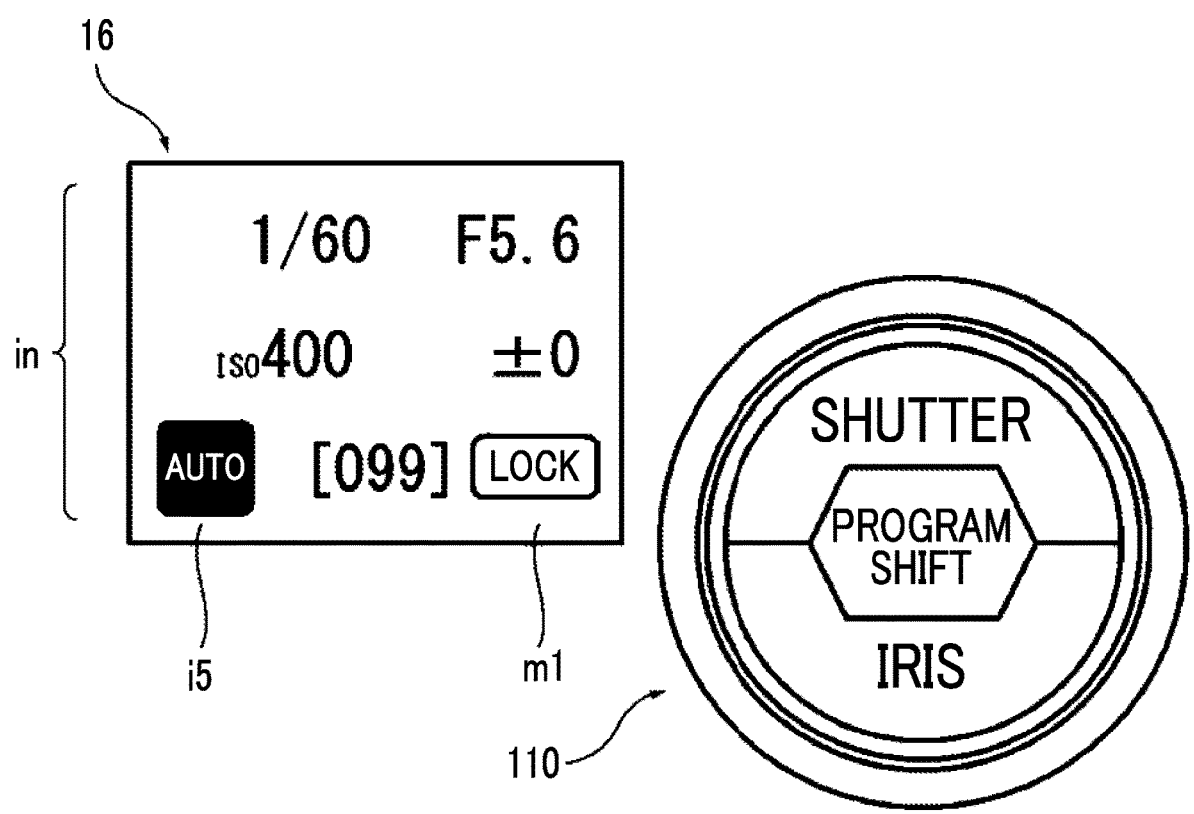
FIG. 29 is a diagram showing an example of the display on the sub-display in a case where an auto mode is set.

On the other hand, in the case where the setting change is invalid, that is, the contact with the top surface of the operation dial 110 is not detected, the lock mark m1 is displayed at a predetermined position on the sub-display 16 (refer to FIG. 29).

Figure 27:
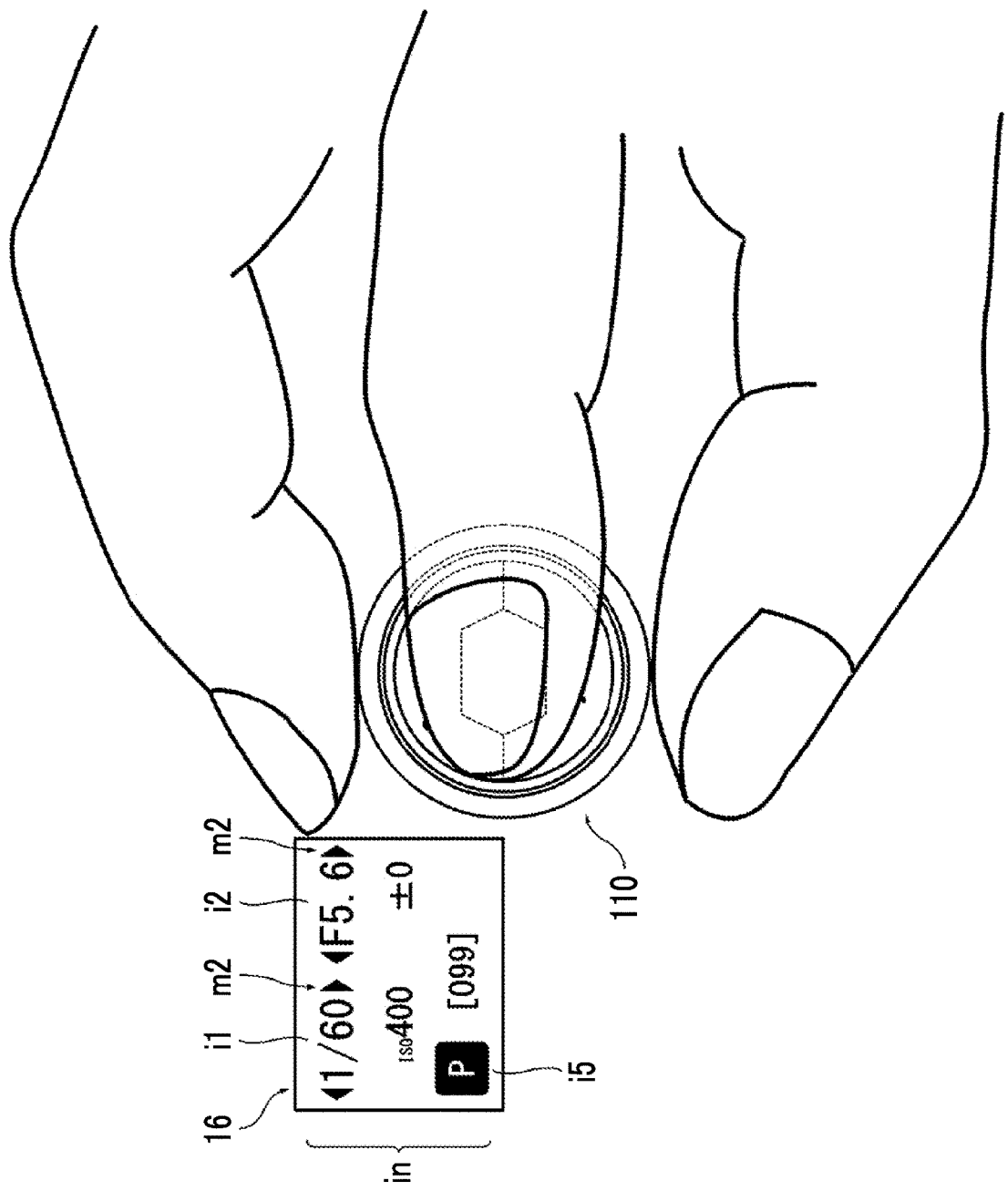
FIG. 27 is a diagram showing an example of the display on the sub-display in a case where a program mode is set.

FIG. 27 is a diagram showing an example of the display on the sub-display in the case where a program mode is set.

As shown in FIG. 27, in the case where the imaging mode is set to the program mode, an icon indicating that the imaging mode is set to the program mode is displayed on the sub-display 16 as the imaging mode information i5. This icon is formed of a figure in which a character of P is displayed in a black square.

Further, in the case where the imaging mode is set to the program mode, the shutter speed information i1 and F-number information i2 are displayed in a large size.

Furthermore, in the case where the setting change is valid, that is, the contact with the center region Dc is detected, the setting change valid marks m2 are displayed at the display position of the shutter speed information i1 and at a display position of the F-number information i2.

On the other hand, in the case where the setting change is invalid, that is, the contact with the top surface of the operation dial 110 is not detected, the lock mark m1 is displayed at a predetermined position on the sub-display 16 (refer to FIG. 29).

Figure 28:
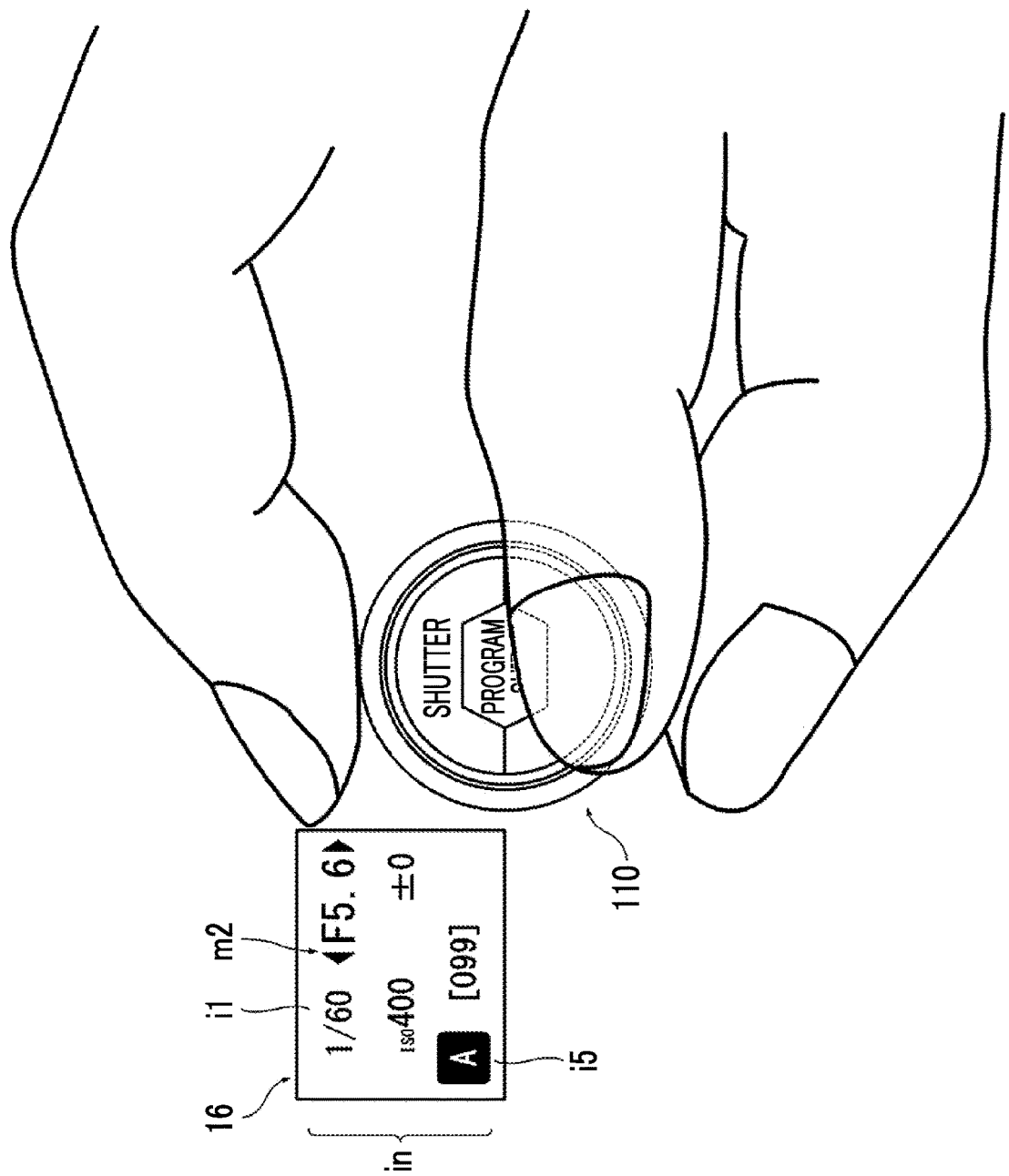
FIG. 28 is a diagram showing an example of the display on the sub-display in a case where an aperture stop priority mode is set.

FIG. 28 is a diagram showing an example of the display on the sub-display in the case where an aperture stop priority mode is set.

As shown in FIG. 28, in the case where the imaging mode is set to the aperture stop priority mode, an icon indicating that the imaging mode is set to the aperture stop priority mode is displayed on the sub-display 16 as the imaging mode information i5. This icon is formed of a figure in which a character of A is displayed in a black square.

Further, in the case where the imaging mode is set to the aperture stop priority mode, the F-number information i2 is displayed in a large size.

Furthermore, in the case where the setting change is valid, that is, the contact with the rear region Dr is detected, the setting change valid mark m2 is displayed at the display position of the F-number information i2.

On the other hand, in the case where the setting change is invalid, that is, the contact with the top surface of the operation dial 110 is not detected, the lock mark m1 is displayed at a predetermined position on the sub-display 16 (refer to FIG. 29).

FIG. 29 is a diagram showing an example of the display on the sub-display in the case where an auto mode is set.

As shown in FIG. 29, in the case where the imaging mode is set to the auto mode, an icon indicating that the imaging mode is set to the auto mode is displayed on the sub-display 16 as the imaging mode information i5. This icon is formed of a figure in which a character of AUTO is displayed in a black square.

Further, in the case where the imaging mode is set to the auto mode, the lock mark m1 is displayed at a predetermined position on the sub-display 16.

Modification Example

«Imaging Mode to be Set»

A mode to be set in the case where the contact is detected can be set as appropriate according to the imaging mode of the camera. Further, a function assigned to the operation dial according to the set mode also can be set as appropriate according to the mode to be set.

Further, in the above embodiment, in the case where the operation dial 110 is rotationally operated while the top surface is not touched, the imaging mode is switched to the auto mode, but the imaging mode may not be switched to the auto mode. In this case, the imaging mode set in a last touched region is maintained.

Further, in the case where the imaging mode is switched to the auto mode, a method of instructing the switching is not limited to that of the embodiment. For example, the imaging mode may be switched to the auto mode in a case where a dedicated switching button is prepared and this switching button is pressed.

«Layout of Contact Detection Unit to be set on Top Surface of Operation Dial»

In the embodiment, the top surface of the operation dial 110 is divided into three regions. However, the division form, that is, the layout of the contact detection unit to be set on the top surface of the operation dial 110 can be set as appropriate according to the imaging mode of the camera and the like.

Figure 30:
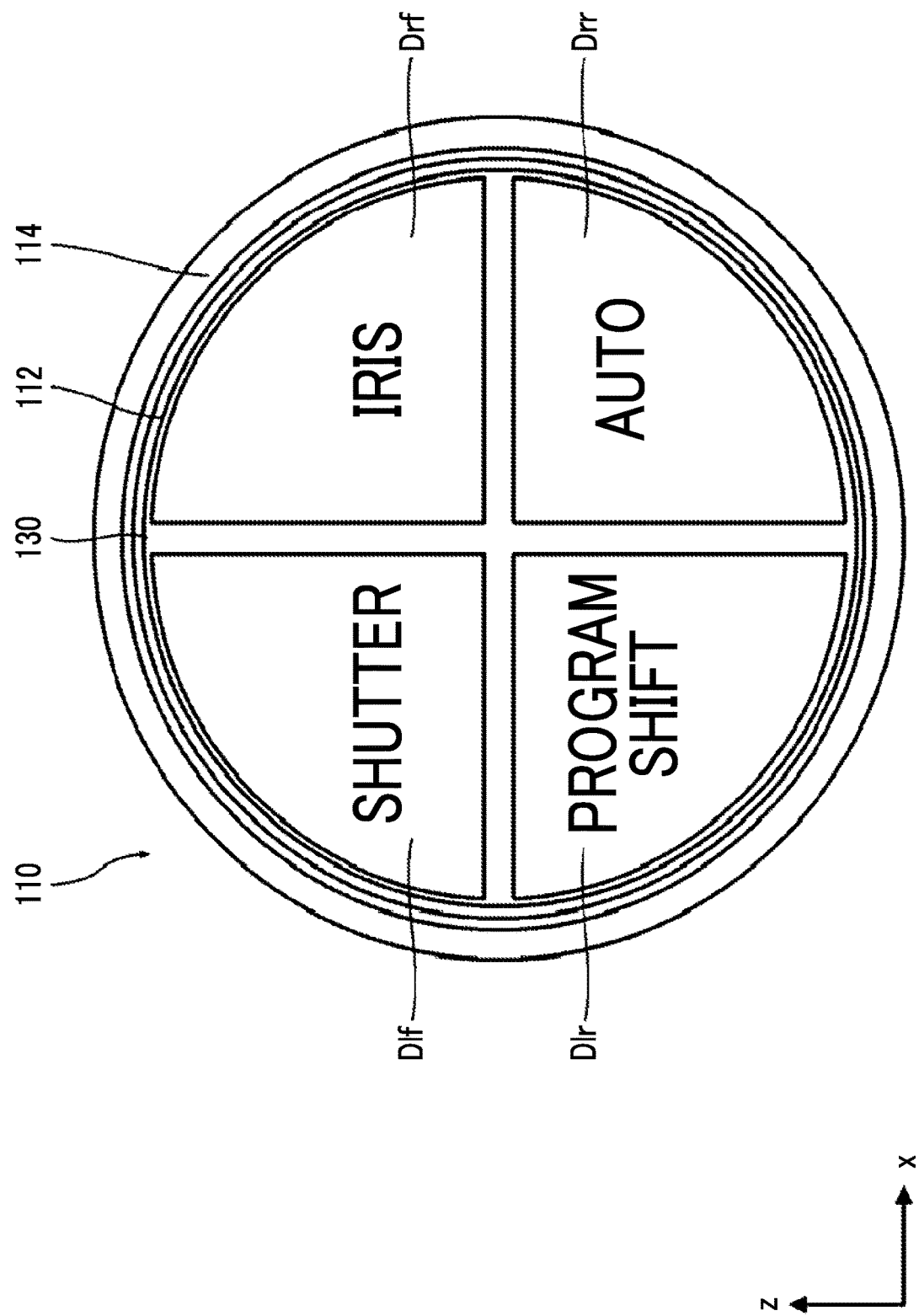
FIG. 30 is a plan view showing an example in a case where four contact detection units are set on the top surface of the operation dial.

FIG. 30 is a plan view showing an example in the case where four contact detection units are set on the top surface of the operation dial 110.

In the example shown in FIG. 30, the top surface of the operation dial 110 is divided into four in the circumference direction, and the contact in each region is individually detected.

Further, FIG. 30 shows an example in a case where the imaging mode is set to the shutter speed priority mode in the case where the left front region Dlf on the top surface is touched, the imaging mode is set to the aperture stop priority mode in the case where the right front region Drf on the top surface is touched, the imaging mode is set to the program mode in the case where the left rear region Dlr on the top surface is touched, and the imaging mode is set to the auto mode in the case where the right rear region Drr on the top surface is touched.

Therefore, in this case, in the case where the operation dial 110 is rotationally operated while the left front region Dlf on the top surface is touched, the shutter speed is changed in response to the operation thereof.

Further, in the case where the operation dial 110 is rotationally operated while the right front region Drf on the top surface is touched, the F-number is changed in response to the operation thereof.

Further, in the case where the operation dial 110 is rotationally operated while the left rear region Dlr on the top surface is touched, the program shift is performed in response to the operation thereof.

On the other hand, even in the case where the operation dial 110 is rotationally operated while the right rear region Drr is touched, the operation thereof is invalidated and thus no setting is changed.

Fourth Embodiment

Figure 31:
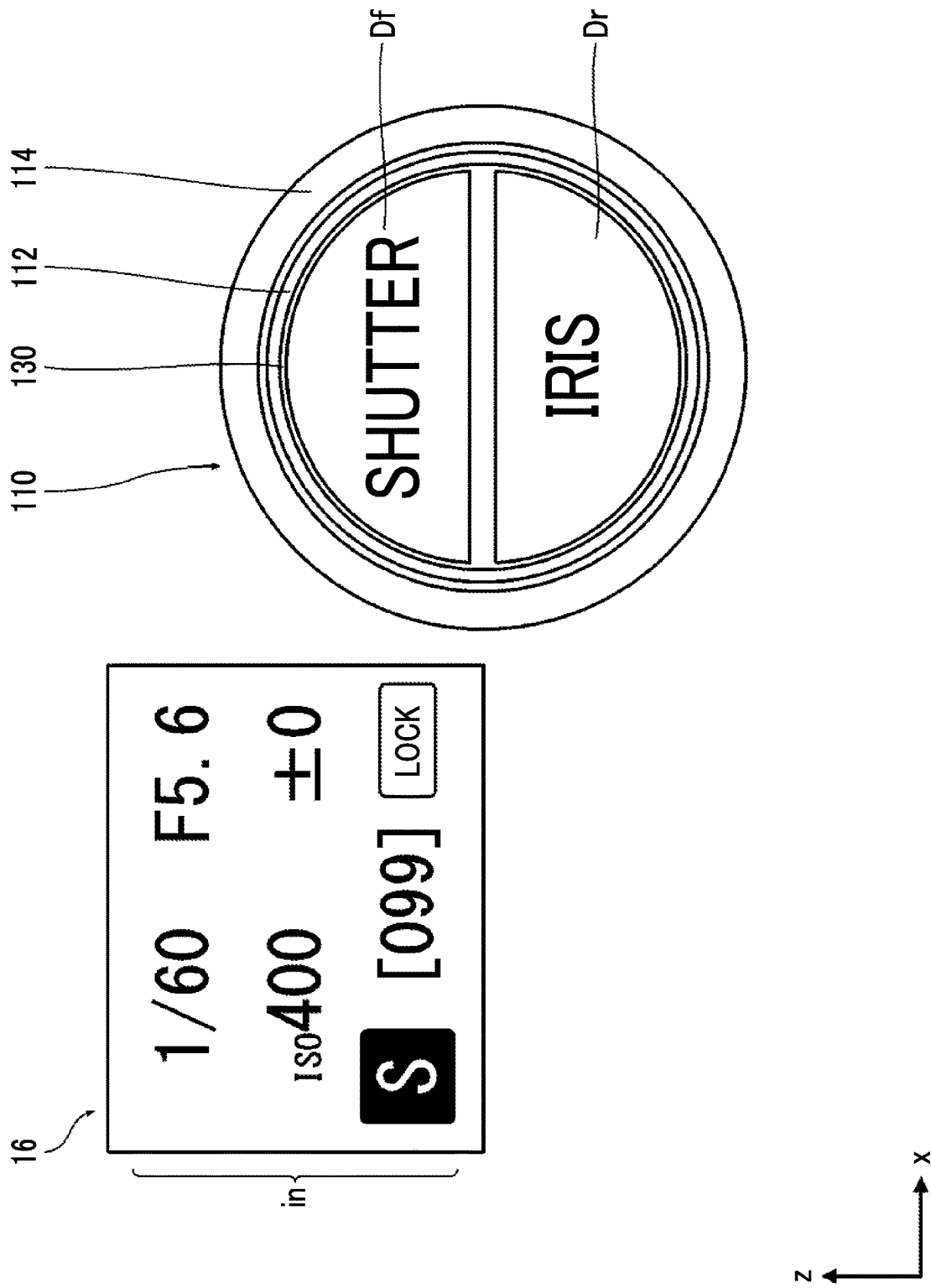
FIG. 31 is an enlarged diagram in which the main parts of a digital camera of a fourth embodiment.

FIG. 31 is an enlarged diagram in which the main parts of a digital camera 1 of a fourth embodiment. Specifically, FIG. 31 is an enlarged plan view of the installation portions of the operation dial 110 and the sub-display 16.

The digital camera 1 of the embodiment is in common with the digital camera 1 of the third embodiment in that the imaging mode is switched by touching a specific position on the top surface of the operation dial 110 and the item capable of being set by the operation dial is switched in conjunction with the switching.

In the digital camera 1 of the embodiment, in the case where a plurality of regions are touched at the same time, the imaging mode is switched to a specific imaging mode by a combination of the touched regions.

As shown in FIG. 31, the division form of the top surface of the operation dial 110 is the same as that of the digital camera 1 of the second embodiment. That is, the top surface of the operation dial 110 is divided into two of the front region Df and the rear region Dr in the front-rear direction (z direction).

In the digital camera 1 of the embodiment, in the case where the front region Df on the top surface of the operation dial 110 is touched, the imaging mode is set to the shutter speed priority mode. Further, in the case where the rear region Dr on the top surface of the operation dial 110 is touched, the imaging mode is set to the aperture stop priority mode. Further, in the case where the front region Df and the rear region Dr are touched at the same time, the imaging mode is set to the program mode. Further, in the case where the operation dial is rotationally operated while the top surface is not touched, the imaging mode is set to the auto mode.

The configuration of a setting system is the same as that of the digital camera 1 of the third embodiment. Therefore, only the operation of the digital camera will be described herein.

Figure 32:
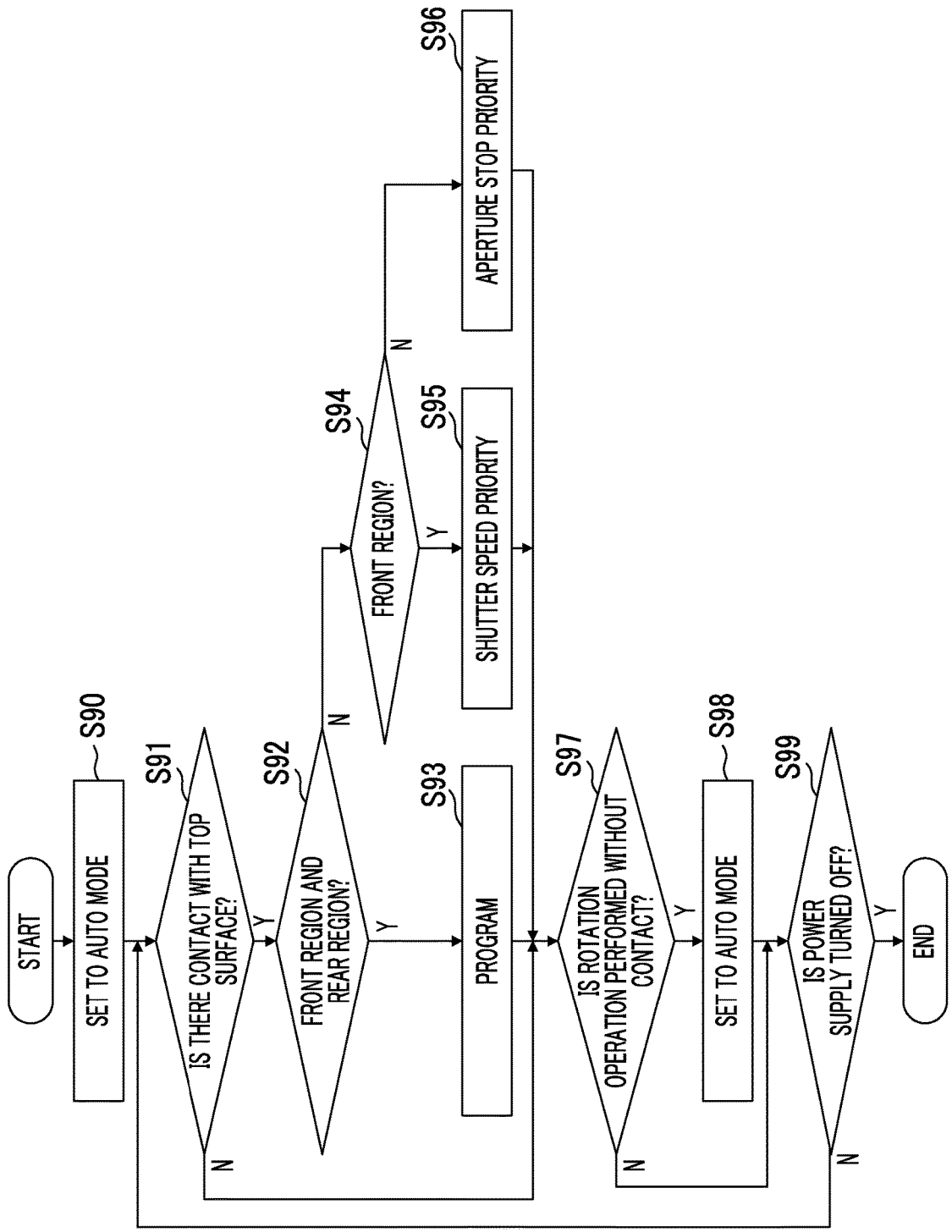
FIG. 32 is a flowchart showing a procedure of the processing of switching the imaging mode.

FIG. 32 is a flowchart showing a procedure of the processing of switching the imaging mode.

In the case where the power supply of the digital camera 1 is turned on, the imaging mode switching unit 156 sets the imaging mode to the auto mode (step S90).

Thereafter, the imaging mode switching unit 156 determines the presence or absence of the contact with the top surface of the operation dial 110 (step S91).

In the case where it is determined that there is contact with the top surface, the imaging mode switching unit 156 determines whether the region where the contact is detected is both the front region Df and the rear region Dr (step S92).

In a case where the region where the contact is detected is both the front region Df and the rear region Dr, the imaging mode switching unit 156 sets the imaging mode to the program mode (step S93). In this case, the program shift is validated by the switching unit 152 while the contact is detected.

In a case where it is determined that the region where the contact is detected is not both the front region Df and the rear region Dr, the imaging mode switching unit 156 determines whether the region where the contact is detected is the front region Df (step S94).

In the case where it is determined that the region where the contact is detected is the front region Df, the imaging mode switching unit 156 sets the imaging mode to the shutter speed priority mode (step S95). In this case, the setting change of the shutter speed is validated by the switching unit 152 while the contact is detected.

In the case where it is determined that the region where the contact is detected is not the front region Df, the imaging mode switching unit 156 recognizes that the region where the contact is detected is the rear region Dr. In this case, the imaging mode switching unit 156 sets the imaging mode to the aperture stop priority mode (step S96). In this case, the setting change of the F-number is validated by the switching unit 152 while the contact is detected.

Thereafter, the imaging mode switching unit 156 determines whether the operation dial 110 is rotationally operated while the top surface is not touched (step S97).

In the case where it is determined that the operation dial 110 is rotationally operated while the top surface is not touched, the imaging mode switching unit 156 sets the imaging mode to the auto mode (step S98).

Thereafter, the imaging mode switching unit 156 determines whether the power supply is turned off (step S99). In the case where it is determined that the power supply is turned off, the processing ends. On the other hand, in the case where it is determined that the power supply is not turned off, the processing returns to step S91 to execute the above processing again.

In this manner, in the case where the top surface of the operation dial 110 is touched, the imaging mode is switched according to the touched region. The imaging mode set once is maintained even in a case where the finger is released from the top surface. Further, in the case where the operation dial 110 is rotationally operated while the top surface is not touched, the imaging mode is switched to the auto mode.

The display on the sub-display 16 is also switched according to the set imaging mode as in the digital camera 1 of the third embodiment.

Figure 33:
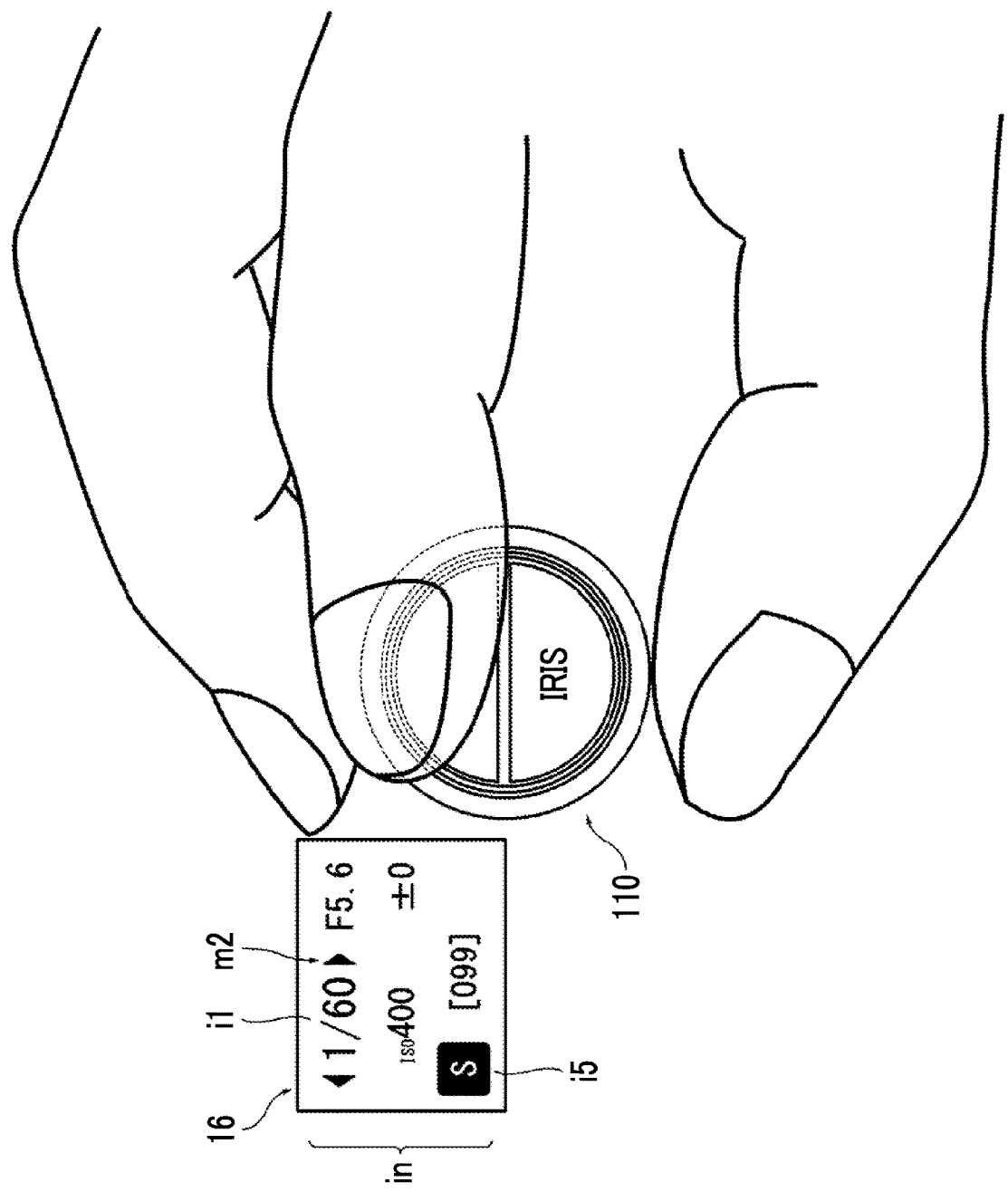
FIG. 33 is a diagram showing an example of the display on the sub-display in the case where the shutter speed priority mode is set.

FIG. 33 is a diagram showing an example of the display on the sub-display in the case where the shutter speed priority mode is set.

As shown in FIG. 33, in the case where the imaging mode is set to the shutter speed priority mode, an icon indicating that the imaging mode is set to the shutter speed priority mode is displayed on the sub-display 16 as the imaging mode information i5.

Further, in the case where the imaging mode is set to the shutter speed priority mode, the shutter speed information i1 is displayed in a large size.

Furthermore, in the case where the setting change is valid, that is, the contact with the front region Df is detected, the setting change valid mark m2 is displayed at the display position of the shutter speed information i1.

Figure 36:
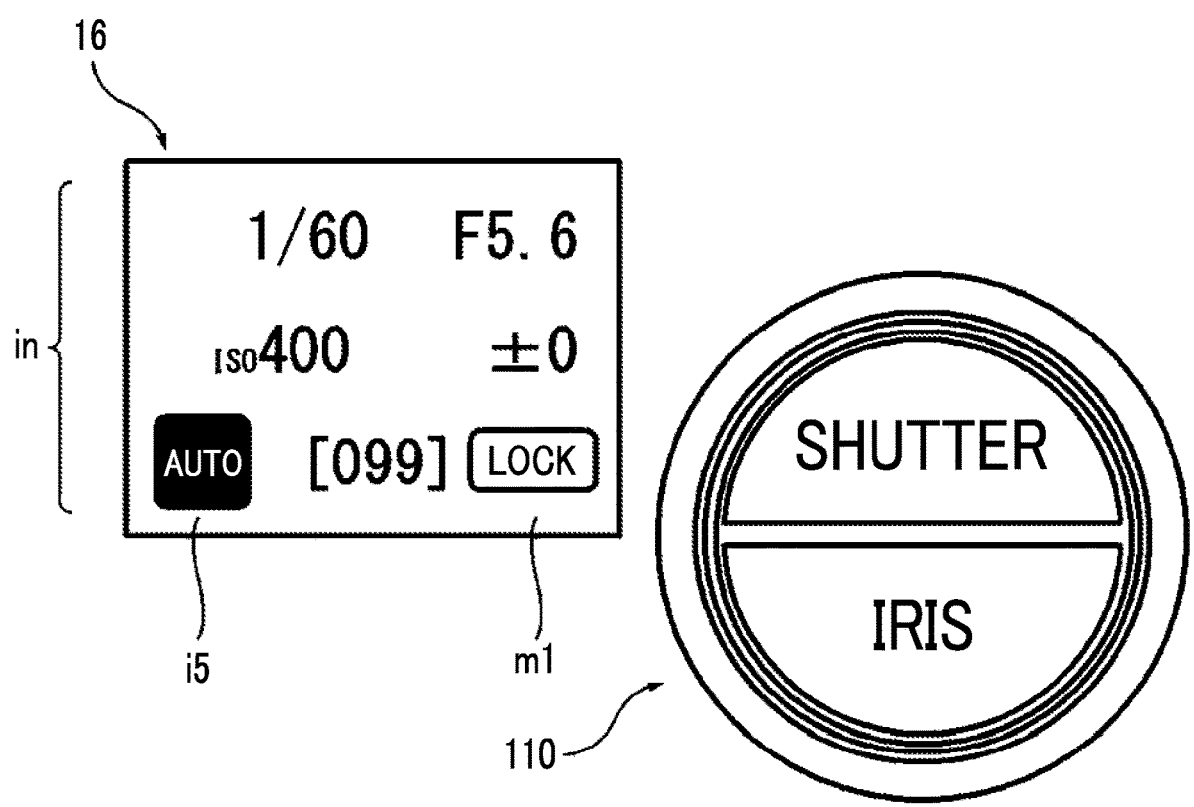
FIG. 36 is a diagram showing an example of the display on the sub-display in the case where the auto mode is set.

On the other hand, in the case where the setting change is invalid, that is, the contact with the top surface of the operation dial 110 is not detected, the lock mark m1 is displayed at a predetermined position on the sub-display 16 (refer to FIG. 36).

Figure 34:
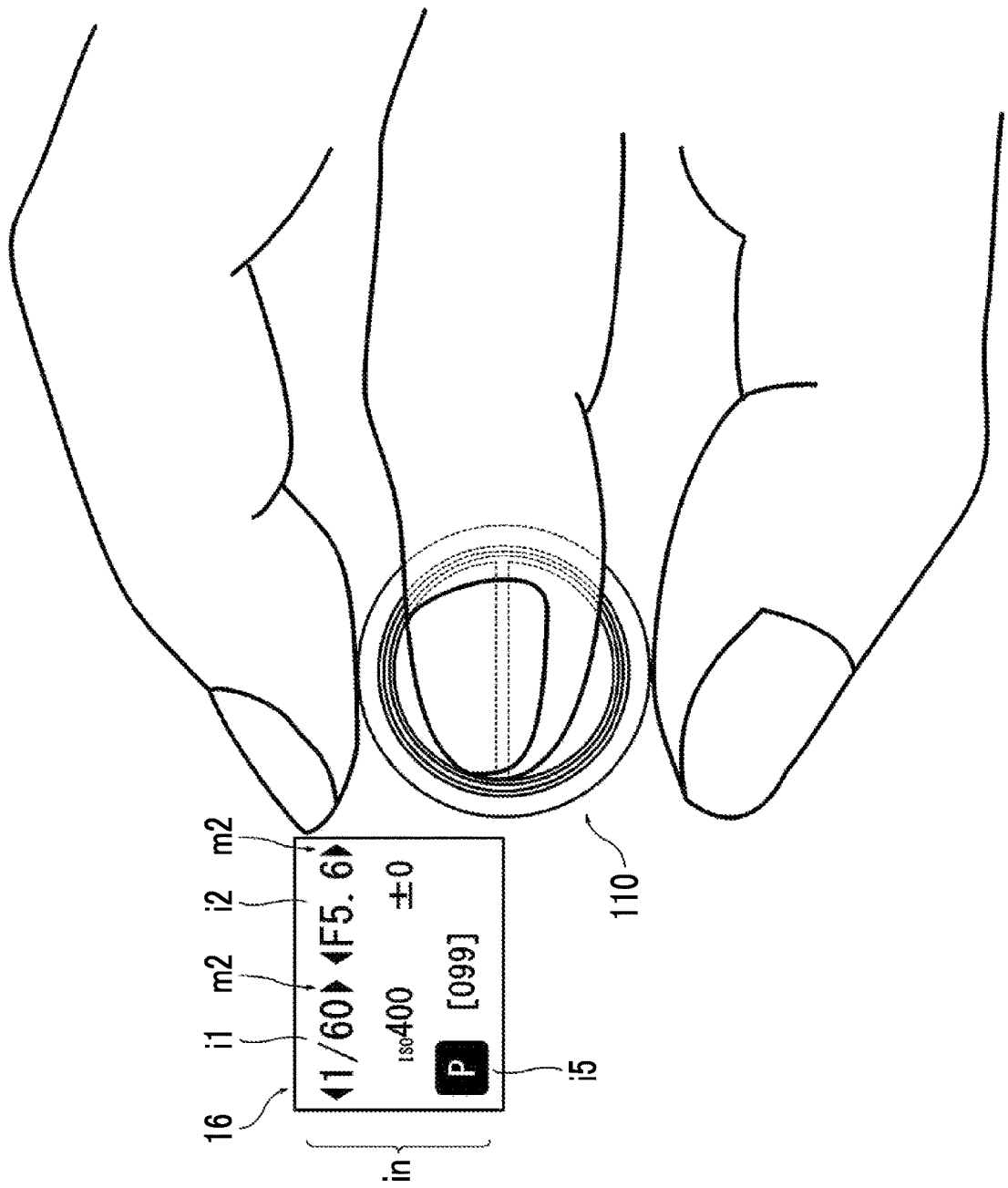
FIG. 34 is a diagram showing an example of the display on the sub-display in the case where the program mode is set.

FIG. 34 is a diagram showing an example of the display on the sub-display in the case where the program mode is set.

As shown in FIG. 34, in the case where the imaging mode is set to the program mode, an icon indicating that the imaging mode is set to the program mode is displayed on the sub-display 16 as the imaging mode information i5.

Further, in the case where the imaging mode is set to the program mode, the shutter speed information i1 and the F-number information i2 are displayed in a large size.

Furthermore, in the case where the setting change is valid, that is, the contact with the center region Dc is detected, the setting change valid marks m2 are displayed at the display position of the shutter speed information i1 and at the display position of the F-number information i2.

On the other hand, in the case where the setting change is invalid, that is, the contact with the top surface of the operation dial 110 is not detected, the lock mark m1 is displayed at a predetermined position on the sub-display 16 (refer to FIG. 36).

Figure 35:
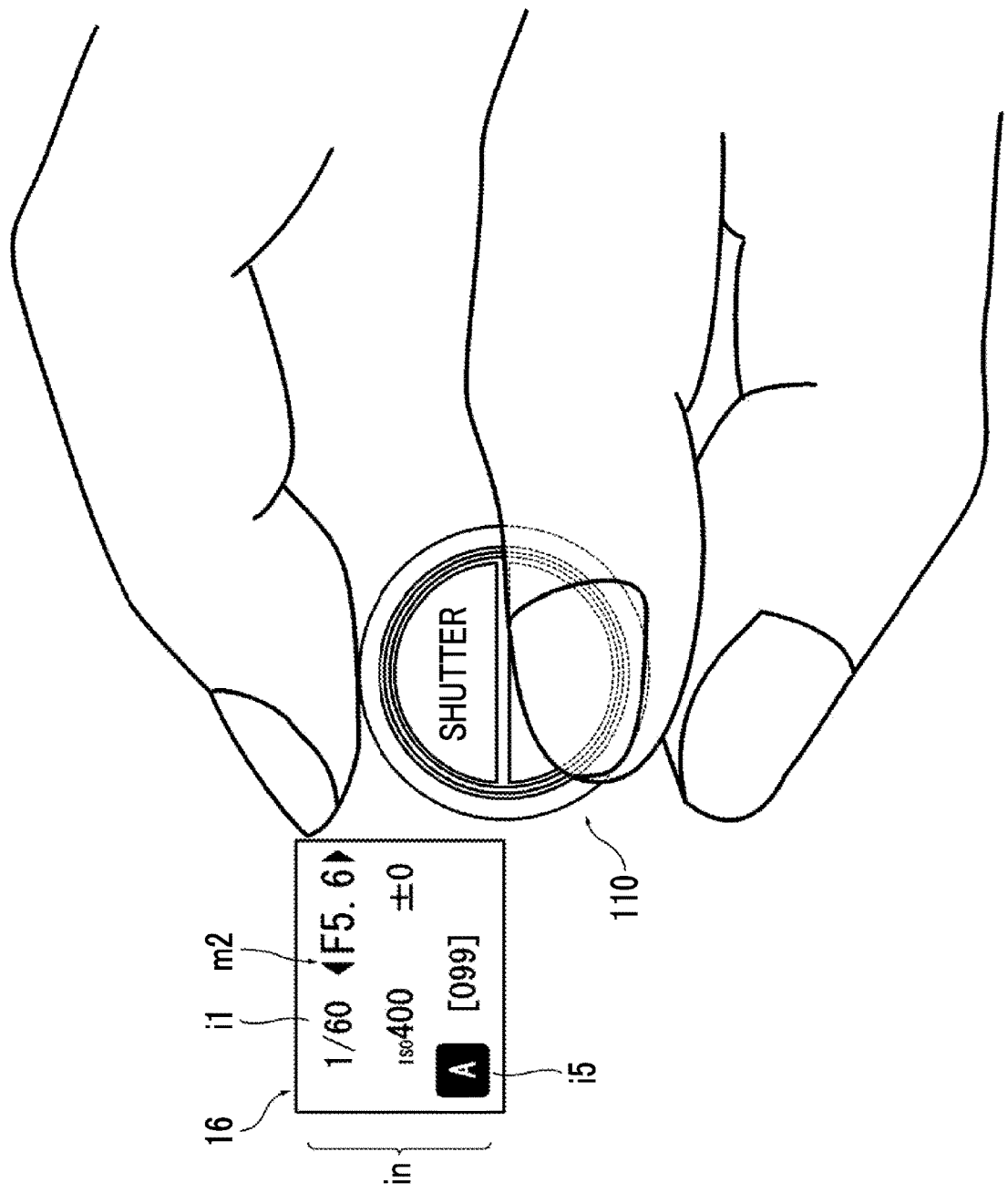
FIG. 35 is a diagram showing an example of the display on the sub-display in the case where the aperture stop priority mode is set.

FIG. 35 is a diagram showing an example of the display on the sub-display in the case where the aperture stop priority mode is set.

As shown in FIG. 33, in the case where the imaging mode is set to the aperture stop priority mode, an icon indicating that the imaging mode is set to the aperture stop priority mode is displayed on the sub-display 16 as the imaging mode information i5.

Further, in the case where the imaging mode is set to the aperture stop priority mode, the F-number information i2 is displayed in a large size.

Furthermore, in the case where the setting change is valid, that is, the contact with the rear region Dr is detected, the setting change valid mark m2 is displayed at the display position of the F-number information i2.

On the other hand, in the case where the setting change is invalid, that is, the contact with the top surface of the operation dial 110 is not detected, the lock mark m1 is displayed at a predetermined position on the sub-display 16 (refer to FIG. 36).

FIG. 36 is a diagram showing an example of the display on the sub-display in the case where the auto mode is set.

As shown in FIG. 36, in the case where the imaging mode is set to the auto mode, an icon indicating that the imaging mode is set to the auto mode is displayed on the sub-display 16 as the imaging mode information i5. This icon is formed of a figure in which a character of AUTO is displayed in a black square.

Further, in the case where the imaging mode is set to the auto mode, the lock mark m1 is displayed at a predetermined position on the sub-display 16.

Modification Example

«Imaging Mode to be Set»

A mode to be set can be set as appropriate according to the imaging mode of the camera as in the third embodiment. Further, a function assigned to the operation dial according to the set mode also can be set as appropriate.

«Layout of Contact Detection Unit to be set on Top Surface of Operation Dial»

In the embodiment, the top surface of the operation dial 110 is divided into two regions. However, the division form, that is, the layout of the contact detection unit to be set on the top surface of the operation dial 110 can be set as appropriate according to the imaging mode of the camera and the like.

Figure 37:
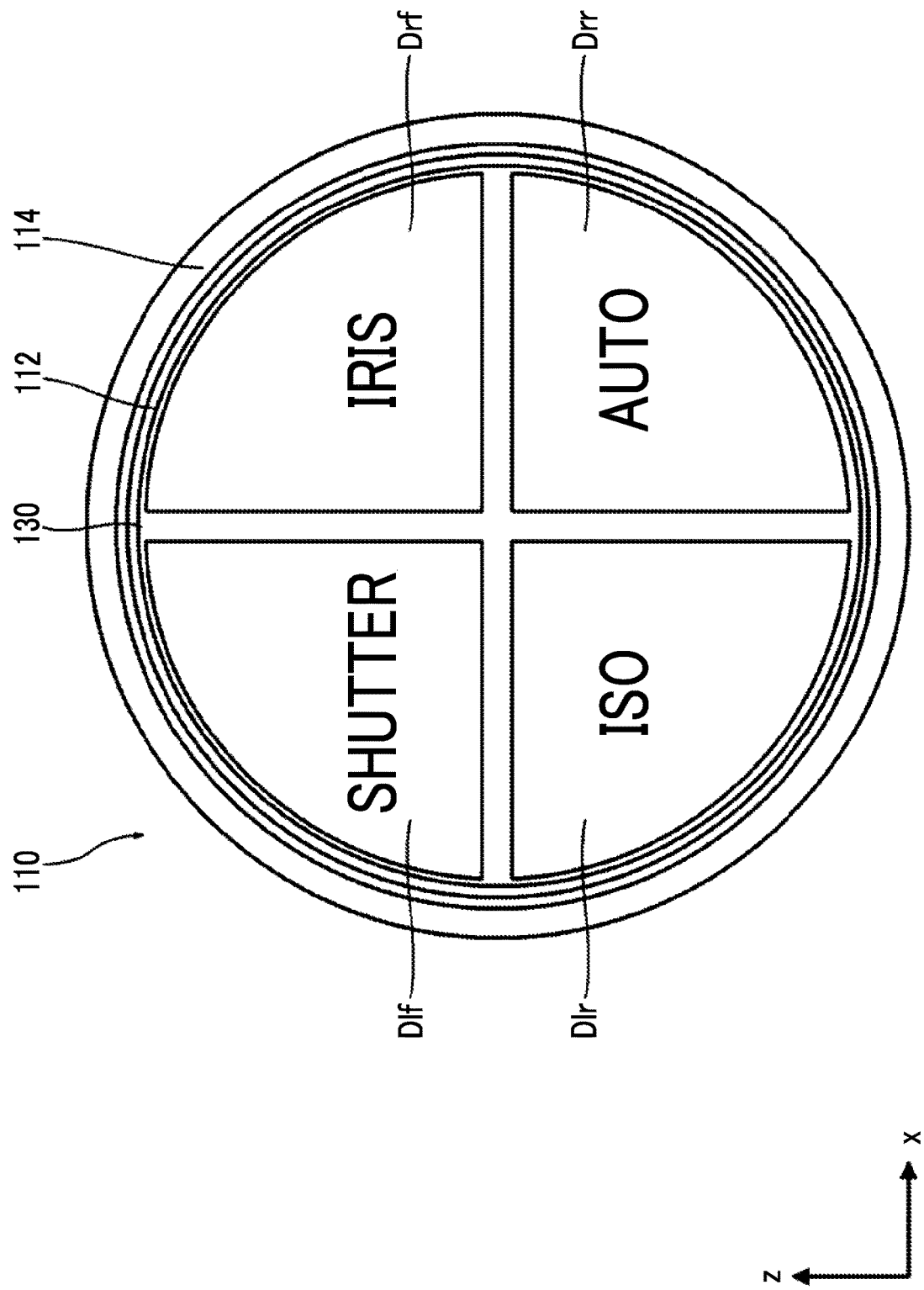
FIG. 37 is a plan view showing an example in a case where four contact detection units are set on the top surface of the operation dial.

FIG. 37 is a plan view showing an example in a case where four contact detection units are set on the top surface of the operation dial 110.

In the example shown in FIG. 37, the top surface of the operation dial 110 is divided into four in the circumference direction, and the contact in each region is individually detected.

Further, FIG. 37 shows an example in a case where the imaging mode is set to the shutter speed priority mode in the case where the left front region Dlf on the top surface is touched, the imaging mode is set to the aperture stop priority mode in the case where the right front region Drf on the top surface is touched, the imaging mode is set to the program mode in the case where both the left front region Dlf and the right front region Drf on the top surface is touched, and the imaging mode is set to the auto mode in the case where the right rear region Drr on the top surface is touched.

Further, FIG. 37 shows an example in a case where the ISO sensitivity is changed in the setting commonly in each mode in the case where the operation dial 110 is rotationally operated while the left rear region Dlr is touched. In this manner, a setting function of the imaging mode is not always assigned to all regions.

Fifth Embodiment

In a digital camera 1 of an embodiment, the item to be changed in the setting in the case where the operation dial 110 is operated is automatically switched according to the imaging mode.

[Configuration]

«Appearance»

Figure 38:
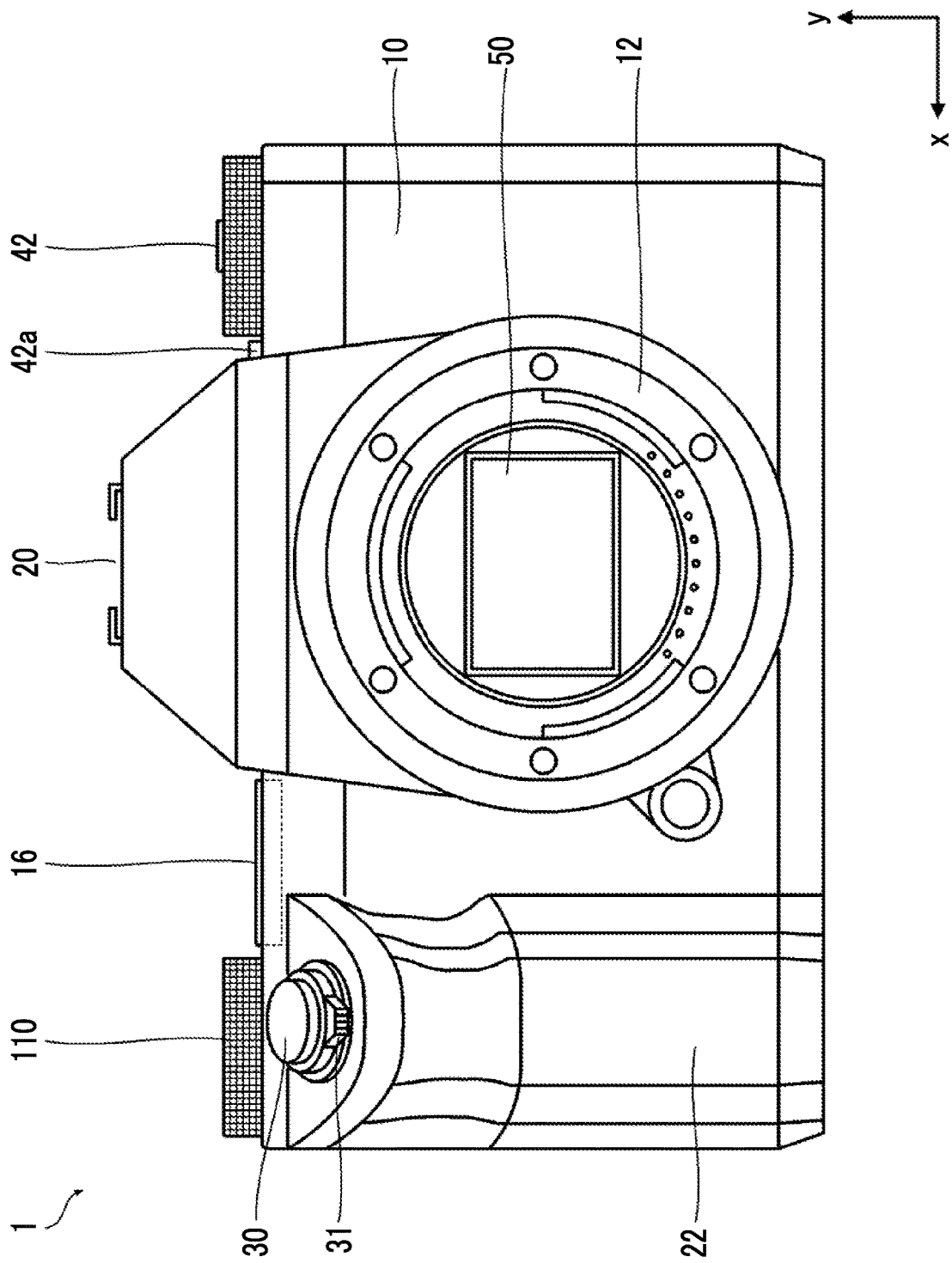
FIG. 38 is a front view of a digital camera of a fifth embodiment.

FIG. 38 is a front view of the digital camera of the fifth embodiment. Further, FIG. 39 is a plan view thereof.

As shown in FIG. 38, in the digital camera 1 of the embodiment, a mode dial 42 is provided on the top surface of the camera body 10.

The mode dial 42 is a rotary dial for setting the imaging mode. Each symbol of "AUTO", "P", "S", "A", and "M" is displayed on the same circumference at regular intervals on the top surface of the mode dial 42. The symbol "AUTO" represents the auto mode, the symbol "P" represents the program mode, the symbol "S" represents the shutter speed priority mode, the symbol "A" represents the aperture stop priority mode, and the symbol "M" represents a manual mode. The mode dial 42 is formed such that click-stop is possible at a position of each symbol with respect to an indicator 42a. In a case where the symbol "AUTO" is set to the indicator 42a, the imaging mode is set to the auto mode. In a case where the symbol "P" is set to the indicator 42a, the imaging mode is set to the program mode. In a case where the symbol "S" is set to the indicator 42a, the imaging mode is set to the shutter speed priority mode. In a case where the symbol "A" is set to the indicator 42a, the imaging mode is set to the aperture stop priority mode. In a case where the symbol "M" is set to the indicator 42a, the imaging mode is set to the manual mode.

Figure 39:
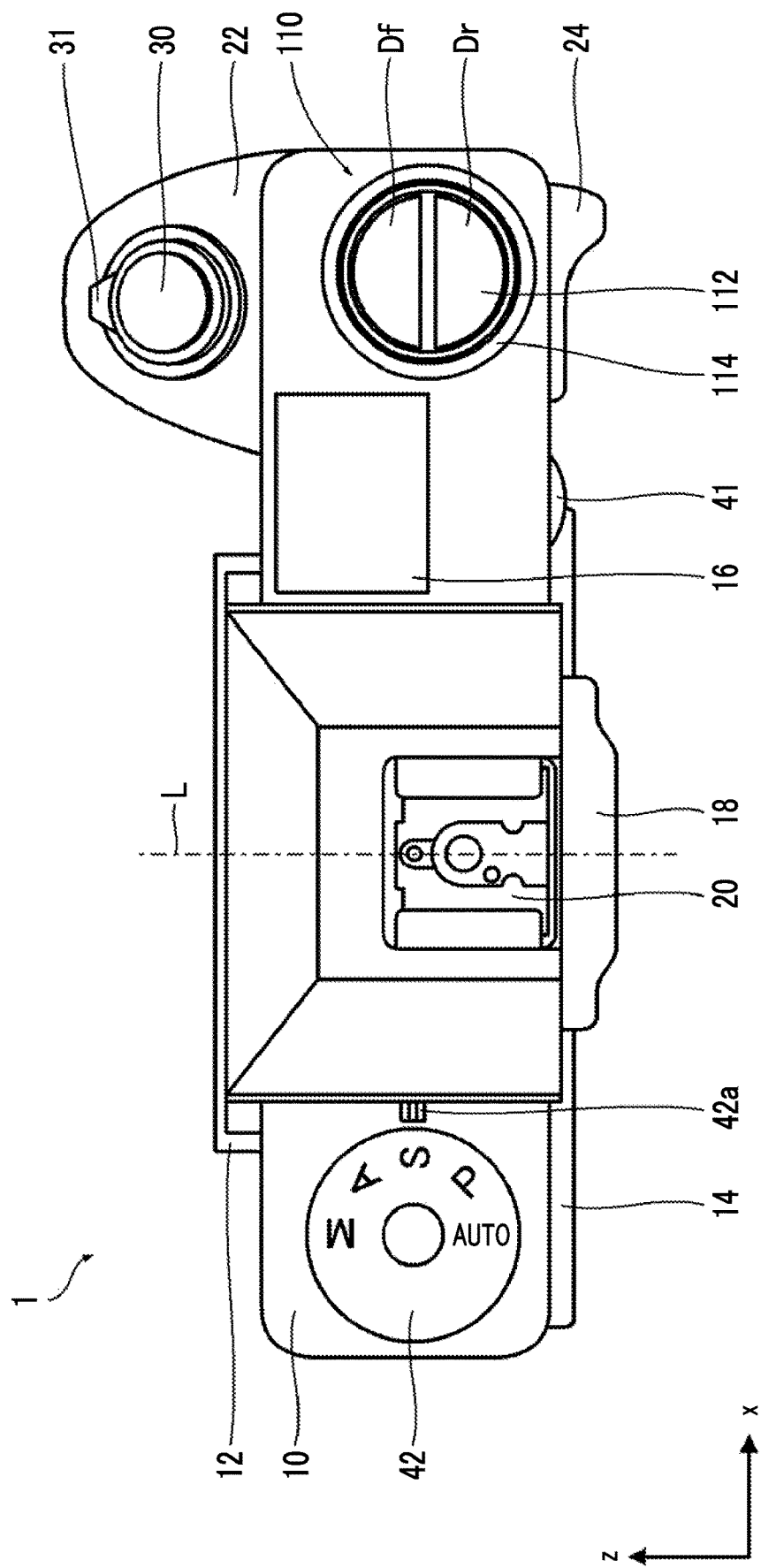
FIG. 39 is a plan view of the digital camera of the fifth embodiment.

FIG. 39 shows an example in the case where the shutter speed priority mode is selected. In this case, the symbol "S" is set to the indicator 42a.

As shown in FIG. 39, in the operation dial 110 of the digital camera 1 of the embodiment, the top surface of the operation dial 110 is divided into two in the front-rear direction (z direction). In this case, the setting changes of two items are possible in each mode. That is, the setting changes of different items are possible between in the case where the operation dial 110 is rotationally operated while the front region Df on the top surface is touched and in the case where the operation dial 110 is rotationally operated while the rear region Dr on the top surface is touched.

«Assignment of Item to be Changed in Setting by Operation Dial»

FIG. 40 is a table representing a relationship between the imaging mode and the item to be changed in the setting by the operation dial 110.

(1) Auto Mode

In the case where the imaging mode is set to the auto mode, the item to be changed in the setting is not assigned to any region of the front region Df and the rear region Dr. That is, in the case of the auto mode, the operation dial 110 is invalidated.

(2) Program Mode

In the case where the imaging mode is set to the program mode, the program shift is not assigned to any region of the front region Df and the rear region Dr. Therefore, in the case of the program mode, the program shift is performed even in the case where the operation dial 110 is operated while any region of the front region Df and the rear region Dr is touched.

(3) Shutter Speed Priority Mode

In the case where the imaging mode is set to the shutter speed priority mode, the setting change of the shutter speed is assigned to the front region Df and the setting change of the exposure correction value is assigned to the rear region Dr. Therefore, in the case of the shutter speed priority mode, in the case where the operation dial 110 is rotationally operated while the front region Df is touched, the shutter speed is changed in response to the operation thereof. Further, in the case where the operation dial 110 is rotationally operated while the rear region Dr is touched, the exposure correction value is changed in response to the operation thereof.

(4) Aperture Stop Priority Mode

In the case where the imaging mode is set to the aperture stop priority mode, the setting change of the F-number is assigned to the front region Df and the setting change of the exposure correction value is assigned to the rear region Dr. Therefore, in the case of the aperture stop priority mode, in the case where the operation dial 110 is rotationally operated while the front region Df is touched, the F-number is changed in response to the operation thereof. Further, in the case where the operation dial 110 is rotationally operated while the rear region Dr is touched, the exposure correction value is changed in response to the operation thereof.

(5) Manual Mode

In the case where the imaging mode is set to the manual mode, the setting change of the shutter speed is assigned to the front region Df and the setting change of the F-number is assigned to the rear region Dr. Therefore, in the case of the manual mode, in the case where the operation dial 110 is rotationally operated while the front region Df is touched, the shutter speed is changed in response to the operation thereof. Further, in the case where the operation dial 110 is rotationally operated while the rear region Dr is touched, the F-number is changed in response to the operation thereof.

«Configuration of Setting System»

Figure 41:
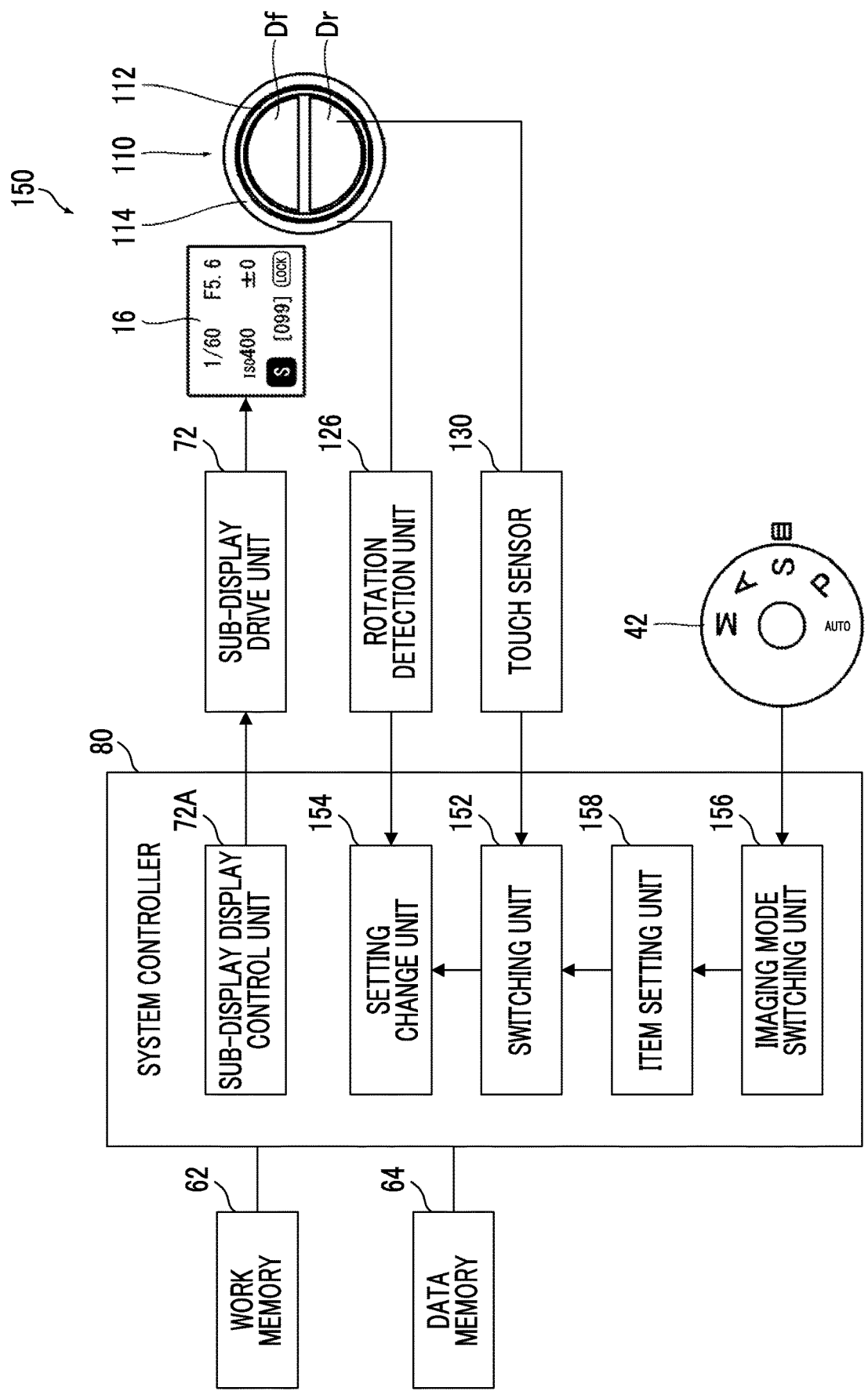
FIG. 41 is a block diagram showing the schematic configuration of a setting system provided in the digital camera of the fifth embodiment.

FIG. 41 is a block diagram showing the schematic configuration of a setting system provided in the digital camera of the embodiment.

As shown in FIG. 41, the setting system 150 of the embodiment further comprises the imaging mode switching unit 156 and an item setting unit 158 in contrast with the setting system 150 of the digital camera of the first embodiment described above.

The imaging mode switching unit 156 sets the imaging mode in response to the operation of the mode dial 42.

The item setting unit 158 sets the item to be set by the operation dial according to the set imaging mode. As described above, this setting is performed for each region (contact detection unit).

The functions of the imaging mode switching unit 156 and the item setting unit 158 are provided as one function of the system controller 80. That is, the microcomputer configuring the system controller 80 executes a predetermined control program to provide the functions of the imaging mode switching unit 156 and the item setting unit 158 by the system controller 80.

[Action]

As described above, the item to be changed in the setting in the case where the operation dial 110 is operated is automatically switched according to the imaging mode. Hereinafter, the operation for each set imaging mode will be described.

(1) Auto Mode

In the case of the auto mode, the operation dial 110 is invalidated. That is, in the case of the auto mode, no setting is changed even in the case where the operation dial 110 is operated while the top surface is touched.

(2) Program Mode

In the case where the imaging mode is set to the program mode, the program shift is not assigned to any region of the front region Df and the rear region Dr.

Therefore, in the case of the program mode, in the case where the contact with the front region Df or the rear region Dr is detected, the program mode is validated while the contact is detected.

In a case where the operation dial 110 is rotationally operated in the state where the setting change is valid, that is, the contact with at least one of the front region Df or the rear region Dr is detected, the program shift is performed in response to the operation thereof. That is, the combination of the shutter speed and the F-number is changed in response to the operation.

(3) Shutter Speed Priority Mode

In the case of the shutter speed priority mode, the setting change of the shutter speed is assigned to the front region Df and the setting change of the exposure correction value is assigned to the rear region Dr.

Therefore, in the case of the shutter speed priority mode, in the case where the contact with the front region Df is detected, the setting change of the shutter speed is validated while the contact is detected. In a case where the operation dial 110 is rotationally operated in the state where the setting change of the shutter speed is valid, that is, the contact with the front region Df is detected, the shutter speed is changed in response to the operation thereof. Further, in the case where the contact with the rear region Dr is detected, the setting change of the exposure correction value is validated while the contact is detected. In a case where the operation dial 110 is rotationally operated in the state where the setting change of the exposure correction value is valid, that is, the contact with the rear region Dr is detected, the exposure correction value is changed in response to the operation thereof.

(4) Aperture Stop Priority Mode

In the case of the aperture stop priority mode, the setting change of the F-number is assigned to the front region Df and the setting change of the exposure correction value is assigned to the rear region Dr.

Therefore, in the case of the aperture stop priority mode, in the case where the contact with the front region Df is detected, the setting change of the F-number is validated while the contact is detected. In a case where the operation dial 110 is rotationally operated in the state where the setting change of the F-number is valid, that is, the contact with the front region Df is detected, the F-number is changed in response to the operation thereof. Further, in the case where the contact with the rear region Dr is detected, the setting change of the exposure correction value is validated while the contact is detected. In a case where the operation dial 110 is rotationally operated in the state where the setting change of the exposure correction value is valid, that is, the contact with the rear region Dr is detected, the exposure correction value is changed in response to the operation thereof.

(5) Manual Mode

In the case of the manual mode, the setting change of the shutter speed is assigned to the front region Df and the setting change of the F-number is assigned to the rear region Dr.

Therefore, in the case of the manual mode, in the case where the contact with the front region Df is detected, the setting change of the shutter speed is validated while the contact is detected. In a case where the operation dial 110 is rotationally operated in the state where the setting change of the shutter speed is valid, that is, the contact with the front region Df is detected, the shutter speed is changed in response to the operation thereof. Further, in the case where the contact with the rear region Dr is detected, the setting change of the F-number is validated while the contact is detected. In a case where the operation dial 110 is rotationally operated in the state where the setting change of the F-number is valid, that is, the contact with the rear region Dr is detected, the F-number is changed in response to the operation thereof.

In any mode, in the case where the operation dial 110 is rotationally operated while the top surface is not touched, the operation thereof is invalidated. That is, no setting is changed. In this case, the operation dial 110 is electronically locked. Accordingly, it is possible to prevent the setting from being changed carelessly.

In this manner, according to the digital camera 1 of the embodiment, the item to be changed in the setting by the operation dial 110 is automatically switched according to the imaging mode. Accordingly, it is possible to assign the function according to an imaging situation to the operation dial 110.

Modification Example

«Switching of Imaging Mode»

In the embodiment, the imaging mode is switched by the mode dial, but means for switching the imaging mode is not limited thereto. In addition, for example, the imaging mode may be switched by using the menu screen. Alternatively, an operation of swiping or flicking the top surface of the operation dial 110 may be detected to sequentially switch the imaging mode in response to the operation thereof. Here, the operation of swiping the top surface refers to an operation of moving the finger so as to stroke in a specific direction while the finger touches the top surface. Further, the operation of flicking the top surface refers to an operation of touching the top surface with the finger and then moving the finger so as to flip. In this case, the touch sensor 130 provided on the top surface of the operation dial 110 detects the operation of swiping or flicking the top surface of the operation dial 110.

«Layout of Contact Detection Unit to be set on Top Surface of Operation Dial»

In the embodiment, the top surface of the operation dial 110 is divided into two regions. However, the division form, that is, the layout of the contact detection unit to be set on the top surface of the operation dial 110 is not limited thereto. For example, the top surface of the operation dial 110 may be divided into three or four.

«Item to be Changed in Setting»

In the case where the imaging mode is set for each mode, the item to be changed in the setting by the operation dial 110 can be set as appropriate depending on the function or the like provided in the camera.

«Combination of Contact»

The setting change of the specific item may be possible in the case where the plurality of regions are touched at the same time as in the second embodiment. For example, in the case where the imaging mode is set to the shutter speed priority mode, the setting change of the ISO sensitivity may be possible in a case where the contact is detected in both regions of the front region Df and the rear region Dr. Similarly, in the case where the imaging mode is set to the aperture stop priority mode, the setting change of the ISO sensitivity may be possible in the case where the contact is detected in both regions of the front region Df and the rear region Dr. Further, in the case where the imaging mode is set to the manual mode, the setting change of the exposure correction value may be possible in the case where the contact is detected in both regions of the front region Df and the rear region Dr.

Sixth Embodiment

In a digital camera 1 of an embodiment, a display is provided on the top surface of the operation dial 110. Hereinafter, this display provided on the top surface of the operation dial 110 refers to as a dial-display. The dial-display is an example of a dial display section.

A configuration of the sixth embodiment is the same as that of the digital camera 1 of the first embodiment except that the dial-display is provided in the operation dial. Therefore, in the following description, only the configuration of the operation dial 110 comprising the dial-display and the action thereof will be described.

[Configuration of Operation Dial]

Figure 42:
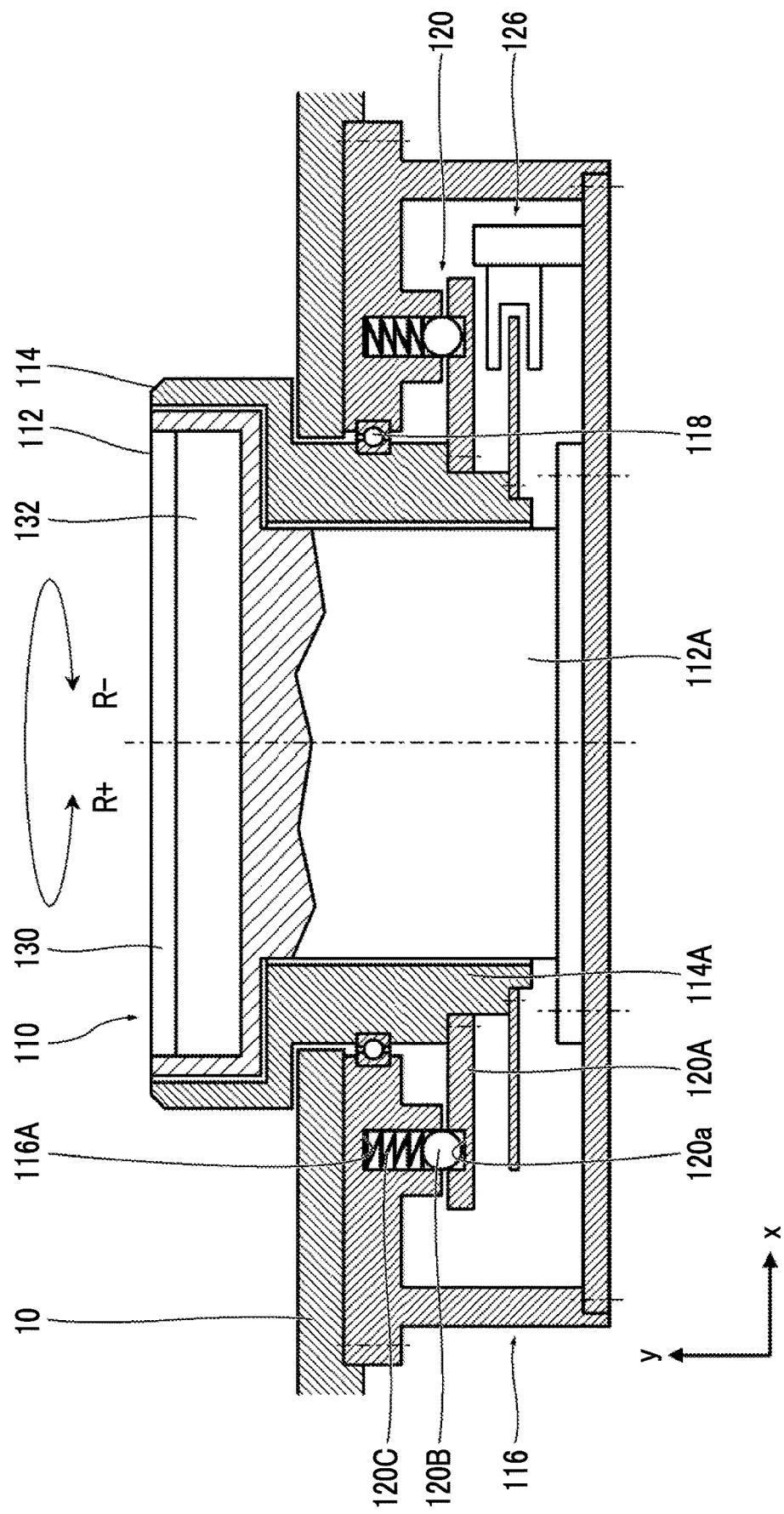
FIG. 42 is a longitudinal cross section view showing the schematic configuration of the operation dial.
Figure 43:
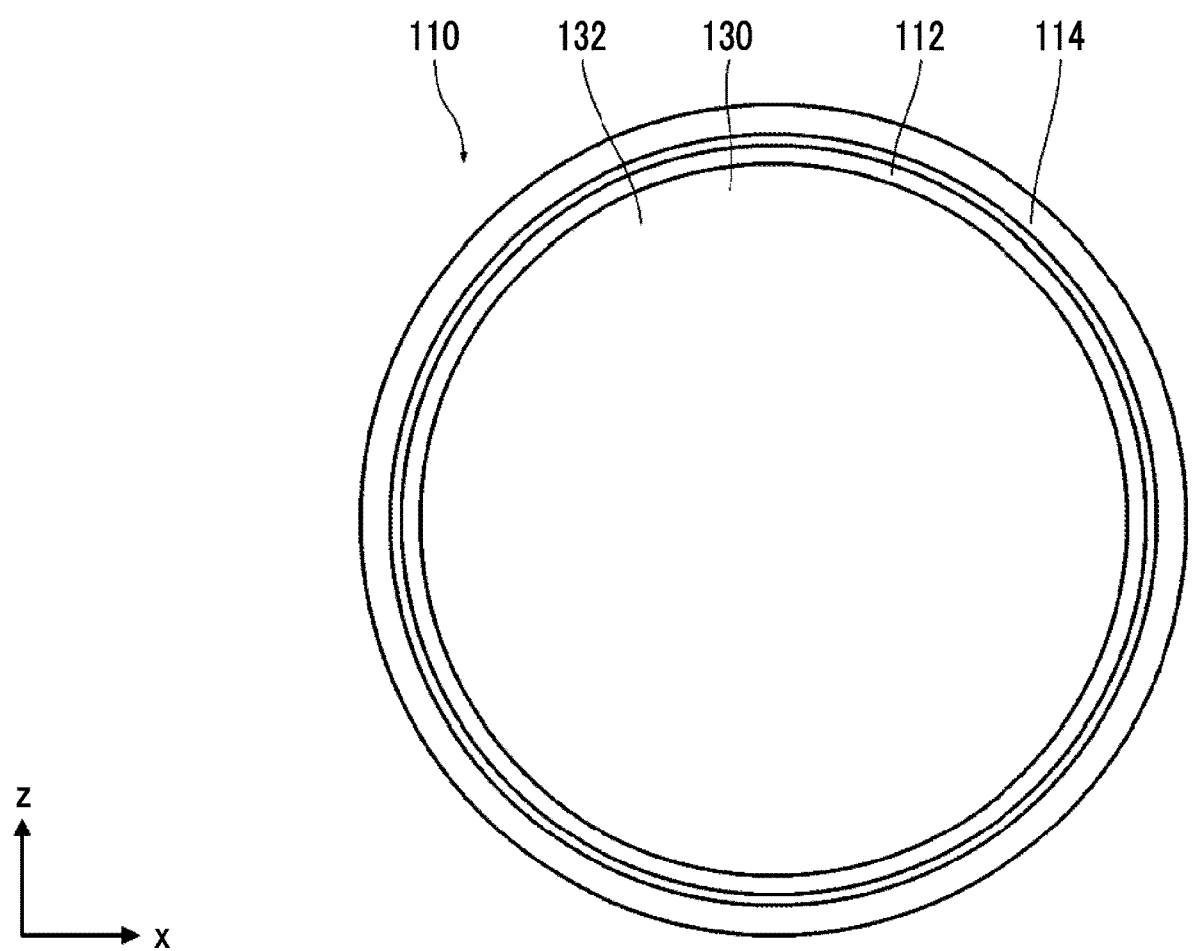
FIG. 43 is a plan view showing the schematic configuration of the operation dial.

FIG. 42 is a longitudinal cross section view showing the schematic configuration of the operation dial 110. FIG. 43 is a plan view showing the schematic configuration of the operation dial 110.

As shown in FIGS. 42 and 43, a dial-display 132 is provided on the upper-end of the inner peripheral part 112 of the operation dial 110. Substantially all region of the inner peripheral part 112 of the operation dial 110 is set as a display surface of the dial-display 132.

The touch sensor 130 is disposed on the dial-display 132 in an overlapped manner. The touch sensor 130 detects the contact of the finger with the display surface of the dial-display 132. The touch sensor 130 is combined with the dial-display 132 to form the touch panel.

Figure 44:
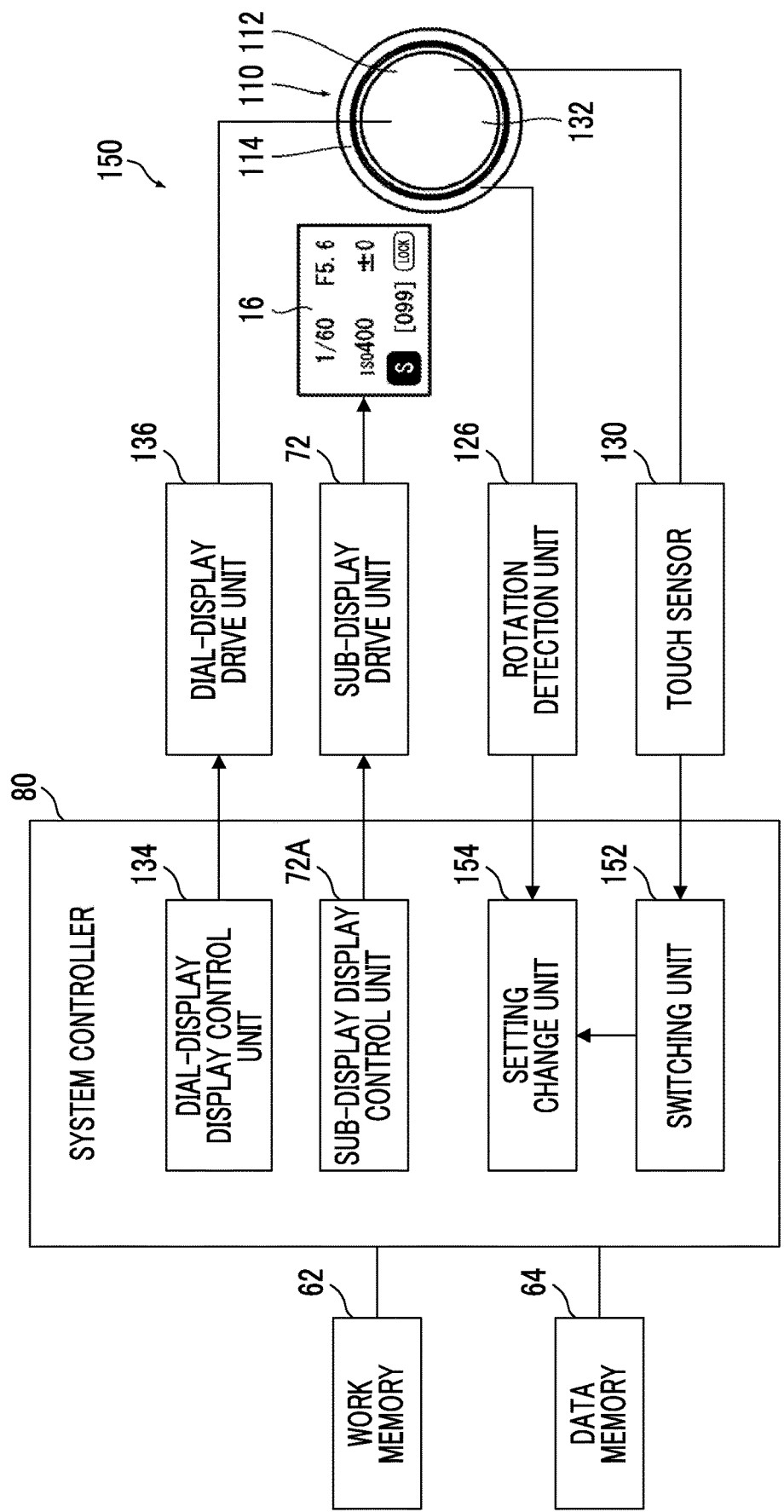
FIG. 44 is a block diagram showing the schematic configuration of a setting system by using the operation dial.

FIG. 44 is a block diagram showing the schematic configuration of a setting system by using the operation dial 110.

The setting system 150 of the digital camera of the embodiment comprises a dial-display display control unit 134 that controls the display on the dial-display 132 and a dial-display drive unit 136 that drives the dial-display 132 in response to a command from the dial-display display control unit 134.

The dial-display display control unit 134 is an example of a dial display control unit. The dial-display display control unit 134 displays information on the item to be set by the operation dial 110 on the dial-display 132. The dial-display display control unit 134 acquires information necessary for the display on the dial-display 132 and controls the drive of the dial-display drive unit 136 to control the display of the dial-display 132.

A function of the dial-display display control unit 134 is provided as one function of the system controller 80. That is, the microcomputer configuring the system controller 80 executes a predetermined control program to provide the function of the dial-display display control unit 134 by the system controller 80.

[Action]

Figure 45:
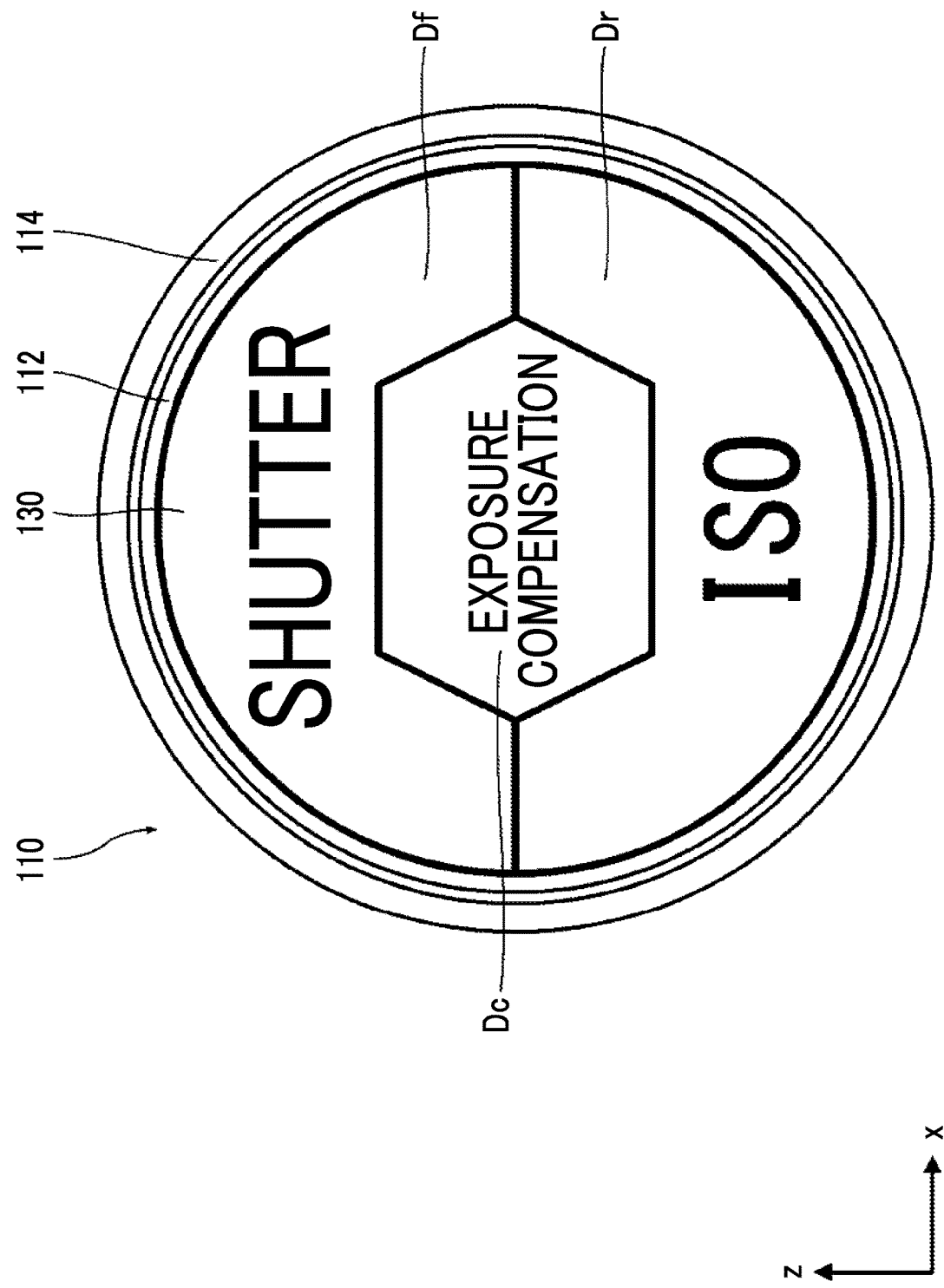
FIG. 45 is a plan view showing an example of a display on a dial-display.

FIG. 45 is a plan view showing an example of a display on the dial-display.

As shown in FIG. 45, the region where the contact is detected is displayed on the dial-display 132 separately. FIG. 45 shows an example in the case where the top surface of the operation dial 110 is divided into three regions of the front region Df, the center region Dc, and the rear region Dr. In each region, the region where the contact is actually detected (contact detection unit) is a region to be set within each region as the contact detection region (refer to FIG. 6).

In each region of the front region Df, the center region Dc, and the rear region Dr, information on the item whose setting change is validated is displayed in a case where each region is touched. That is, the information on the item set in each region is displayed corresponding to the region where the contact is detected. FIG. 45 shows an example in a case where the setting change of the shutter speed is validated in the case where the front region Df is touched, the setting change of the exposure correction value is validated in the case where the center region Dc is touched, and the setting change of the ISO sensitivity is validated in the case where the rear region Dr is touched. In this case, a character of "SHUTTER" is displayed on the front region Df as information indicating that the setting change of the shutter speed is validated in the case where the front region Df is touched as shown in FIG. 45. A character of "EXPOSURE COMPENSATION" is displayed on the center region Dc as information indicating that the setting change of the exposure correction value is validated in the case where the center region Dc is touched. Further, a character of "ISO" is displayed on the rear region Dr as information indicating that the setting change of the ISO sensitivity is validated in the case where the rear region Dr is touched.

Figure 46:
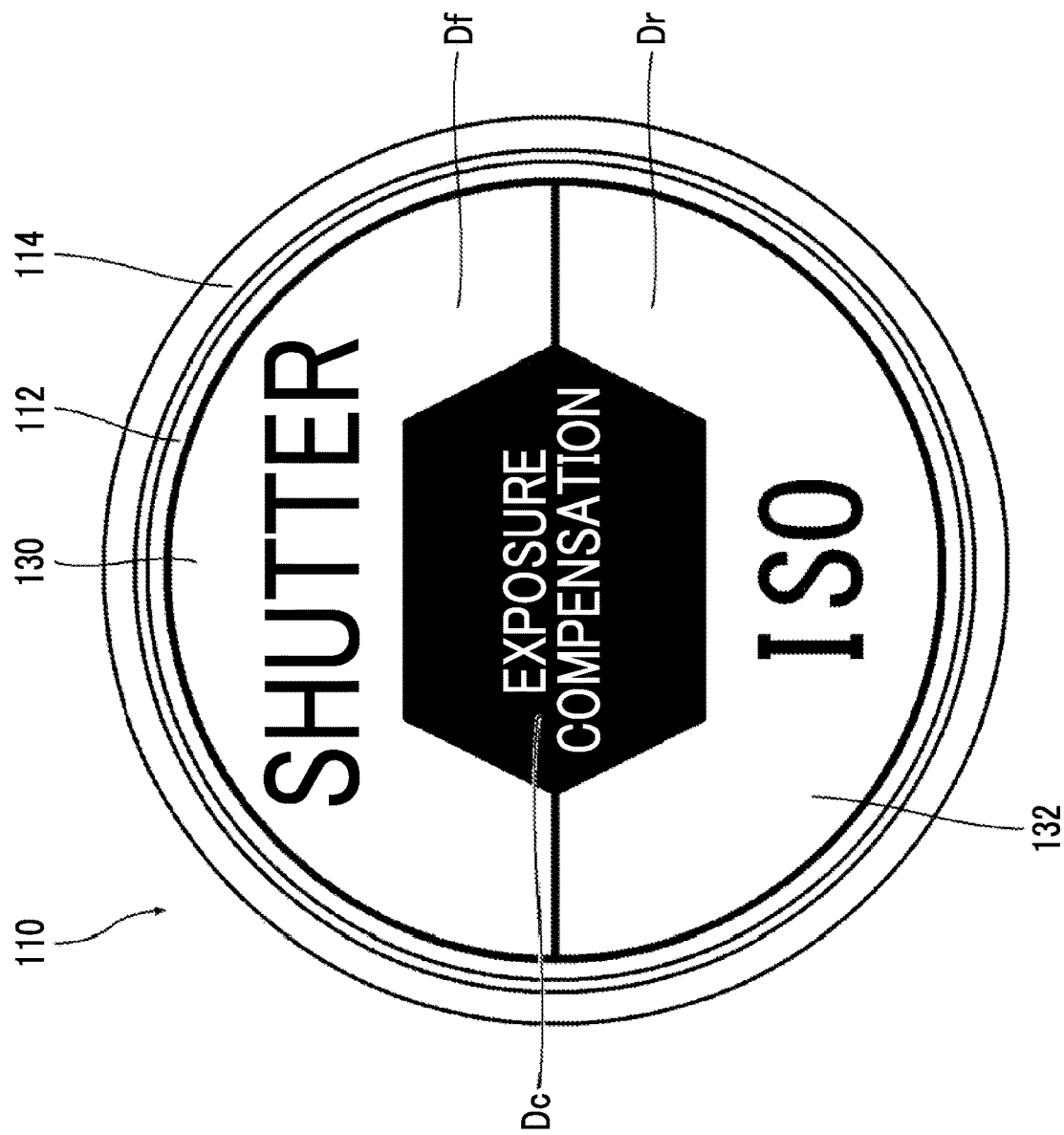
FIG. 46 is a plan view showing an example of the display on the dial-display in a case where the top surface of the operation dial is touched.

FIG. 46 is a plan view showing an example of the display on the dial-display in a case where the top surface of the operation dial 110 is touched. In particular, FIG. 46 shows an example of the display in the case where the center region Dc is touched.

In the case where the top surface of the operation dial 110 is touched, the display of the touched region is inverted. That is, a color of background and character is inverted and displayed. Accordingly, it is possible to clarify the touched region.

In this manner, according to the digital camera 1 of the embodiment, the information that can be changed in the setting by the operation dial 110 is displayed on the dial-display 132 provided on the top surface of the operation dial 110. Accordingly, it is possible to provide good operability. Further, in the case where each region is touched, the display thereof is inverted. That is, the item whose setting change is valid and the item whose setting change is invalid are displayed in a different form. Accordingly, it is possible to easily grasp the item whose setting change is valid and thus to provide better operability.

Modification Example

«Display Switching in Conjunction with Switching of Item whose Setting Change is Validated»

In a case where the item whose setting change is validated is switched, the display on the dial-display 132 is switched in conjunction with the switching of the item.

For example, in the fifth embodiment, the item capable of being changed in the setting by the operation dial 110 is switched according to the imaging mode. In this case, the display on the dial-display 132 is switched in conjunction with the switching of the imaging mode.

Figure 47:
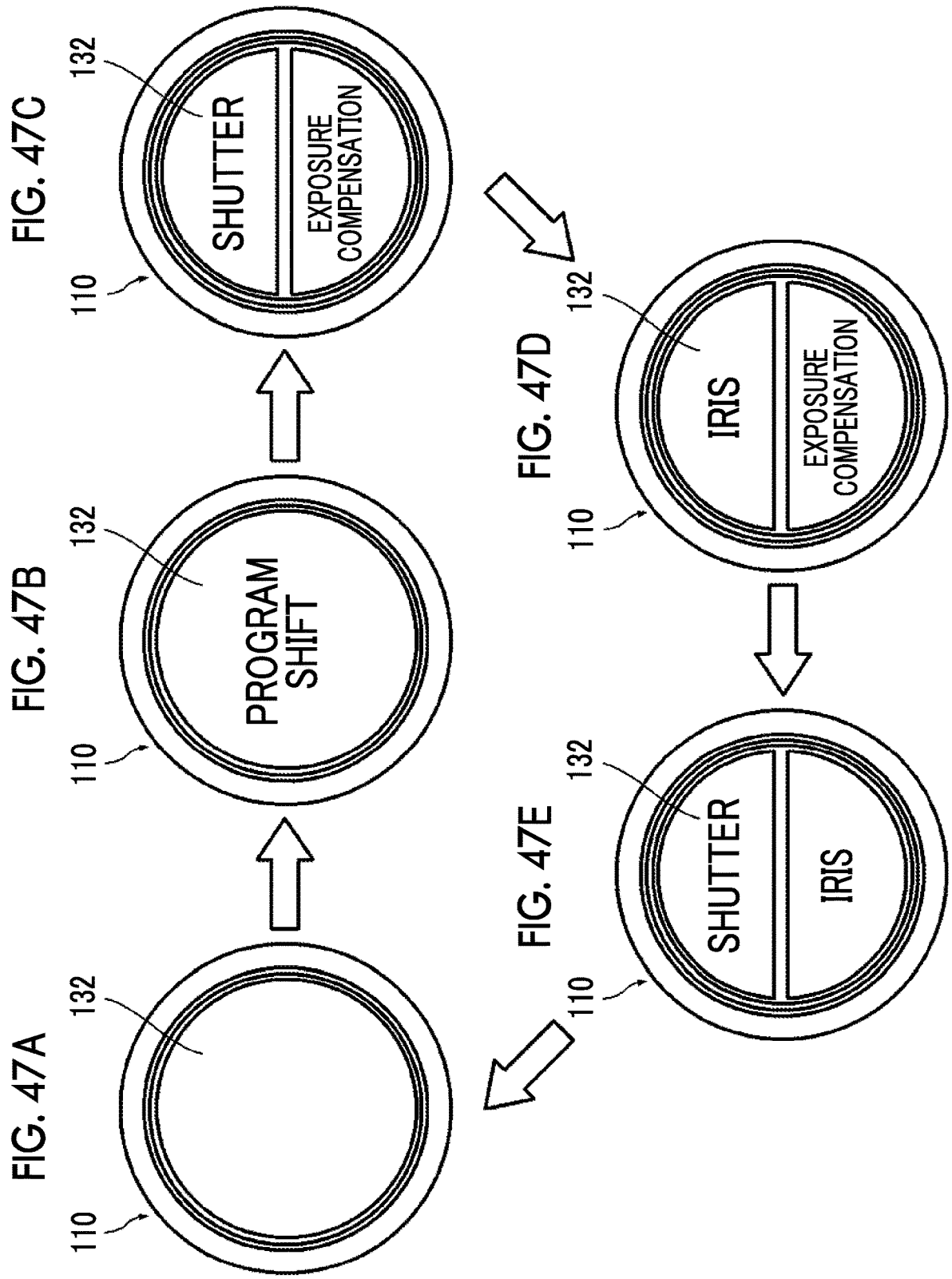
FIG. 47A, FIG. 47B, FIG. 47C, FIG. 47D, and FIG. 47E are diagrams showing examples of switching of the display on the dial-display according to the switching of the imaging mode.

FIG. 47A, FIG. 47B, FIG. 47C, FIG. 47D, and FIG. 47E are diagrams showing examples of the switching of the display on the dial-display according to the switching of the imaging mode. In particular, FIG. 47A, FIG. 47B, FIG. 47C, FIG. 47D, and FIG. 47E show examples in a case where the imaging mode is switched to the auto mode, the program mode, the shutter speed priority mode, the aperture stop priority mode, and the manual mode. FIG. 47A shows a display on the dial-display 132 in the case of the auto mode, FIG. 47B shows a display on the dial-display 132 in the case of the program mode, FIG. 47C shows a display on the dial-display 132 in the case of the shutter speed priority mode, FIG. 47D shows a display on the dial-display 132 in the case of the aperture stop priority mode, and FIG. 47E shows a display on the dial-display 132 in the case of the manual mode.

The item whose setting change is validated in the case where the imaging mode is set for each mode is as described in the fifth embodiment.

(1) Auto Mode

In the case where the imaging mode is set to the auto mode, the item to be changed in the setting is not assigned to any region of the front region Df and the rear region Dr. In this case, nothing is displayed on the dial-display 132 as shown in FIG. 47A.

(2) Program Mode

In the case where the imaging mode is set to the program mode, the program shift is not assigned to any region of the front region Df and the rear region Dr. In this case, a character of "PROGRAM SHIFT" is displayed at the center on the dial-display 132 as shown in FIG. 47B.

(3) Shutter Speed Priority Mode

In the case where the imaging mode is set to the shutter speed priority mode, the setting change of the shutter speed is assigned to the front region Df and the setting change of the exposure correction value is assigned to the rear region Dr. In this case, the character of "SHUTTER" is displayed in the front region Df and the character of "EXPOSURE COMPENSATION" is displayed in the rear region Dr as shown in FIG. 47C.

(4) Aperture Stop Priority Mode

In the case where the imaging mode is set to the aperture stop priority mode, the setting change of the F-number is assigned to the front region Df and the setting change of the exposure correction value is assigned to the rear region Dr. In this case, a character of "IRIS" is displayed in the front region Df and the character of "EXPOSURE COMPENSATION" is displayed in the rear region Dr as shown in FIG. 47D.

(5) Manual Mode

In the case where the imaging mode is set to the manual mode, the setting change of the shutter speed is assigned to the front region Df and the setting change of the F-number is assigned to the rear region Dr. In this case, the character of "SHUTTER" is displayed in the front region Df and the character of "IRIS" is displayed in the rear region Dr as shown in FIG. 47E.

It is possible to grasp the item capable of being set at a glance by switching the display on the dial-display 132 in conjunction with the switching of the item capable of being changed in the setting and thus to further improve operability.

Seventh Embodiment

In the digital cameras 1 of the first to sixth embodiments, the setting change by the operation dial is validated while the top surface of the operation dial 110 is touched. That is, the lock of the operation dial 110 is electronically released only while the top surface of the operation dial 110 is touched.

In the digital camera 1 of the embodiment, the setting change of the item set in the touched region is validated in the case where the top surface of the operation dial 110 is touched. The item whose setting change is validated once maintains the valid state even in the case where the finger is released. On the other hand, in a case where the finger is released and then touches the same region again, the valid state is switched to the invalid state. That is, the setting change is alternately switched between validity and invalidity every time the top surface of the operation dial 110 is touched. Further, in a case where a different region is touched, an item set in the newly touched region is validated.

Here, only the operation of the digital camera 1 will be described since the configuration of the camera is the same as that of the digital camera 1 of the first embodiment except that the operation after the contact detection is different. The switching between validity and invalidity of setting change is performed by the switching unit 152.

Figure 48:
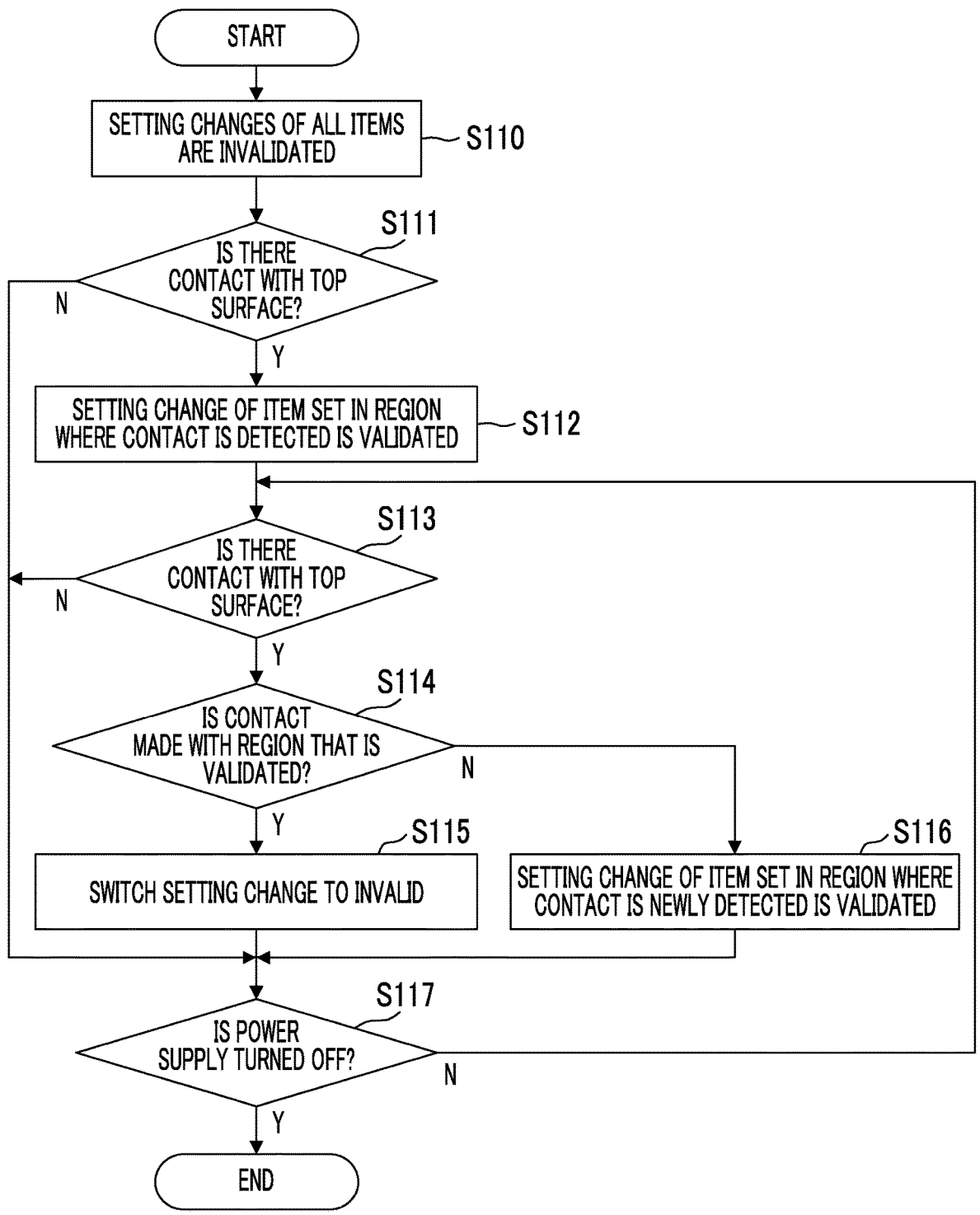
FIG. 48 is a flowchart showing a procedure of the processing of switching between validity and invalidity of the setting change for an item set in each region.

FIG. 48 is a flowchart showing a procedure of the processing of switching between validity and invalidity of the setting change for an item set in each region.

Here, it is assumed that the top surface of the operation dial 110 is divided into three of the front region Df, the center region Dc, and the rear region Dr, and the setting change of the shutter speed is assigned to the front region Df, the setting change of the exposure correction value is assigned to the center region Dc, and the setting change of the ISO sensitivity is assigned to the rear region Dr (the same as the setting of the digital camera of the first embodiment). In this case, the setting change of the shutter speed is validated in the case where the front region Df is touched, the setting change of the exposure correction value is validated in the case where the center region Dc is touched, and the setting change of the ISO sensitivity is validated in the case where the rear region Dr is touched. The setting change is invalidated in the case where the region where the setting change is validated is touched again, and the setting change of the item set in the new region is validated in the case where the new region is touched. In a case where the setting change of the item set in the newly touched region is validated, the setting change of an item that is in the valid state until then is invalidated. For example, in a case where the center region Dc is touched in the state where the setting change of the shutter speed is validated, the setting change of the shutter speed is invalidated and the setting change of the exposure correction value is validated.

In the case where the power supply of the digital camera is turned on, the switching unit 152 first invalidates the setting changes of all items (step S110). A state where the setting changes of all items are invalid refers to a state where the operation dial 110 is electronically locked.

Thereafter, the switching unit 152 determines the presence or absence of the contact with the top surface of the operation dial 110 (step S111). In the case where it is determined that there is contact with the top surface, the switching unit 152 validates the setting change of the item set in the region where the contact is detected (step S112). For example, in a case where the center region Dc is touched, the setting change of the exposure correction value is validated.

Thereafter, the switching unit 152 determines again the presence or absence of the contact with the top surface of the operation dial 110 (step S113).

Here, in the case where it is determined that there is contact with the top surface, the switching unit 152 determines whether the contact is made with the region in which the setting change is validated (step S114). The region in which the setting change is validated refers to a region where the item whose setting change is validated at the present time is set. For example, in a case where the setting change of the exposure correction value is validated at the present time, the region in which the setting change is validated is the center region Dc. Therefore, in this case, it is determined whether the contact is made with the center region Dc.

In the case where it is determined that the contact is made with the region in which the setting change is validated, the switching unit 152 invalidates the setting change of the item that is in the valid state at the present time (step S115). Accordingly, the operation of the operation dial 110 is invalidated. That is, the operation dial 110 is electronically locked.

In a case where it is determined that the contact is not made with the region in which the setting change is validated, the switching unit 152 invalidates the setting change of the item that is in the valid state at the present time and validates the setting change of the item set in the newly touched region (step S116). Accordingly, the item capable of being changed in the setting by the operation of the operation dial 110 is switched. For example, in a case where the rear region Dr is newly touched in the case where the setting change of the exposure correction value is validated, the setting change of the exposure correction value is invalidated and the setting change of the ISO sensitivity is newly validated.

Thereafter, the switching unit 152 determines whether the power supply is turned off (step S117). In the case where the power supply is turned off, the processing ends. On the other hand, in a case where the power supply is not turned off, the processing returns to step S113 to execute the above processing again.

In this manner, in the digital camera 1 of the embodiment, in the case where the top surface of the operation dial 110 is touched, the setting change of the item set in the touched region is validated. In the case where the same region is touched again, the setting change is invalidated. That is, it is possible to switch between validity and invalidity of the setting change by a toggle type.

The display on the sub-display 16 is the same as that of the digital camera 1 of the first embodiment. In the case where the operation dial 110 is electronically locked, the lock mark m1 is displayed on the sub-display 16. Accordingly, it is possible to confirm whether the operation dial 110 is electronically locked from the display on the sub-display 16. Further, the setting value of the item whose setting change is validated is displayed in a large size and the setting change valid mark m2 is displayed. Accordingly, it is possible to confirm the item capable of being changed in the setting by the operation dial 110 from the display on the sub-display 16.

Modification Example

The point that the setting change of the specific item may be validated in the case where the plurality of regions are touched at the same time is the same as the digital camera 1 of the second embodiment. Further, the point that the modification example thereof can be employed is also the same.

Further, the point that a specific position on the top surface of the operation dial 110 may be touched to switch the imaging mode and the point that the item capable of being set by the operation dial 110 may be switched in conjunction with the switching of the imaging mode are the same as the digital camera 1 of the third embodiment. At the time, the point that the imaging mode may be switched to a specific imaging mode depending on the combination of the touched regions in the case where the plurality of regions are touched at the same time is the same as the digital camera 1 of the fourth embodiment. Further, the point that the modification example thereof can be employed is also the same.

Furthermore, the point that the item to be changed in the setting in the case where the operation dial 110 is operated may be switched automatically according to the imaging mode is the same as the digital camera 1 of the fifth embodiment. Further, the point that the modification example thereof can be employed is also the same.

Further, the point that the dial-display 132 may be provided on the top surface of the operation dial 110 is the same as the digital camera 1 of the sixth embodiment. Further, the point that the modification example thereof can be employed is also the same.

It is possible to represent whether the setting change is valid by the display on the dial-display 132 by comprising the dial-display 132 on the top surface of the operation dial 110. Hereinafter, specific examples of the above will be described.

«Display on Dial-Display»

Figure 49A:
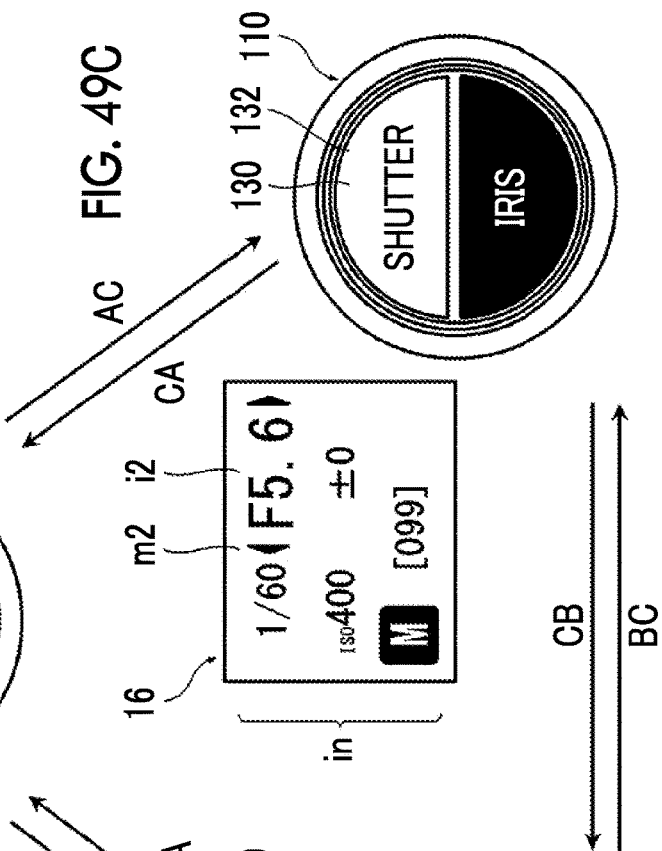
FIG. 49A, FIG. 49B, and FIG. 49C are diagrams showing transition of the switching of the display on the dial-display according to the switching between validity and invalidity of the setting change by the operation dial.
Figure 49B:
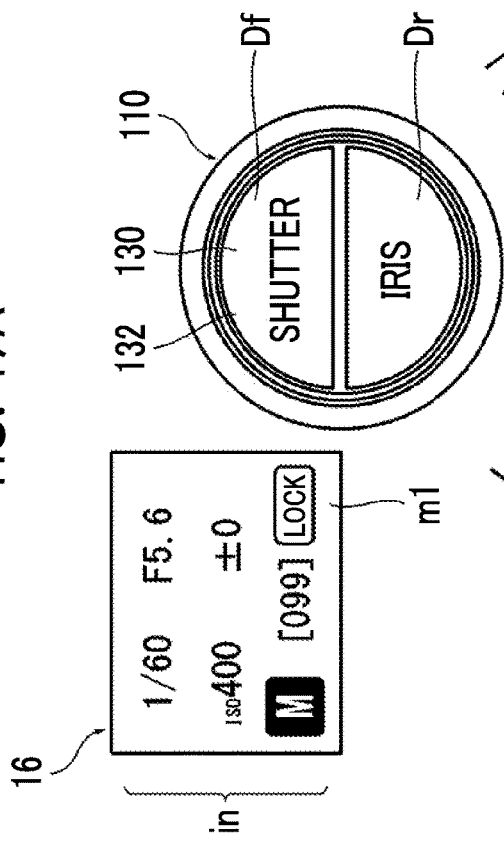
Figure 49C:
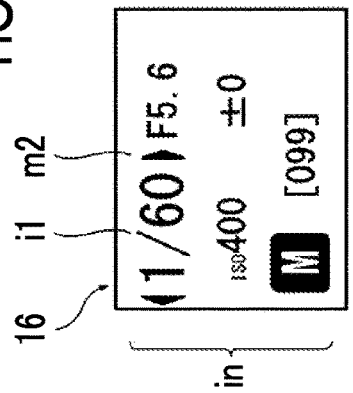

FIG. 49A, FIG. 49B, and FIG. 49C are diagrams showing transition of the switching of the display on the dial-display 132 according to the switching between validity and invalidity of the setting change by the operation dial.

FIG. 49A, FIG. 49B, and FIG. 49C show an example in a case where the top surface of the operation dial 110 is divided into two in the front-rear direction, and the setting change of the shutter speed is assigned to the front region Df and the setting change of the F-number is assigned to the rear region Dr. This setting is the same as the setting in the case where the imaging mode is set to the manual mode in the digital camera of the fifth or sixth embodiment.

In this case, the setting change of the shutter speed is validated in the case where the front region Df is touched, and the setting change of the F-number is validated in the case where the rear region Dr is touched. Further, in a case where the setting change of the shutter speed is validated once and then the front region Df is touched again, the setting change of the shutter speed is invalidated. Similarly, in a case where the setting change of the F-number is validated once and then the rear region Dr is touched again, the setting change of the F-number is invalidated. Further, in a case where the setting change of the shutter speed is validated once, and then the rear region Dr is touched, the setting change of the F-number is newly validated. Further, in a case where the setting change of the F-number is validated once and then the front region Df is touched, the setting change of the shutter speed is newly validated.

Further, the dial-display 132 displays the front region Df and the rear region Dr separately and displays the information on the item set in each region in a frame line separating each region. As described above, since the shutter speed is set in the front region Df, the character of "SHUTTER" is displayed in the front region Df as the information indicating that the item to be changed in the setting is the shutter speed. Further, since the F-number is set in the rear region Dr, the character of "IRIS" is displayed in the rear region Dr as the information indicating that the item to be changed in the setting is the F-number.

<Display in Each State>

FIG. 49A shows a display example in a case where the setting changes of both the shutter speed and the F-number are invalid.

The case where the setting changes of both the shutter speed and the F-number are invalid refers to a case where the operation dial 110 is electronically locked. In this case, the character of "SHUTTER" is displayed in black on the white background in the front region Df of the dial-display 132 (so-called blackening display). Further, the character of "IRIS" is displayed in black on the white background in the rear region Dr. It is possible for the user to recognize that the setting changes of both the shutter speed and the F-number are invalid, that is, the operation dial 110 is electronically locked by confirming this display.

In the case where the setting changes of both the shutter speed and the F-number are invalid, the lock mark m1 is displayed on the sub-display 16. Therefore, it can be recognized that the operation dial 110 is locked also from the display on the sub-display 16.

FIG. 49B shows a display example in a case where the setting change of the shutter speed is valid.

In this case, the display on the dial-display 132 in the front region Df is inverted. That is, the character of "SHUTTER" is displayed in white on the black background (so-called whitening display). It is possible for the user to recognize that the setting change of the shutter speed is valid by confirming that the display on the dial-display 132 in the front region Df is inverted.

In the case where the setting change of the shutter speed is valid, the shutter speed information i1 is displayed relatively larger than other pieces of information and the setting change valid mark m2 is displayed at the display position of the shutter speed information i1 on the sub-display 16. Therefore, it can be recognized that the setting change of the shutter speed is valid also from the display on the sub-display 16.

FIG. 49C shows a display example in a case where the setting change of the F-number is valid.

In this case, the display on the dial-display 132 in the rear region Dr is inverted. That is, the character of "IRIS" is displayed in white on the black background (so-called whitening display). It is possible for the user to recognize that the setting change of the F-number is valid by confirming that the display on the dial-display 132 in the rear region Dr is inverted.

In the case where the setting change of the F-number is valid, the F-number information i2 is displayed relatively larger than other pieces of information and the setting change valid mark m2 is displayed at the display position of the F-number information i2 on the sub-display 16. Therefore, it can be recognized that the setting change of the F-number is possible also from the display on the sub-display 16.

<Transition to Each State>

The state where the setting changes of both the shutter speed and the F-number are invalid is set as a locked state. In the locked state, the display on the dial-display 132 becomes the display of FIG. 49A.

In the case where the finger touches the front region Df on the top surface for the operation dial 110 in the locked state, the setting change of the shutter speed becomes valid. In the case where the setting change of the shutter speed is validated, the display on the dial-display 132 transitions to the display shown in FIG. 49B as indicated by arrow AB in FIG. 49A and FIG. 49B.

In the case where the finger touches the front region Df on the top surface in the state where the setting change of the shutter speed is valid, the setting change of the shutter speed becomes invalid. In the case where the setting change of the shutter speed is invalidated, the display on the dial-display 132 transitions to the display shown in FIG. 49A as indicated by arrow BA in FIG. 49A and FIG. 49B.

In the case where the finger touches the rear region Dr on the top surface in the state where the setting change of the shutter speed is valid, the setting change of the F-number becomes valid instead of the shutter speed. In the case where the setting change of the F-number is validated instead of the shutter speed, the display on the dial-display 132 transitions to the display shown in FIG. 49C as indicated by arrow BC in FIG. 49B and FIG. 49C.

In the case where the finger touches the rear region Dr on the top surface for the operation dial 110 in the locked state, the setting change of the F-number becomes valid. In the case where the setting change of the F-number is validated, the display on the dial-display 132 transitions to the display shown in FIG. 49C as indicated by arrow AC in FIG. 49A and FIG. 49C.

In the case where the finger touches the rear region Dr on the top surface in the state where the setting change of the F-number is valid, the setting change of the F-number becomes invalid. In the case where the setting change of the F-number is invalidated, the display on the dial-display 132 transitions to the display shown in FIG. 49A as indicated by arrow CA in FIG. 49A and FIG. 49C.

In the case where the finger touches the front region Df on the top surface in the state where the setting change of the F-number is valid, the setting change of the shutter speed becomes valid instead of the F-number. In the case where the setting change of the shutter speed is validated instead of the F-number, the display on the dial-display 132 transitions to the display shown in FIG. 49B as indicated by arrow CB in FIG. 49B and FIG. 49C.

In this manner, the display on the dial-display 132 changes in conjunction with the state of the operation dial 110.

《Modification Example of Display on Dial-Display》

In the case where the top surface of the operation dial 110 is touched and the setting change of the specific item is validated, the display on the dial-display 132 may be switched to the information on the setting value of the item.

For example, in the case where the setting change of the shutter speed is validated in the above example, the display on the dial-display 132 is switched to the display of the currently set shutter speed. In this case, the switching to another item is impossible and only returning to the invalid state is allowed.

Figures 50A, 50B, 50C:
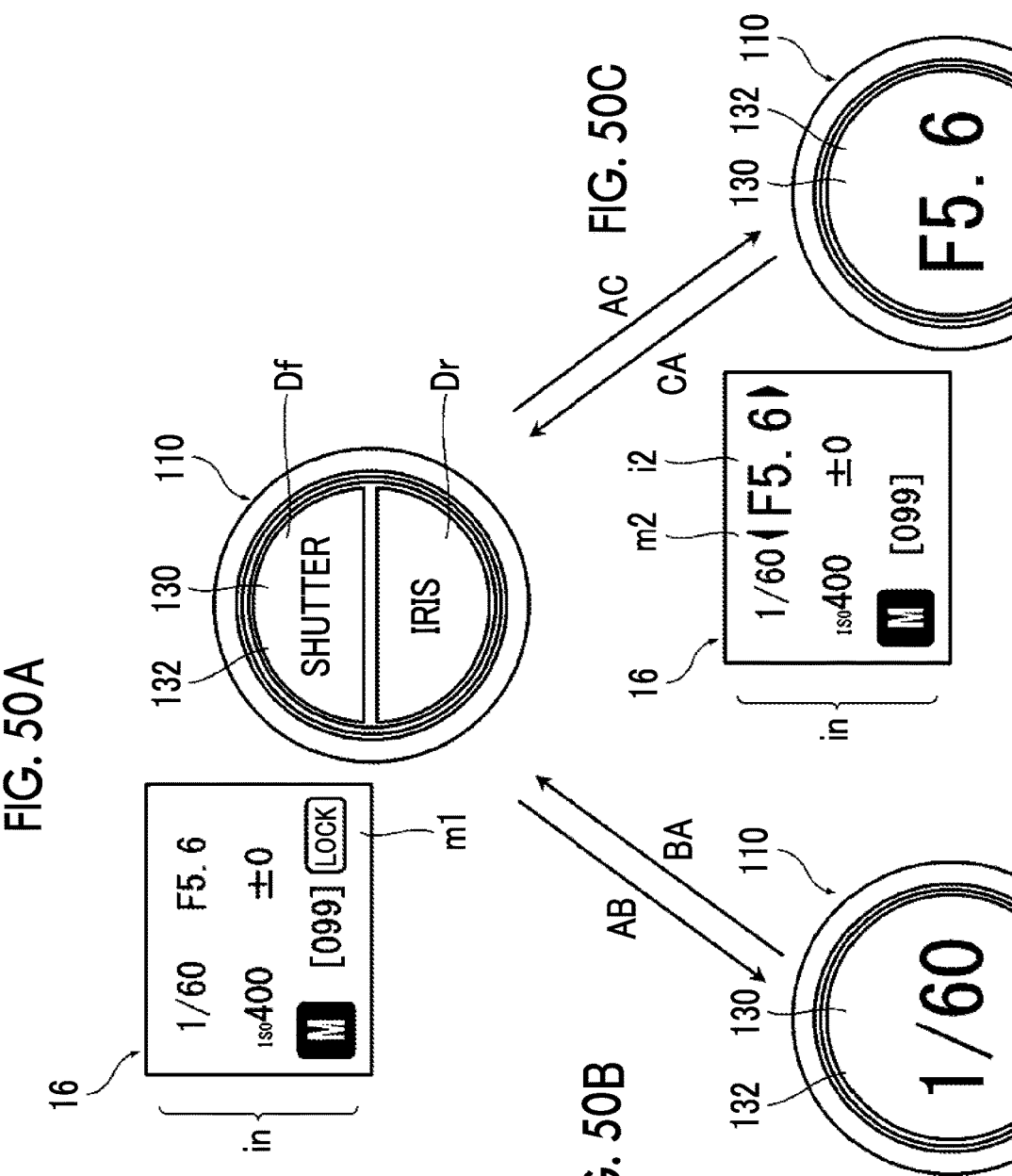
FIG. 50A, FIG. 50B, and FIG. 50C are diagrams showing transition states of the display in a case where a setting value of an item whose setting change is validated is displayed on the dial-display.

FIG. 50A, FIG. 50B, and FIG. 50C are diagrams showing transition states of the display in a case where a setting value of an item whose setting change is validated is displayed on the dial-display 132.

FIG. 50A shows a display example in the case where the setting changes of both the shutter speed and the F-number are invalid, that is, the locked state.

In this case, similarly to the example shown in FIG. 49A, FIG. 49B, and FIG. 49C, the character of "SHUTTER" is displayed in black on the white background in the front region Df of the dial-display 132 and the character of "IRIS" is displayed in black on the white background in the rear region Dr.

For the operation dial 110 in the locked state, the setting change of the shutter speed becomes valid in the case where the front region Df on the top surface is touched and the setting change of the F-number becomes valid in the case where the rear region Dr is touched.

FIG. 50B shows a display example in the case where the setting change of the shutter speed is valid.

In this case, the dial-display 132 displays the current setting value of the shutter speed.

In a case where at least one of the front region Df or the rear region Dr on the top surface is touched for the operation dial 110 capable of performing the setting change of the shutter speed, the setting change of the shutter speed is invalidated. That is, the operation dial 110 is locked.

FIG. 50C shows a display example in the case where the setting change of the F-number is valid.

In this case, the dial-display 132 displays the current setting value of the F-number.

In a case where at least one of the front region Df or the rear region Dr on the top surface is touched for the operation dial 110 capable of performing the setting change of the F-number, the setting change of the F-number is invalidated. That is, the operation dial 110 is locked.

In this manner, it is possible to easily grasp the item capable of being changed in the setting by the operation dial 110 by displaying the setting value of the item whose setting change is validated on the dial-display 132.

FIG. 51A, FIG. 51B, and FIG. 51C are diagrams showing modification examples of the display in the case where the setting value of the item whose setting change is validated is displayed on the dial-display.

As shown in FIG. 51A, FIG. 51B, and FIG. 51C, in the case where the dial-display 132 displays the setting value of the item whose setting change is validated, the display on the sub-display 16 of the item may be deleted.

For example, in the case where the setting change of the shutter speed is valid, the shutter speed information is deleted from the display on the sub-display 16 as shown in FIG. 51B.

Further, for example, in the case where the setting change of the F-number is valid, the F-number information is deleted from the display on the sub-display 16 as shown in FIG. 51C.

Other Embodiments

[Contact Detection Unit]

A so-called dead zone may be provided in the contact detection unit for the detection of the contact. That is, it is preferable not to detect instantaneous finger contact. Similarly, it is preferable not to detect also a case where the finger is instantaneously released. In order to provide the dead zone, for example, the contact is detected at regular time interval. In this case, it is determined whether the contact is continuously detected to determine the presence or absence of the contact. In a case where the contact is continuously detected, the contact is determined to be present. In the case of the instantaneous contact, since the contact is not continuously detected, the detection can be eliminated. Further, even in the case where the finger is instantaneously released, it can be recognized that the contact is continued as long as the finger is touched before the next detection. In this manner, the operation can be performed more stably by determining also duration of the contact and responding with hysteresis.

[Another Example of Display Form in Case Where Setting Change by Operation Dial is Valid and in Case Where Setting Change by Operation Dial is Invalid]

In the case where the setting change by the operation dial is invalid, a background color of the sub-display may be changed and the fact may be notified.

[Other Examples of Method of Notifying that Setting Change by Operation Dial is Invalid]

(1) Notification by Sound

In a case where the digital camera 1 is provided with a sound output unit such as a speaker, the user may be notified that the setting change by the operation dial is invalid by using the sound output unit. For example, in the case where the operation dial is rotationally operated in the case where the setting change by the operation dial is invalid, a sound such as a notification sound or a warning sound is output from the sound output unit. In this case, the digital camera is provided with a sound output control unit. In the case where it is detected that the operation dial is rotationally operated in the state where the setting change by the operation dial is invalid, the sound output control unit outputs the sound such as the notification sound or the warning sound from the sound output unit.

Further, in the case where the digital camera 1 is provided with the sound output unit such as the speaker, a pseudo-rotation operation sound may be output in conjunction with the rotation operation of the operation dial 110. In this case, the rotation operation sound may be switched between the case where the setting change by the operation dial is valid and the case where the setting change by the operation dial is invalid. Alternatively, the rotation operation sound may be output only in the case where the setting change by the operation dial is valid.

(2) Notification on Main-Display

In a case where the camera body 10 is provided with the main-display 14 as the digital camera of the above-described embodiment, the main-display may display a state of the operation dial 110. That is, the main-display 14 may display whether the setting change by the operation dial 110 is valid. In a case where the camera body 10 is provided with the electronic view finder 18, the same display may be performed also on the electronic view finder 18.

[Other Forms of Dial Display Section]

The shape of the dial-display 132 as one example of the dial display section is circular in the above-described embodiment, but the shape of the dial display section is not limited thereto. For example, the shape thereof may be rectangular or polygonal. The shape of the dial display section does not necessarily match the shape of the top surface of the operation dial 110 (shape of the upper-end surface of the inner peripheral part 112), and various shapes may be employed.

[Other Examples of Display Section and Dial Display Section]

The sub-display 16 forming the display section and the dial-display 132 forming the dial display section may be formed of a self-luminous display or the like such as electronic paper, a memory liquid crystal display, or an organic electroluminescent display (EL).

The electronic paper is a thin display that has thinness and visibility at the same level as those of paper, and means a display of which contents to be displayed can be rewritten. The memory liquid crystal display is a liquid crystal display that has a function to be capable of maintaining contents displayed on a screen even though a power supply is turned off. Both of the electronic paper and the memory liquid crystal display can ensure good visibility even in an environment where surroundings are bright. Further, a display on the dial display section can be confirmed even in a case where the power supply of the camera is turned off Further, in a case where the dial-display is formed of the LCD, it is possible to ensure good visibility even in an environment where surroundings are bright by employing a reflective LCD as the display. In the case where the dial-display is formed of the reflective LCD, it is preferable to comprise illumination.

Similarly, the sub-display 16 which is the display section may also be formed of the self-luminous display or the like such as the electronic paper, the memory liquid crystal display, or the organic EL display.

[Other Examples of Disposition of Display Section with respect to Operation Dial]

The sub-display 16 is disposed at the position on the left oblique front side of the operation dial 110 on the top surface of the camera body 10 in the above-described embodiment. However, the disposition position of the sub-display 16 is not limited thereto.

However, since the operability and the visibility deteriorate in a case where the sub-display 16 is disposed at a position away from the operation dial 110, it is preferable to dispose the sub-display 16 near the operation dial 110.

Here, the "near" refers to a distance relationship to the extent that the sub-display 16 and the operation dial 110 are disposed adjacent to each other as shown in FIG. 3.

It is possible to enhance the relationship between the sub-display 16 and the operation dial 110 by disposing the sub-display 16 near the operation dial 110 and thus to provide better operability. That is, since the setting can be confirmed right near the operation dial 110, in a case where the operation is performed while the operation dial 110 or the dial-display 132 is viewed, it is possible to reduce movement of line of sight and thus to provide good operability without stress. Further, it is also possible to realize an intuitive operation.

Further, in the case where the sub-display 16 is disposed near the operation dial 110, it is preferable to dispose the sub-display 16 on the left side than on the right side of the operation dial 110 and on the upper side than on the lower side of the operation dial 110 from the viewpoint of operability since the sub-display 16 is hardly hidden by the hand operating the operation dial 110.

Figure 52:
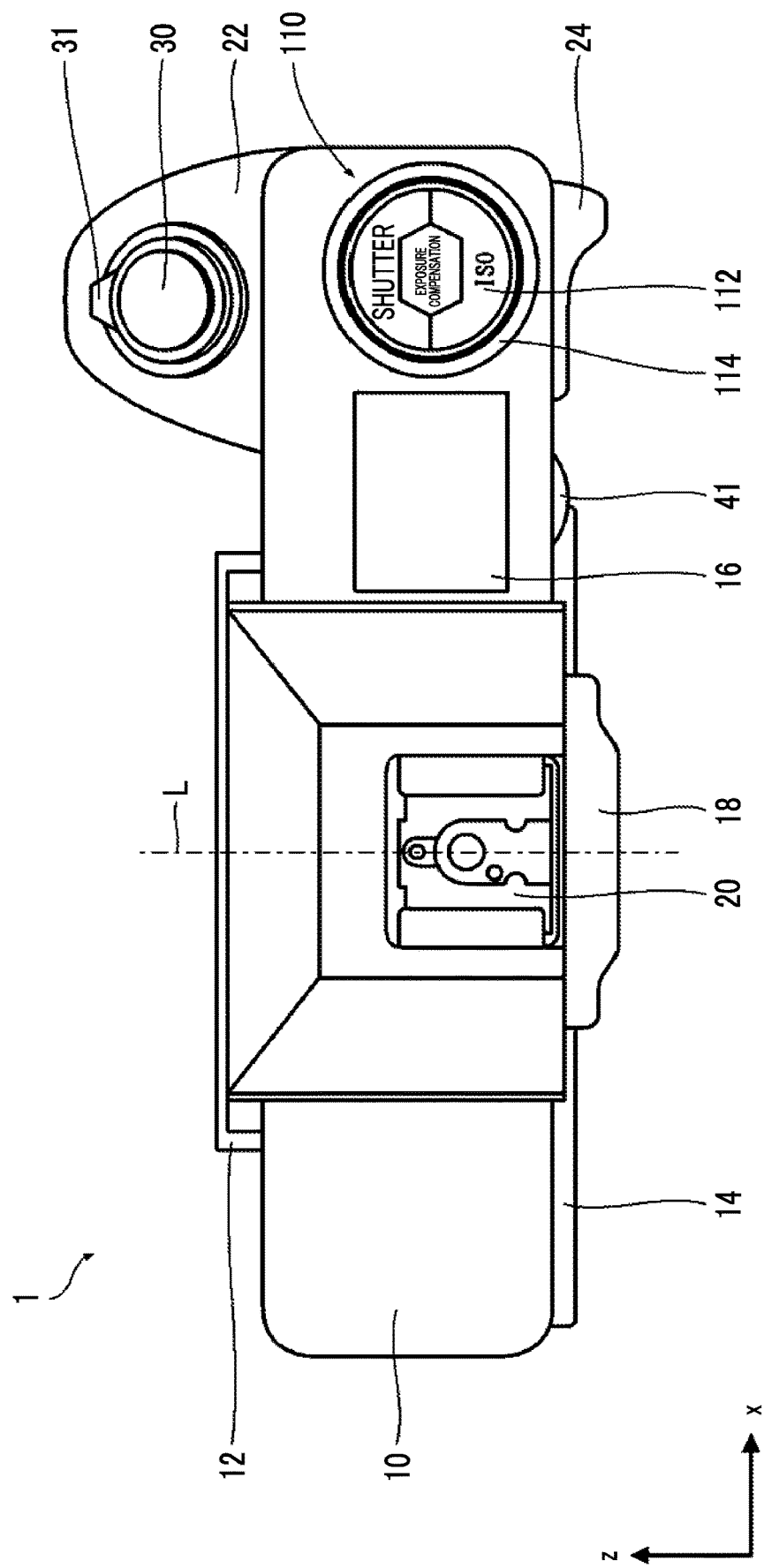
FIG. 52 is a plan view showing another example of a layout of the operation dial and the sub-display.

FIG. 52 is a plan view showing another example of a layout of the operation dial 110 and the sub-display 16.

In the example shown in FIG. 52, the sub-display 16 is disposed at a position on the left side of the operation dial 110 on the top surface of the camera body 10. Accordingly, it is possible to prevent the display on the sub-display 16 from being hidden by the finger of the hand operating the operation dial 110.

Figure 53:
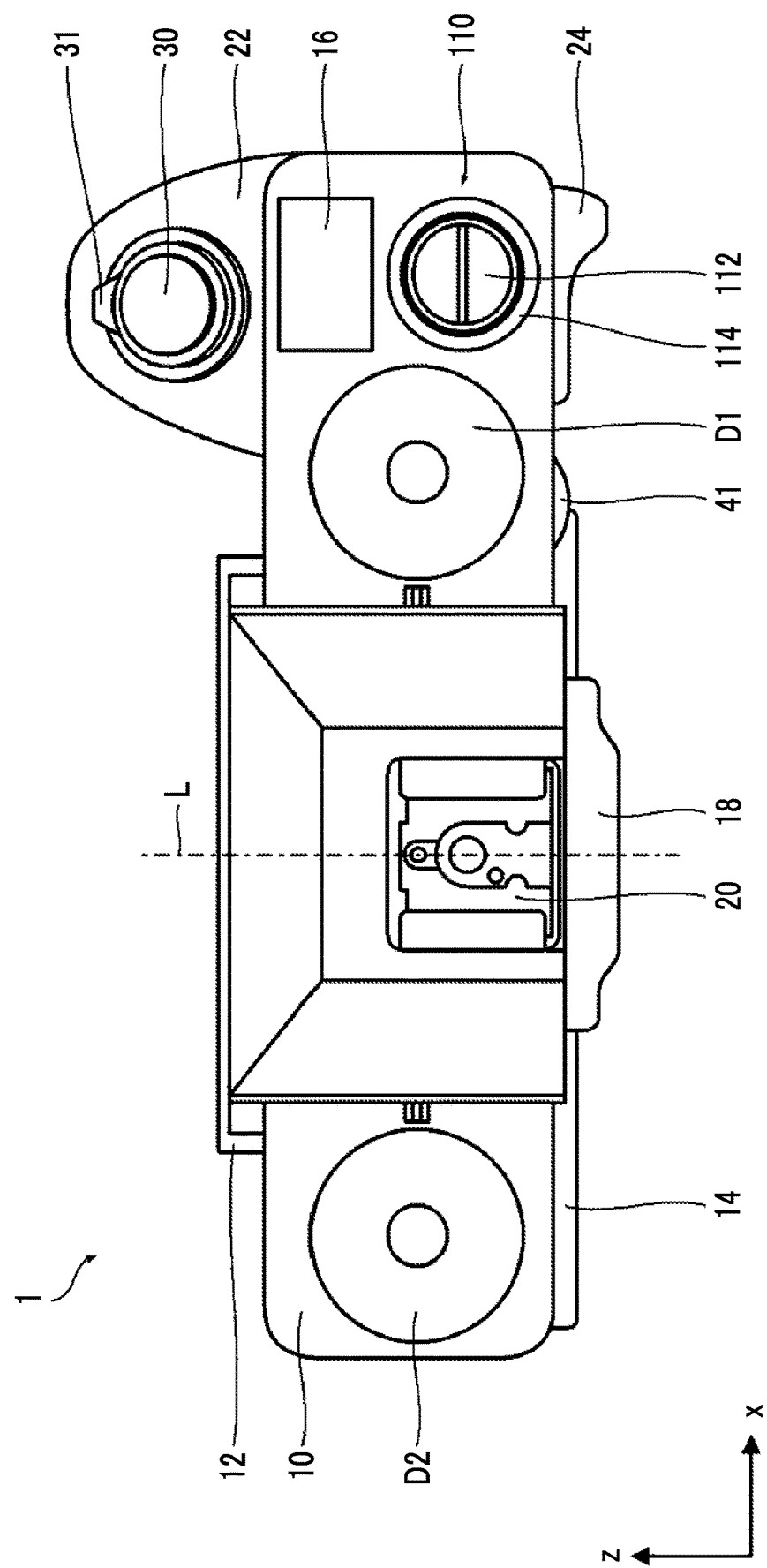
FIG. 53 is a plan view showing still another example of the layout of the operation dial and the sub-display.

FIG. 53 is a plan view showing still another example of the layout of the operation dial 110 and the sub-display 16.

In the example shown in FIG. 53, the sub-display 16 is disposed at a position on the front side of the operation dial 110 on the top surface of the camera body 10. In the example shown in FIG. 53, a plurality of dials D1 and D2 are provided on the top surface of the camera body 10. Further, in the example shown in FIG. 53, the outer diameter of the operation dial 110 and the screen size of the sub-display are reduced. In this manner, it is possible to set the outer diameter of the operation dial 110 and the screen size of the sub-display 16 as appropriate depending on the size of the camera body or the like.

Other Modification Examples

The rotation of the operation dial 110 is detected by the rotary encoder in the above-mentioned embodiment, but the configuration of detecting the rotation of the operation dial 110 is not limited thereto. In addition, for example, publicly known rotation detection means, which uses a rotary brush or the like, may also be employed.

Further, the click mechanism of the operation dial 110 is formed of the click groove-metal plate 120A and the click balls 120B in the above-mentioned embodiment, but the configuration of the click mechanism is not limited thereto. In addition, publicly known click mechanism, which uses a leaf spring or the like, may also be employed.

Further, the case where the invention is applied to the digital camera is described in the above-mentioned embodiment, but the application of the invention is not limited thereto. The invention may be applied similarly to a camera that uses a silver halide film. Further, the invention may also be applied to an electronic apparatus comprising the camera function.

Further, the case where the invention is applied to the lens-interchangeable camera is described in the above-mentioned embodiment, but the invention may also be applied similarly to a camera, which is integrated with a lens.

Furthermore, the case where the invention is applied to the non-reflex camera is described in the above-mentioned embodiment, but the invention may also be applied similarly to a reflex camera.

As described above, the camera according to one embodiment of the invention comprises the rotary operation dial, the plurality of contact detection units provided on the top surface of the operation dial, and an item to be set by the operation dial is set for each contact detection unit, the switching unit that switches between validity and invalidity of the setting change of the item set for each contact detection unit according to the detection result of the contact detection unit, and the setting change unit that changes the setting of the item whose setting change is valid in response to the operation of the operation dial.

According to the embodiment, the plurality of contact detection units are provided on the top surface of the operation dial. The item to be set by the operation dial is set in each contact detection unit. The setting change of the item set in each contact detection unit can be switched between validity and invalidity according to the detection result of the contact detection unit. In the case where the operation dial is operated, the setting of the item whose setting change is valid is changed. Since the setting change can be switched between validity and invalidity by the contact, it is possible to simplify the configuration of the operation dial. It is possible to set a plurality of items with one operation dial by comprising the plurality of contact detection units.

Further, the camera according to one embodiment of the invention further comprises the item setting unit that sets the item to be set by the operation dial for each contact detection unit.

According to the embodiment, it is possible to set the item to be set by the operation dial for each contact detection unit. Accordingly, it is possible to further improve operability.

Further, in the camera according to one embodiment of the invention, the switching unit validates the setting change of the item set in the contact detection unit detecting the contact while the contact detection unit detects the contact.

According to the embodiment, the setting change of the item set in the contact detection unit detecting the contact is validated while the contact detection unit detects the contact. That is, the setting change of the item set in the contact detection unit is validated while the finger is touched. Accordingly, it is possible to easily lock and unlock the operation dial.

Further, in the camera according to one embodiment of the invention, the item to be set by the operation dial is set for the combination of the specific contact detection units, and the switching unit validates the setting change of the item set for the combination of the specific contact detection units in the case where the contact detection units in the specific combination detect the contact.

According to the embodiment, the item to be set by the operation dial is set for the combination of the specific contact detection units. That is, in the case where the plurality of specific contact detection units are touched at the same time, the setting change of the specific item becomes possible. For example, in the case where two contact detection units are provided, the setting change of the specific item becomes possible in the case where the two contact detection units are touched at the same time. Accordingly, it is possible to easily increase the item that can be set by one operation dial.

Further, the camera according to one embodiment of the invention comprises the display section provided near the operation dial, and the display control unit that displays the setting value of the item to be set by the operation dial on the display section.

According to the embodiment, the display section is provided near the operation dial. The setting value of the item to be set by the operation dial is displayed on the display section. Accordingly, it is possible to easily confirm the setting situation of the item to be set by the operation dial.

Further, in the camera according to one embodiment of the invention, the display control unit displays setting values of all items capable of being set by the operation dial on the display section, and displays a setting value of the item whose setting change is valid and a setting value of an item whose setting change is invalid in a different form.

According to the embodiment, the setting values of all items capable of being set by the operation dial are displayed on the display section. Accordingly, it is possible to easily grasp the setting value of the item capable of being set by the operation dial. Further, in the case where each setting value is displayed, the setting value of the item whose setting change is valid and the setting value of the item whose setting change is invalid are displayed in a different form.

Accordingly, it is possible to easily grasp the item capable of being set by the operation dial at the present.

Further, the camera according to one embodiment of the invention comprises the dial display section provided on the top surface of the operation dial, and the dial display control unit that displays the information on the item set in the contact detection unit on the dial display section in association with the disposition of the contact detection unit.

According to the embodiment, the dial display section is provided on the top surface of the operation dial. The dial display section displays the information on the item set in the contact detection unit section in association with the disposition of the contact detection unit. Accordingly, it is possible to grasp at a glance the item whose setting is validated corresponding to a touched contact detection unit on the top surface.

Further, in the camera according to one embodiment of the invention, the dial display control unit displays the information on the item whose setting change is valid and the information on the item whose setting change is invalid in a different form.

According to the embodiment, the information on the item whose setting change is valid and the information on the item whose setting change is invalid are displayed in a different form. Accordingly, it is possible to grasp at a glance the item whose setting change is validated.

Further, in the camera according to one embodiment of the invention, the switching unit switches the item whose setting change is validated to the item set in the contact detection unit that has detected the contact every time the contact detection unit detects the contact.

According to the embodiment, the item whose setting change is validated can be switched every time the contact is detected by the contact detection unit. That is, the setting change of the item set in the last touched contact detection unit is validated. Accordingly, it is possible to easily switch the item to be set by the operation dial.

Further, in the camera according to one embodiment of the invention, in the case where the same contact detection unit continuously detects the contact, the switching unit switches alternately between invalidity and validity of the setting change every time the contact is detected.

According to the embodiment, in the case where the same contact detection unit continuously detects the contact, the setting change can be switched alternately between validity and invalidity every time the contact is detected. That is, in the case where the same contact detection unit is continuously touched, the operation of the operation dial can be switched alternately between validity and invalidity. The contact detection unit can function as a toggle type switch. Accordingly, it is possible to easily lock and unlock the operation dial.

Further, in the camera according to one embodiment of the invention, the item to be set by the operation dial is set for the combination of the specific contact detection units, and the switching unit validates the setting change of the item set for the combination of the specific contact detection units in the case where the contact detection units in the specific combination detect the contact.

According to the embodiment, the item to be set by the operation dial is set for the combination of the specific contact detection units. That is, in the case where the plurality of specific contact detection units are touched at the same time, the setting change of the specific item becomes possible. For example, in the case where two contact detection units are provided, the setting change of the specific item becomes possible in the case where the two contact detection units are touched at the same time. Accordingly, it is possible to easily increase the item that can be set by one operation dial.

Further, the camera according to one embodiment of the invention comprises the display section provided near the operation dial, and the display control unit that displays the setting value of the item to be set by the operation dial on the display section.

According to the embodiment, the display section is provided near the operation dial. The setting value of the item to be set by the operation dial is displayed on the display section. Accordingly, it is possible to easily confirm the setting situation of the item to be set by the operation dial.

Further, in the camera according to one embodiment of the invention, the display control unit displays setting values of all items capable of being set by the operation dial on the display section, and displays a setting value of the item whose setting change is valid and a setting value of an item whose setting change is invalid in a different form.

According to the embodiment, the setting values of all items capable of being set by the operation dial are displayed on the display section. Accordingly, it is possible to easily grasp the setting value of the item capable of being set by the operation dial. Further, in the case where each setting value is displayed, the setting value of the item whose setting change is valid and the setting value of the item whose setting change is invalid are displayed in a different form. Accordingly, it is possible to easily grasp the item capable of being set by the operation dial at the present.

Further, the camera according to one embodiment of the invention comprises the dial display section provided on the top surface of the operation dial, and the dial display control unit that displays the information on the item set in the contact detection unit on the dial display section in association with the disposition of the contact detection unit.

According to the embodiment, the dial display section is provided on the top surface of the operation dial. The dial display section displays the information on the item set in the contact detection unit section in association with the disposition of the contact detection unit. Accordingly, it is possible to grasp at a glance the item whose setting is validated corresponding to a touched contact detection unit on the top surface.

Further, in the camera according to one embodiment of the invention, the dial display control unit displays the information on the item whose setting change is valid and the information on the item whose setting change is invalid in a different form.

According to the embodiment, the information on the item whose setting change is valid and the information on the item whose setting change is invalid are displayed in a different form. Accordingly, it is possible to grasp at a glance the item whose setting change is validated.

Further, in the camera according to one embodiment of the invention, the operation dial and the display section are disposed on the top surface of the camera body.

According to the embodiment, the operation dial and the display section are disposed on the top surface (so-called warship part) of the camera body.

Further, in the camera according to one embodiment of the invention, the operation dial is disposed at the end portion on the grip portion side of the camera body.

According to the embodiment, the operation dial is disposed at the end portion on the grip portion side of the camera body. Accordingly, it is possible to operate the operation dial while the camera body is gripped.

Further, in the setting method of the camera according to one embodiment of the invention, the item to be set by the operation dial is set for each of the plurality of contact detection units provided on the top surface of the rotary operation dial, the setting change of the item set in the contact detection unit detecting the contact is validated while the contact detection unit detects the contact, and the setting of an item whose setting change is valid is changed in response to an operation of the operation dial.

According to the embodiment, the plurality of contact detection units are provided on the top surface of the operation dial, and the operation by the operation dial is validated only while the contact detection unit detects the contact. Accordingly, it is possible to easily lock and unlock the operation dial. Further, the item capable of being set by the operation dial is set in each contact detection unit, and the setting change of the item set in the contact detection unit that detects the contact is validated. Accordingly, it is possible to set the plurality of items with one operation dial.

Further, in the setting method of the camera according to one embodiment of the invention, the item to be set by the operation dial is set for each of a plurality of contact detection units provided on a top surface of a rotary operation dial, the item whose setting change is validated is switched to the item set in the contact detection unit that has detected the contact every time the contact detection unit detects the contact, and the setting of the item whose setting change is valid is changed in response to an operation of the operation dial.

According to the embodiment, the plurality of contact detection units are provided on the top surface of the operation dial, and the item capable of being changed in the setting by the operation dial can be switched every time the contact detection unit detects the contact. Accordingly, it is possible to set the plurality of items with one operation dial.

Further, the setting program of the camera according to one embodiment of the invention causing the computer to realize the function of setting the item to be set by the operation dial for each of the plurality of contact detection units provided on the top surface of the rotary operation dial, the function of determining that presence or absence of the contact for each contact detection unit based on the output from the contact detection unit, the function of validating the setting change of the item set in the contact detection unit detecting the contact while the contact detection unit detects the contact, and the function of changing the setting of the item whose setting change is valid in response to the operation of the operation dial.

According to the embodiment, the plurality of contact detection units are provided on the top surface of the operation dial, and the operation by the operation dial is validated only while the contact detection unit detects the contact. Accordingly, it is possible to easily lock and unlock the operation dial. Further, the item capable of being set by the operation dial is set in each contact detection unit, and the setting change of the item set in the contact detection unit that detects the contact is validated. Accordingly, it is possible to set the plurality of items with one operation dial.

Further, the setting program of the camera according to one embodiment of the invention causing the computer to realize the function of setting the item to be set by the operation dial for each of the plurality of contact detection units provided on the top surface of the rotary operation dial, the function of determining that presence or absence of the contact for each contact detection unit based on the output from the contact detection unit, the function of switching the item whose setting change is validated to the item set in the contact detection unit that has detected the contact every time the contact detection unit detects the contact, and the function of changing the setting of the item whose setting change is valid in response to the operation of the operation dial.

According to the embodiment, the plurality of contact detection units are provided on the top surface of the operation dial, and the item capable of being changed in the setting by the operation dial can be switched every time the contact detection unit detects the contact. Accordingly, it is possible to set the plurality of items with one operation dial.

EXPLANATION OF REFERENCES

1: digital camera
2: lens
2a: lens drive unit
10: camera body
12: lens mount
14: main-display
16: sub-display
18: electronic view finder
20: hot shoe
22: grip
24: thumb rest
30: shutter button
31: power supply lever
34: playback button
35: delete button
36: AF lock button
37: AE lock button
38: menu button
39: selector button
40: BACK button
41: rear command dial
42: mode dial
42a: indicator
50: image sensor
52: image sensor drive unit
54: shutter
56: shutter drive unit
58: analog signal processing section
60: image data input unit
62: work memory
64: data memory
66: digital signal processing section
68: recording control unit
70: main-display drive unit
72: sub-display drive unit
72A: sub-display display control unit
74: operation unit
78: memory card
80: system controller
110: operation dial
112: inner peripheral part
112A: support part
114: outer peripheral part
114A: shaft portion
116: operation dial support frame
116A: click ball-receiving hole
118: bearing
120: click mechanism
120A: click groove-metal plate
120B: click ball
120C: click spring
120a: click groove
126: rotation detection unit 130: touch sensor
132: dial-display
134: dial-display display control unit
136: dial-display drive unit
150: setting system
152: switching unit
154: setting change unit
156: imaging mode switching unit
158: item setting unit
AB: arrow indicating transition direction
AC: arrow indicating transition direction
BA: arrow indicating transition direction
BC: arrow indicating transition direction
CA: arrow indicating transition direction
CB: arrow indicating transition direction
D1: dial
D2: dial
Dc: center region
Dcz: contact detection region
Df: front region
Dfz: contact detection region
Dlf: left front region
Dlfz: contact detection region
Dlr: left rear region
Dlrz: contact detection region
Dr: rear region
Drf: right front region
Drfz: contact detection region
Drr: right rear region
Drrz: contact detection region
Drz: contact detection region
L: optical axis
i1: shutter speed information
i2: F-number information
i3: ISO sensitivity information
i4: exposure correction value information
i5: imaging mode information
i6: the number of capturable images information
m1: lock mark
m2: setting change valid mark
S10 to S19: procedure of processing of switching between validity and invalidity of setting change of item capable of being set by operation dial
S30 to S34: procedure of processing of setting change based on operation of operation dial
S40 to S49: procedure of processing of switching between validity and invalidity of setting change of item capable of being set by operation dial
S60 to S69: procedure of processing of switching imaging mode
S80 to S84: procedure of processing of setting change based on operation of operation dial
S90 to S99: procedure of processing of switching imaging mode

What is claimed is:

1. A camera comprising:
a rotary operation dial;
a plurality of contact detection units that are provided on a top surface of the operation dial, and an item to be set by the operation dial is set for each contact detection unit;
a switching unit that switches between validity and invalidity of a setting change of the item set for each contact detection unit according to a detection result of the contact detection unit;
a setting change unit that changes a setting of an item whose setting change is valid in response to an operation of the operation dial;
a dial display section provided on the top surface of the operation dial; and
a dial display control unit that displays information on the item set in the contact detection unit on the dial display section in association with a disposition of the contact detection unit,
wherein the dial display control unit displays information on the item whose setting change is valid and information on the item whose setting change is invalid in a different form.

2. The camera according to claim 1, further comprising:
an item setting unit that sets the item to be set by the operation dial for each contact detection unit.

3. The camera according to claim 1,
wherein the switching unit validates the setting change of the item set in the contact detection unit detecting contact while the contact detection unit detects the contact.

4. The camera according to claim 2,
wherein the switching unit validates the setting change of the item set in the contact detection unit detecting contact while the contact detection unit detects the contact.

5. The camera according to claim 3,
wherein an item to be set by the operation dial is set for a specific combination of the contact detection units, and
wherein the switching unit validates the setting change of the item set for the specific combination of the contact detection units in a case where the contact detection units in the specific combination detect the contact.

6. The camera according to claim 4,
wherein an item to be set by the operation dial is set for a specific combination of the contact detection units, and
wherein the switching unit validates the setting change of the item set for the specific combination of the contact detection units in a case where the contact detection units in the specific combination detect the contact.

7. The camera according to claim 1, further comprising:
a display section provided near the operation dial; and
a display control unit that displays the setting value of the item to be set by the operation dial on the display section.

8. The camera according to claim 2, further comprising:
a display section provided near the operation dial; and
a display control unit that displays the setting value of the item to be set by the operation dial on the display section.

9. The camera according to claim 7,
wherein the display control unit displays setting values of all items capable of being set by the operation dial on the display section, and displays a setting value of the item whose setting change is valid and a setting value of an item whose setting change is invalid in a different form.

10. The camera according to claim 1,
wherein the switching unit switches the item whose setting change is validated to the item set in the contact detection unit that has detected the contact every time the contact detection unit detects the contact.

11. The camera according to claim 10,
wherein in a case where the same contact detection unit continuously detects the contact, the switching unit switches alternately between invalidity and validity of the setting change every time the contact is detected.

12. The camera according to claim 10,
wherein an item to be set by the operation dial is set for a specific combination of the contact detection units, and
wherein the switching unit validates the setting change of the item set for the specific combination of the contact detection units in a case where the contact detection units in the specific combination detect the contact.

13. The camera according to claim 10, further comprising:
a display section provided near the operation dial; and
a display control unit that displays the setting value of the item to be set by the operation dial on the display section.

14. The camera according to claim 13,
wherein the display control unit displays setting values of all items capable of being set by the operation dial on the display section, and displays a setting value of the item whose setting change is valid and a setting value of an item whose setting change is invalid in a different form.

15. The camera according to claim 7,
wherein the operation dial and the display section are disposed on a top surface of a camera body.

16. The camera according to claim 15,
wherein the operation dial is disposed at an end portion on the grip portion side of the camera body.

17. A setting method of the camera according to claim 1 comprising:
setting the item to be set by the operation dial for each of the plurality of contact detection units provided on the top surface of the rotary operation dial;
validating the setting change of the item set in the contact detection unit detecting contact while the contact detection unit detects the contact;
changing the setting of the item whose setting change is valid in response to the operation of the operation dial;
displaying information on the item set in the contact detection unit on the dial display section provided on the top surface of the operation dial in association with the disposition of the contact detection unit; and
displaying the information on the item whose setting change is valid and the information on the item whose setting change is invalid in a different form.

18. A setting method of the camera according to claim 1 comprising:
setting an item to be set by the operation dial for each of a plurality of contact detection units provided on a top surface of a rotary operation dial;
switching an item whose setting change is validated to an item set in the contact detection unit that has detected contact every time the contact detection unit detects the contact;
changing a setting of the item whose setting change is valid in response to an operation of the operation dial;
displaying information on the item set in the contact detection unit on the dial display section provided on the top surface of the operation dial in association with the disposition of the contact detection unit; and
displaying the information on the item whose setting change is valid and the information on the item whose setting change is invalid in a different form.

19. A non-transitory computer readable recording medium storing a setting program of the camera according to claim 1 causing the computer to realize:
a function of setting an item to be set by the operation dial for each of a plurality of contact detection units provided on a top surface of a rotary operation dial;
a function of determining presence or absence of contact for each contact detection unit based on an output from the contact detection unit;
a function of validating a setting change of the item set in the contact detection unit detecting contact while the contact detection unit detects the contact;
a function of changing a setting of an item whose setting change is valid in response to an operation of the operation dial;
a function of displaying information on the item set in the contact detection unit on the dial display section provided on the top surface of the operation dial in association with the disposition of the contact detection unit; and
a function of displaying the information on the item whose setting change is valid and the information on the item whose setting change is invalid in a different form.

20. A non-transitory computer readable recording medium storing a setting program of the camera according to claim 1 causing the computer to realize:
a function of setting an item to be set by the operation dial for each of a plurality of contact detection units provided on a top surface of a rotary operation dial;
a function of determining presence or absence of contact for each contact detection unit based on an output from the contact detection unit;
a function of switching an item whose setting change is validated to an item set in the contact detection unit that has detected contact every time the contact detection unit detects the contact;
a function of changing a setting of the item whose setting change is valid in response to an operation of the operation dial;
a function of displaying information on the item set in the contact detection unit on the dial display section provided on the top surface of the operation dial in association with the disposition of the contact detection unit; and
a function of displaying the information on the item whose setting change is valid and the information on the item whose setting change is invalid in a different form.

* * * * *